(12) United States Patent
Sasaki et al.

(10) Patent No.: US 7,458,729 B2
(45) Date of Patent: Dec. 2, 2008

(54) OPTICAL CONNECTING METHOD AND OPTICAL CONNECTION STRUCTURE

(75) Inventors: Kyoichi Sasaki, Shizuoka (JP); Masayoshi Suzuki, Fujieda (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 170 days.

(21) Appl. No.: 11/101,090

(22) Filed: Apr. 7, 2005

(65) Prior Publication Data

US 2005/0226566 A1 Oct. 13, 2005

(30) Foreign Application Priority Data

| Apr. 9, 2004 | (JP) | ............................ 2004-115421 |
| May 25, 2004 | (JP) | ............................ 2004-154770 |
| May 27, 2004 | (JP) | ............................ 2004-157703 |
| Jun. 8, 2004 | (JP) | ............................ 2004-169380 |

(51) Int. Cl.
*G02B 6/38* (2006.01)

(52) U.S. Cl. .............................. 385/55; 385/53; 385/56; 385/58; 385/60; 385/62

(58) Field of Classification Search ................... 385/53, 385/55, 56, 58, 60, 62, 63, 65–67, 70, 72, 385/75–78, 80, 81, 83–85, 87, 139
See application file for complete search history.

(56) References Cited

U.S. PATENT DOCUMENTS

| 3,871,744 | A | * | 3/1975 | Bridger et al. ................. 385/84 |
| 3,885,859 | A | | 5/1975 | Dalgleish et al. ........... 350/96 C |
| 3,999,841 | A | * | 12/1976 | Dakss et al. .................... 385/53 |
| 4,045,121 | A | | 8/1977 | Clark ....................... 350/96 C |
| 5,067,226 | A | | 11/1991 | Egner et al. .................... 29/452 |
| 5,694,506 | A | * | 12/1997 | Kobayashi et al. ............ 385/60 |

(Continued)

FOREIGN PATENT DOCUMENTS

EP 0 211 221 A1 2/1987

(Continued)

OTHER PUBLICATIONS

European Patent Office, *European Search Report*, Application No. EP05007613, Date Jul. 27, 2005 (6 pages).

*Primary Examiner*—James P Hughes
(74) *Attorney, Agent, or Firm*—Wood, Herron & Evans, L.L.P.

(57) ABSTRACT

An optical connecting method for optically connecting ends of a first optical fiber and a second optical fiber secured side to a first plug and a second plug, respectively, wherein the first optical fiber and the second optical fiber are threaded through the first and second plugs, and respective optical fiber is secured to respective plugs with securing parts, a bending step of bending a part of at least one of the first optical fiber and the second optical fiber that is present ahead of the securing part, an aligning step of aligning the first optical fiber and the second optical fiber and fixing a relative position between the first and second plugs, and an abutting step of abutting the first optical fiber and the second optical fiber by releasing flexure of at least one of the first optical fiber and the second optical fiber.

4 Claims, 47 Drawing Sheets

U.S. PATENT DOCUMENTS

| | | | |
|---|---|---|---|
| 5,732,174 A | 3/1998 | Carpenter et al. | 385/72 |
| 5,838,856 A | 11/1998 | Lee | 385/54 |
| 6,491,442 B1 * | 12/2002 | Murakami et al. | 385/58 |

FOREIGN PATENT DOCUMENTS

| | | |
|---|---|---|
| EP | 08240731 | 9/1996 |
| JP | 08015567 | 1/1996 |
| JP | 2000235132 | 8/2000 |
| JP | WO 2004-008214 | 7/2003 |
| WO | WO 95/08134 | 3/1995 |

* cited by examiner

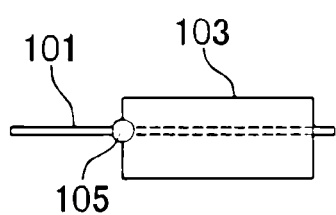
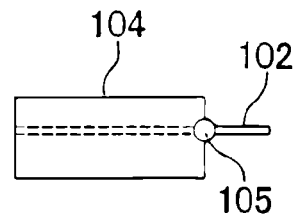
PRIOR ART
FIG.8A
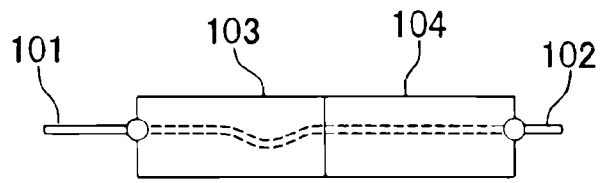
PRIOR ART
FIG.8B
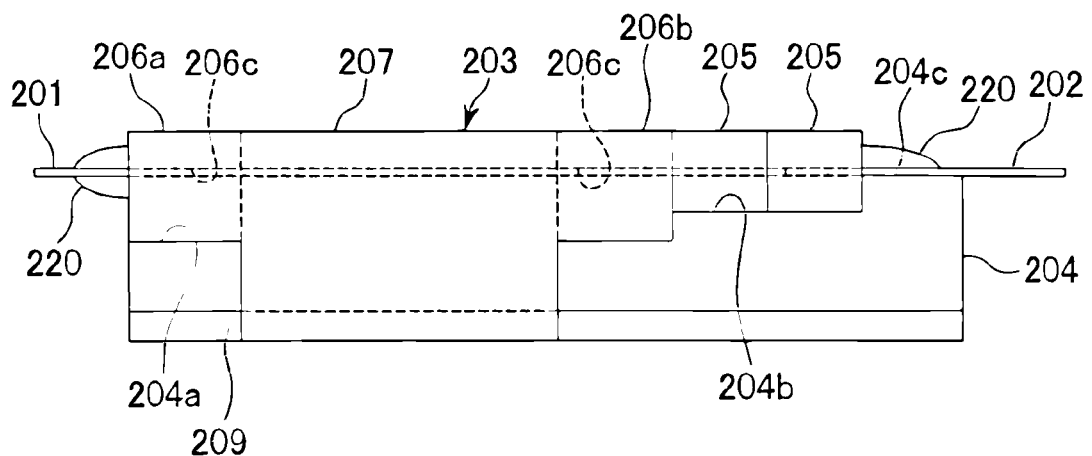
FIG.9

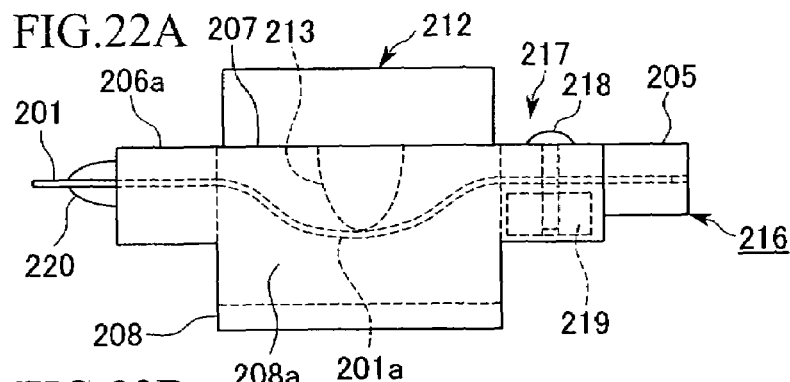
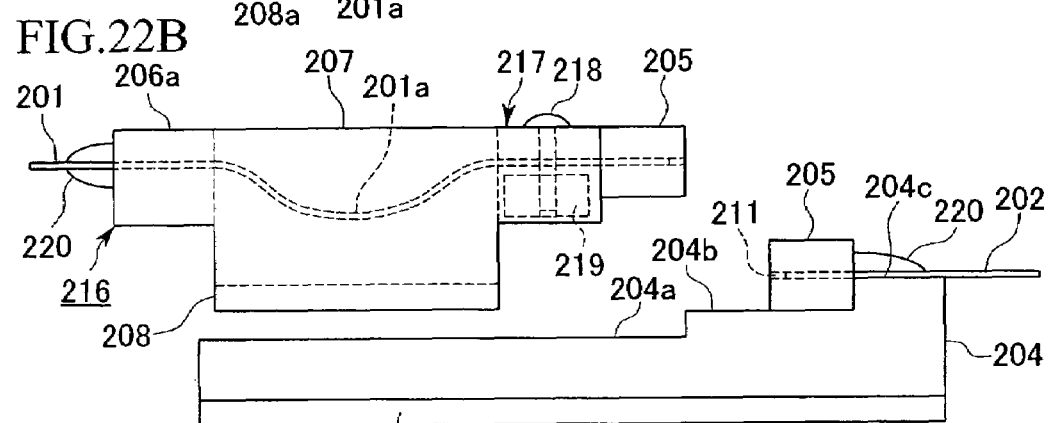
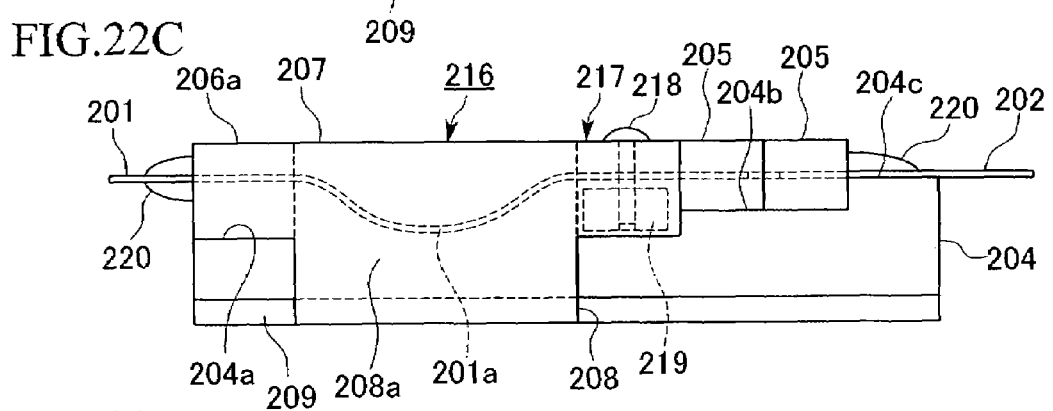
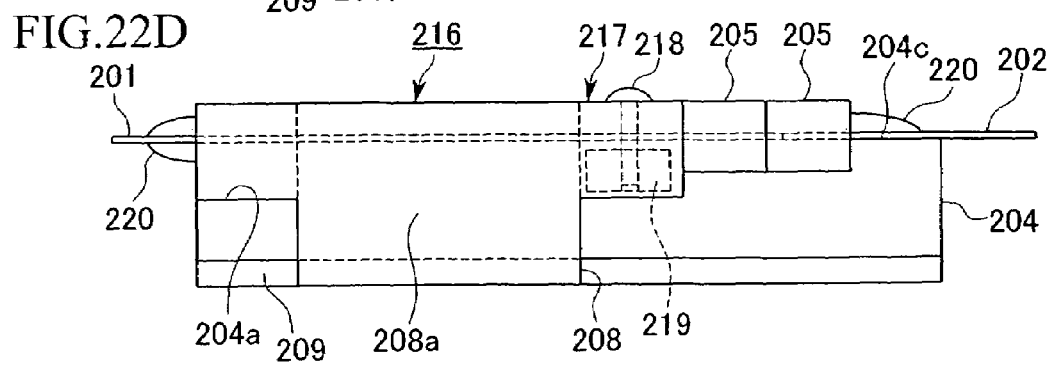

OPTICAL CONNECTING METHOD AND OPTICAL CONNECTION STRUCTURE

BACKGROUND OF THE INVENTION

1. Field of the Invention

The present invention relates to a technology of an optical connecting method that is suitable to connect a single core and multicore optical fiber. The present invention also relates to an optical connection structure and a manufacturing method for the same, and in particular, relates to a technology suitable to connect a single core and multicore optical fiber.

Priority is claimed on Japanese Patent Application No. 2004-169380, filed on Jun. 8, 2004, Japanese Patent Application No. 2004-115421, filed on Apr. 9, 2004, Japanese Patent Application No. 2004-154770, filed on May 25, 2004, and Japanese Patent Application No. 2004-157703, filed on May 27, 2004, the contents of which is incorporated herein by reference.

2. Description of Related Art

The present invention relates to a technology of an optical connecting method that is suitable to connect a single core and multicore optical fiber.

In the case of connecting optical fibers to each other by an optical connecting part, which is used for optical communications widely, and in the case of connecting optical components to each other by an optical fiber on an optical module substrate, there is a method to obtain contact force between end faces of optical fibers or between an end face of an optical fiber and the end face of an optical component from a stress that has occurred by a flexure of the optical fiber. A method shown in FIGS. 7A to 7C is known for this kind of an optical connecting method (for example, refer to Japanese Published Unexamined Patent Application, First Publication No. 08-15567). Namely, in FIGS. 7A to 7C, while a first optical fiber 101 is installed in a first plug 103 in the state which is slidable in the axial direction of the optical fiber, a second optical fiber 102 is secured by a securing component 105 to a second plug 104 (FIG. 7A). At the position where the first and the second optical fibers are aligned, the first plug 103 and the second plug 104 are secured to face each other (FIG. 7B). When a stress to move the first optical fiber in the right direction of the figure is applied thereafter, the first optical fiber 101 abuts against the second optical fiber 102, and bends (FIG. 7C). When the first optical fiber 101 is secured to the first plug 103 with the securing component 105 in this state, the state where the stress by the flexure is applied to the end face of the optical fibers is maintained, and the optical connection is completed. In the present method, however, the stress needs to be applied in order to move the first optical fiber in the right direction, but, it is not easy to give a predetermined stress and a fixed movement, and an excessive stress and movement cause a problem to damage the optical fiber. In addition, there is a need to ensure a space in the rear of the plug for the stress and the movement in the axial direction of the optical fiber. Thus the flexibility of placement of optical components connected to the optical fibers is limited, causing a problem not to be able to use the space on the optical module substrate effectively.

On the other hand, a method of FIGS. 8A and 8B is also known (for example, refer to Japanese Published Unexamined Patent Application, First Publication No. 2000-235132). In the method of FIGS. 8A and 8B, the first optical fiber 101 is secured to the first plug 103, and the second optical fiber 102 to the second plug 104 by the securing component 105. The first optical fiber 101 slightly sticks out from the end of the plug 103, and the tip of the second optical fiber in a position of the end of the plug 104 (FIG. 8A). In this state a stress is applied so that the end of the first plug 103 is brought into close contact with the end of the second plug 104 at the position where the first and the second optical fibers are aligned. Thus the optical fiber bends, and a relative position of the plug 103 and the plug 104 is secured side in this state (FIG. 8B). This method enables control over the quantity of the flexure, namely, control over the stress of the flexure by the length of the optical fiber which initially sticks out from the end of the plug, however, because the optical fibers are aligned in the state where the tip of the first optical fiber sticks out from the plug, the tip of the optical fibers is easily damaged.

As described above, in the optical connecting method to obtain the contact force between the end faces of the optical fibers from the stress that has occurred by the flexure of the optical fiber, there has been no easy connecting method to control the flexural quantity, namely, the quantity of force to the end face of the optical fiber by the flexure easily, and not to cause damage to the tip of the optical fiber when aligning the optical fibers, and without a need for space in the rear of the plug to move the optical fiber after aligning the optical fibers.

There are connectors for which types are FC, SC, MU, and LC for an optical fiber of single core connection and types such as MPO, MPX, and MTP for multicore connection. These connectors generally enable connection by abutting the fibers from the axial direction of the optical fiber. For example, in an optical connecting part of MPO type, the plugs are positioned inside an internal housing integrated in an adapter by inserting the plugs in the adapter from both sides, and MT connector ferrules held on the tips of the plugs abut against each other to be connected.

In particular, although the push-pull method that the insertion and extraction in the axial direction of the optical fibers are easily performed has been suggested, because in the push-pull connector the optical fibers are inserted and extracted in the axial direction of the connected optical fibers, it is easy to connect the optical fibers when connecting to the adapter which is installed in a device wall such as a backplane.

Moreover, in a conventional optical connection structure, when a connector is used for optical fiber connection on a printed board (for example, a motherboard) or in a device, the optical fibers are in many cases connected to each other by mounting the optical connecting part on the tip of the optical fiber connected to various optical components and optical modules. In that case, the optical fiber may be inserted and extracted while the optical fiber connected to an optical component or an optical module bends in order to carry out the insertion and extraction.

On the other hand, as a technology related to this kind, it has been proposed that a connection means for connecting a pair of the abut tips of the optical fibers by abutting them against each other comprises a base formed in a center of the top surface and a cover attached to the top surface side of this base (for example, refer to Japanese Published Unexamined Patent Application, First Publication No. 08-240731 (pages 2 to 4, FIG. 1 to FIG. 3)).

However, in the conventional optical connection structure, when inserting and extracting the optical fiber while the optical fiber connected to an optical component and an optical module bends, there is a concern that an excessive force by flexure acts on a fixed point of the optical module of the optical fiber so that the securing part is damaged.

In addition, in the conventional optical connection structure body, a field of vision of a worker to the insertion and extraction direction becomes inferior. Therefore, working hours are lengthened, and when inserting, there is a concern that the optical fiber breaks a ferrule end and touches a sleeve and a shaft for a guide to cause fracture or damage. Furthermore, other devices cannot be placed freely or cannot even be installed because there is a need to ensure a space for inserting and extracting the connector, thus the space on the substrate cannot be used effectively.

Furthermore, in the conventional optical connection structure body, the detachment direction is not stable, and the connector of the optical fiber comes in contact with peripheral components in reaction so that there is a concern that the optical fiber or the peripheral components are damaged. Also, when a latch mechanism is used to shorten connection times and to improve a connection workability because the latch mechanism simplifies the detachable movement, the latch engages at the time of the insertion and removal to maintain the pressing strength applied on the ferrule with stability. However, the structure becomes complicated and the number of components increases with this method, so that great time and expense are necessary for a design of the optical connecting part, causing an increase in costs.

On the other hand, there has been no consideration in Japanese Published Unexamined Patent Application, First Publication No. 08-240731 appropriately extending the optical fiber to be connected after bending.

Conventionally in an optical circuit structure comprising a plurality of optical function components, a light transmitting medium, and an optical connecting part, the optical function components are connected mutually by connecting the optical circuit on a substrate or in a package of another optical circuit or a light transmitting medium. As this kind of method to connect the light transmitting medium to another light transmitting medium, there are fusion splicing, a mechanical splicer, and an optical connecting part (for example, refer to Japanese Published Unexamined Patent Application, First Publication No. 08-240731 (pages 2 to 4, FIGS. 47 to 49)).

Moreover, among various connecting methods described above, the fusion splicing and the mechanical splicer need to attach a light transmitting medium such as an optical fiber to a connection device in assembling and maintenance checks of the optical circuit. On this account an extra length becomes necessary for the light transmitting medium, and thereby extra length of the light transmitting medium, the light transmitting medium is bulky on the motherboard or in the device, and an excessive space is necessary, causing a problem that the size of the optical circuit increases.

In addition, the optical connecting part is mounted on the light transmitting medium of the optical circuit, so that when the light transmitting medium is drawn from the optical connecting part and the optical circuit, a great stress is applied to the light transmitting medium because the position relationship between the optical connecting part and the light transmitting medium is not fixed, thus there is a concern for damage.

Furthermore, because the fusion splicing and the mechanical splice are mainly used as a permanent connection, when the optical circuit is checked on the printed board (for example, a motherboard) or in the device, mating and demating are impossible, thus it is difficult to perform a maintenance check of the optical function components individually. On this account when there is a malfunction in the optical circuit, it is necessary to change the printed board or even the whole device, causing a problem economically.

Furthermore, a large reinforcement sleeve is necessary for joint protection in the fusion splicing, and the splicer size is large in the mechanical splice. Furthermore, an optical connecting part of a current push-pull type is large in size. Thus, a large installation space is necessary by these connecting methods to ensure space for the insertion and extraction, causing a need to consider placement of another module.

There is a method that the optical connecting part of the push-pull type is mounted on the substrate end and that the substrate is inserted and extracted in parallel to the substrate surface, although, when a small module substrate is mounted on a large-sized printed board such as a motherboard, the substrate needs to be horizontally moved when connecting optically, and a wider range of work space for connection is necessary. Thus, there is a problem that the space cannot be used effectively due to the mentioned causes. Furthermore, when the substrate is hard and cannot be transformed, it becomes difficult to attach the optical connecting part to opposite sides of the substrate for connection, causing limitation in the design of the optical circuit.

SUMMARY OF THE INVENTION

The present invention proposes an optical connecting method and an optical connection structure that solve these problems.

A first optical connecting method of a first aspect of the present invention to solve the above problem is an optical connecting method for optically connecting by abutting ends of a first and a second optical fibers against each other, optical fibers being secured to a first plug and a second plug, having the following four steps shown in FIGS. 1A to 1D. The four steps include an optical fiber securing step of threading the first optical fiber 101 and the second optical fiber 102 through the first plug 103 and the second plug 104, respectively, and optical fibers are secured to the plug with the securing component 105 (FIG. 1A), a bending step of bending a part of the first optical fiber 101 forward of the securing component 105 (FIG. 1B), an aligning step of aligning the first and the second optical fibers and fixing a relative position between the first and the second plugs (FIG. 1C), and an abutting step of releasing the flexure of the first optical fiber 101 and abutting the first and the second optical fibers (FIG. 1D). In FIGS. 1A to 1D, it is only the first optical fiber that bends, however, the second optical fiber may bend or two optical fibers may bend. Furthermore, the scope of the present invention covers an optical waveguide that can be bent or extended like optical fibers.

In the bending step, the first optical fiber is bent by applying a force to the first optical fiber from the side thereof. The flexure of the first the optical fiber can be opened by stopping the application of this force in the matching step. In this way a pressing member to press the top of the plug is detachably mounted to apply force to the optical fiber from the side thereof, thereby it is possible to apply force and stop the application of the force.

In addition, in the aligning step, the aligning step becomes easy by using an aligning member. A V-shaped groove, a through-hole, and a guide pin for alignment can be used for the aligning member.

In addition, in the aligning step of the present invention, a method for fixing the relative position between the first and the second plugs can be adopted by securing the first and the second plugs in an adapter. For the adapter, the top face thereof is opened so that a plug can be attached from above as the reference numeral 109 shown in FIGS. 3A to 3E which will be described later is preferable.

The second optical connecting method of the first aspect of the present invention is the case where the first optical fiber and an optical component are connected directly, in other words, the case where the second optical fiber does not exist among them. An outline of the method is shown in FIGS. 2A to 2D. The reference numeral 120 in FIGS. 2A to 2D denotes the optical component such as a laser module, and other reference numerals are the same as in FIGS. 1A to 1D. This method also has four steps, the four steps include an optical fiber securing step of threading the first plug 103 through the first optical fiber 101 and the first optical fiber 101 to the plug 103 with the securing component (FIG. 2A), a bending step of bending a part of the first optical fiber 101 forward of the securing component (FIG. 2B), an aligning step of aligning the first optical fiber and the optical component 120 and fixing a relative position between the first plug 103 and the optical component 120 (FIG. 2C), and an abutting step of releasing of the flexure of the first optical fiber 101 and abutting the first optical fiber and the optical component 120 (FIG. 2D). A laser module, a light receiving element, various kinds of lens, a polarizing plate, a wave plate, and an optical waveguide can be used for the optical component.

In the optical connecting method of the present invention, the contact force between the end faces of the optical fibers is acquired from a stress that has occurred by the flexure of the optical fiber. Because the magnitude of the stress can be controlled by, for example, the length of the first optical fiber 101 sticking out from the plug 103 in FIG. 1A, an excessive stress can be prevented so that the optical fiber can be prevented from being damaged.

In the optical connecting method of the present invention, when aligning the optical fibers to each other, because the end of the optical fiber does not stick out from the plug as shown in FIGS. 1B and 1C, the optical fiber can be prevented from being damaged at the time of aligning. In addition, in the present invention, the optical fiber does not have to apply a stress to the axial direction of the optical fiber from the rear of the optical fiber when abutting the optical fibers. Therefore, a space on the optical module substrate can be used effectively because there is no need for the space in the rear of the plug for this purpose.

The second aspect of the present invention was conceived in consideration of the circumstances mentioned above, and is aimed at providing the optical connection structure wherein assembling is easy when the optical fibers are connected to each other, that the work for connection can be easily performed without damaging the fixation point of the optical fiber on the optical component or the optical module, and that the space on the substrate can be used effectively.

The second aspect of the present invention suggests the following means to achieve the above purpose.

The first invention of the second aspect of the present invention is the optical connection structure wherein the ends of the optical fibers are abutted against each other to be connected on the adapter of which the top surface is opened to above, wherein the first optical fibers are threaded through the plug attached to the adapter, the end portion of the first optical fiber bends as a bending part in the plug, a part of the first optical fiber rearward of the bending part is secured to the plug, the second optical fibers secured on the adapter, the plug is mounted at the position facing the second optical fiber in the adapter, and the bending part of the first optical fibers are released so that the end of the first optical fibers are abutted against the second optical fiber. Upon abutting, the flexure may or may not remain in the optical fiber.

Thereby, in connection of the optical fibers on the printed board and in the device, the first optical fibers are secured to the plug to be a securing part, the bending part is formed at the front end side from the securing part, and the second optical fibers are secured on the adapter beforehand. Because after the plug is attached to the adapter, the work for connection between optical fibers by moving the end of the first optical fiber in the direction of the second optical fibers is performed, there is no concern of damage occurred by a shock of sudden contact between the optical fibers, thus the work for connection can be easily performed safely.

In the optical connection structure of the second aspect of the present invention, the plug may have a bending cell as a space for housing the bending part of the first optical fiber, and one end of the plug may have an optical-fiber threading part which a part of the first optical fiber rearward of the bending part is threaded through and secured to.

Thereby, because the optical fibers are threaded through the optical threading part of the plug and the end of the optical fiber bends in the bending cell, the bending part of the optical fiber can be favorably formed.

In the optical connection structure of the second aspect of the present invention, the first optical fiber may be pressed to the plug to form the bending part by a detachably mounted pressing jig.

Thus the bending part of the optical fiber can be formed by the pressing jig mounted on the plug, and because the bending part of the optical fibers are opened by removing the pressing jig from the plug, the bending part can be extended easily, and the formation and opening of the bending part can be favorably performed.

In the optical connection structure of the second aspect of the present invention, the first optical fiber is threaded through the plug, the slide member slidably attached in the axial direction of the optical fiber, the bending part is formed based on the sliding of the slide member, and the bending part may be opened.

Thus, the bending part is formed at the optical fiber and opened by moving the slide member in the plug, therefore, the formation and opening of the bending part can be favorably performed.

In the optical connection structure of the second aspect of the present invention, when the slide member is mounted in the state where the first optical fiber is threaded through the plug, an axis of the secured side of the optical fiber and an axis of the end side may be vertically misaligned.

Thus, when the slide member can reliably form the bending part of the optical fiber reliably and the bending part is opened, the bending part extends by its elastic restoring force, the end of the first optical fiber can be moved to the second optical fiber.

In the optical connection structure of the second aspect of the present invention, the bending part of the first optical fiber is held, and a temporary securing member to release the holding the bending part may be provided on the plug.

Thus, because the temporary securing member holds and releases the bending part of the optical fiber, holding and release of the bending part can be performed from the outside of the plug.

In the optical connection structure of the second aspect of the present invention, as for the temporary securing member, a pressing board may be vertically slidably mounted on upper supporting member of the plug with a screw.

Thereby, the bending part of the optical fiber can be held by sandwiching the optical fiber between the top supporting member and the pressing board, and because the bending part can be released by releasing sandwiching of the optical fiber the structure can be easily constituted.

In the optical connection structure of the second aspect of the present invention, the plug may be detachably placed in the intersection direction against the top surface of the adapter.

Thus, when the plug is detached in the intersection direction on the top surface of the adapter, an abrupt bend of the optical fiber does not occur at an installation part of the optical module or an edge of the optical component, therefore, the installation part is not damaged.

According to the second aspect of the present invention, an effect that the bending part of the optical fibers can be favorably formed is acquired.

According to the second aspect of the present invention, because the bending part of the optical fibers are formed by the pressing jig and the bending part is opened by the pressing jig, an effect that the formation and releasing of the bending part are favorably performed is provided.

According to the second aspect of the present invention, because the bending part of the optical fibers is formed and the bending part is opened by the slide member, an effect that the formation and releasing of the bending part are favorably performed is provided.

According to the second aspect of the present invention, when the bending part is opened by the slide member, the bending part extends by its elastic restoring force, and the end of the optical fiber can be moved to the second optical fiber, thereby an effect that connection between the optical fibers is favorably performed is provided.

According to the second aspect of the present invention, an effect that the temporary securing member can hold and open the bending part from the outside of the plug is provided.

According to the second aspect of the present invention, the bending part of the optical fiber can be held by sandwiching the optical fiber between the upper supporting member and the pressing board, and the bending part can be released by releasing the holding, therefore, the structure can be easily constituted.

According to the second aspect of the present invention, an abrupt bend of the optical fiber does not occur at an installation part of the optical module or an edge of the optical component, therefore, the installation part is not damaged, and an effect that the reliability as an optical connection structure is enhanced is acquired.

According to the second aspect of the present invention, the first optical fiber can be bent, and the end of the first optical fiber is advanced by releasing the flexure to be abutted against the end of the second optical fiber to form an optical connection, therefore, an effect that the optical connection structure can be easily made is acquired.

According to the second aspect of the present invention, the first optical fiber can be bent, and the end of the first optical fiber is advanced by releasing the flexure to be abutted against the end of the second optical fiber to form an optical connection, therefore, an effect that the optical connection structure can be easily carried out is provided.

According to the second aspect of the present invention, the pressing jig forms the bending part of the first optical fiber, therefore, an effect that the formation of the bending part can be easily performed, and the work for connection can be carried out promptly is acquired.

According to the second aspect of the present invention, the slide member forms the bending part of the first optical fiber, therefore, an effect that the formation of the bending part can be easily performed, and the work for connection can be carried out promptly is acquired.

According to the second aspect of the present invention, it is constituted that the plug can be mounted on the adapter without coming in contact with peripheral components, not only is there no concern to damage peripheral components, but also the optical fiber itself is not damaged, therefore, an effect that the optical connection structure can be favorably made is acquired.

The third aspect of the present invention was conceived in consideration of such circumstances, and is aimed at providing the optical connection structure wherein assembling is easy when the optical fibers are connected to each other, that the work for connection can be easily performed without damaging the fixation point of the optical fiber on the optical component or the optical module, and that the space on the substrate can be used effectively.

To achieve the above object, according to the third aspect of the present invention, an optical connection structure wherein the first and the second optical fibers are optically connected by abutting the ends of the optical fibers to each other in an alignment groove on the adapter that has the alignment groove of which the top surface is opened is provided, wherein a pin-shaped lead member is held by the plug mounted on the adapter, the first optical fiber is threaded through the plug, the end portion of the first optical fiber bends as a bending part in the plug, a part of the first optical fiber rearward of the bending part is secured to the plug, after the second optical fiber is installed in the alignment groove, the plug is mounted on the adapter, the ends of the first and the second optical fibers are pressed by the pin-shaped lead member from the up-and-down direction to be closedly-contacted and supported by the alignment groove, the bending part of the first optical fiber is extended, and the end of the first optical fiber is abutted against the end of the second optical fiber.

In addition, according to the third aspect of the present invention, an optical connection structure wherein the first and the second optical fibers are optically connected by abutting the ends of the optical fibers to each other in an alignment groove on the adapter that has the alignment groove of which the top surface is opened is provided, wherein a pin-shaped lead member is held by the first and the second plugs mounted on the adapter, the first and the second optical fibers are threaded through the first and the second plugs, respectively, an end portion of the first optical fiber bends as a bending part in the plug, a part of the first optical fiber rearward of the bending part is secured to the plug, the first and the second plugs are mounted on the adapter, the ends of the first and the second optical fibers are pressed by the pin-shaped lead member from the up-and-down direction to be closedly-contacted and supported by the alignment groove, the bending part of the first optical fiber is extended, the end of the first optical fiber is abutted against the end of the second optical fiber.

In addition, according to the third aspect of the present invention, an optical connection structure wherein the end of the first optical fiber and an optical junction surface of an optical component are optically connected by abutting them to each other on the adapter that has the alignment groove of which the top surface is opened is provided, wherein a pin-shaped lead member is held by the plug mounted on the adapter, the first optical fiber is threaded through the plug, an end portion of the first optical fiber bends as a bending part in the plug, a part of the first optical fiber rearward of the bending part is secured to the plug, the optical component is aligned with the alignment groove of the adapter and is installed on the adapter, the plug is mounted on the adapter, the end of the first optical fiber pressed by the pin-shaped lead member from the up-and-down direction to be closedly-contacted and supported by the alignment groove, the bending part of the first optical fiber is extended, and the end of the first optical fiber is abutted against the optical junction surface of the optical component.

It is preferable for the plug only that the plug has a bending cell as a space for housing the bending part of the first optical fiber, and that one end of the plug has an optical-fiber securing part to which a part of the optical fiber rearward of the bending part is secured. In addition, while the first optical fiber is pressed to form the bending part, it is preferable that the fiber flexion member, pressing jig, in other words, which forms and releases the bending part is detachably installed to the plug.

It is preferable that the pin-shaped lead member is held by an mounting hole or an installation groove which the plug has. It is preferable that a pressing fixation member pressing the pin-shaped lead member from the up-and-down direction is mounted on the adapter. It is only essential that the pin-shaped lead member is a cylindrical shape or a polygon shape. It is only essential that the plug can be detachably placed perpendicular to the top surface of the adapter. It is only essential that the plug and/or the pressing fixation member is secured to the adapter by the engagement member.

According to the third aspect of the invention, an effect that the optical fibers are reliably inserted in the alignment groove by the pin-shaped lead member reliably and is brought into close contact, and that the optical fibers can be aligned with each other is acquired.

In addition, because it is constituted so that the plug having the first optical fiber in which the bending part is formed is mounted on the adapter, and the optical fibers are abutted against each other to form an optical connection by opening the bending part of the first optical fiber to extend the bending part, assembling is easy, and the work for connection can be easily performed without damaging the fixation point of the optical fiber in the optical component or the optical module. Furthermore, space on the substrate can be used effectively, and therefore yields are improved, and the efficiency of the work for connection is improved.

The fourth aspect of the present invention was conceived in consideration of the aforementioned conventional problems, and is aimed at providing the optical connection structure wherein assembling is easy when the optical circuits which consist of the optical connection structure are connected to each other, that a worker does not damage the light transmitting medium, that work for connection can be performed without a burden, that the optical circuits can be checked and replaced individually in a maintenance check, and that the space on the substrate can be used effectively.

The fourth aspect of the present invention adapts the following means to solve the problems.

In other words, the first invention of the fourth aspect of the present invention is an optical connection structure having one optical fiber which is wired to one substrate, another optical fiber which is wired to another substrate, and a connection means to connect the one optical fiber and the other optical fiber, wherein the connection means has a plug mounted on the one optical fiber and an adapter, which is mounted to the other optical fiber and by relatively approaching the plug to the adapter from above and bottom direction to be connected to both of the optical fibers are positioned to be optically connected.

In the optical connection structure of the fourth aspect of the present invention, at least either one of the optical fibers is mounted on the adapter at the state of flexion, after the plug is connected to the adapter and both of the optical fibers are positioned, by extending the bending part of the optical fiber, both of the optical fibers may be optically connected. In addition, the present invention includes the case where the bending part of the optical fiber partially remains.

In the optical connection structure of the fourth aspect of the present invention, both of the optical fibers are aligned by an aligning means consisted of a groove or a through-hole.

In the optical connection structure of the fourth aspect of the present invention, the plug may be secured on one substrate so that a part of the plug is located outside the substrate.

As described above, according to the optical connection structure of the present invention, when manufacturing an optical connection structure by optically connecting the optical circuit of the one optical fiber and the optical circuit of the other light transmitting to each other, the plug and the adaptor of the connecting means are relatively approached and connected, in this state, the one circuit and the other circuit are relatively allowed to be approached, therefore, the both optical circuits can be optically connected. Accordingly, assembling can be easily performed. In addition, it is not necessary to draw the optical fiber out more than the substrate, the optical fiber is not damaged, and the work for connection can be performed without burden. Furthermore, the optical circuits can be checked and replaced individually during maintenance checks. Furthermore, a space on the substrate can be used effectively. As a result, a yield can be improved, and the efficiency of the work for connection can be largely enhanced.

BRIEF DESCRIPTION OF THE DRAWINGS

FIG. 3B shows an optical fiber securing step, FIG. 3C shows a bending step, FIG. 3D shows an aligning step, and FIG. 3E shows an abutting step.

FIGS. 8A and 8B is a schematic view showing another example of a conventional technique.

FIG. 9 is an illustration showing the optical connection structure of the first embodiment of the second aspect of the present invention.

FIG. 20A is a perspective view for explaining the plug, FIG. 20B is a side view of the plug.

FIGS. 22A to 22D are illustrations showing an example of the method for manufacturing the optical connection structure shown in FIGS. 20A and 20B.

DETAILED DESCRIPTION OF THE INVENTION

First Aspect

The first aspect of the present invention is concretely described with reference to FIGS. 3A to 3E. FIGS. 3A to 3E show an example which can carry out best an optical connecting method of the first aspect of the present invention which connects the second optical fiber 102 to the first optical fiber 101. However, the present invention is not limited to this embodiment. In addition, actually, a part inside the plug of the optical fiber in the figures cannot be viewed from the front outside, however, it is drawn by a solid line for convenience.

Figure 1A:
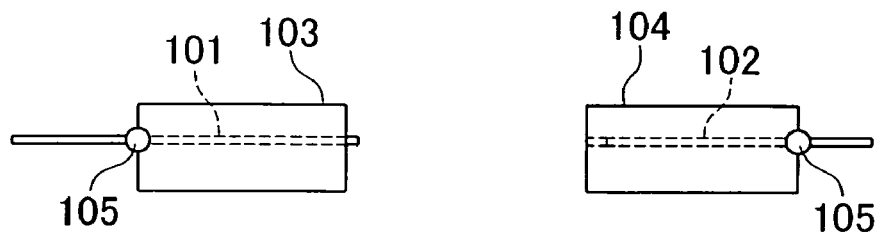
FIGS. 1A to 1D are schematic views showing an example of an optical connecting method of the first aspect of the first aspect of the present invention.
Figure 1B:
Figure 1C:
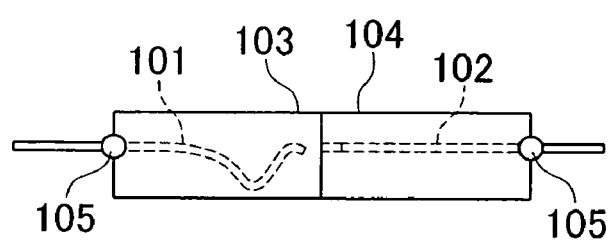
Figure 1D:
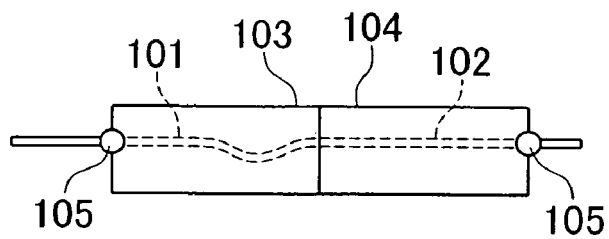
Figure 2A:
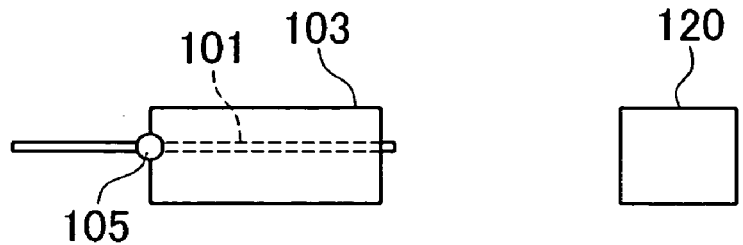
FIGS. 2A to 2D are schematic views showing another example of the optical connecting method of the first aspect of the present invention.
Figure 2B:
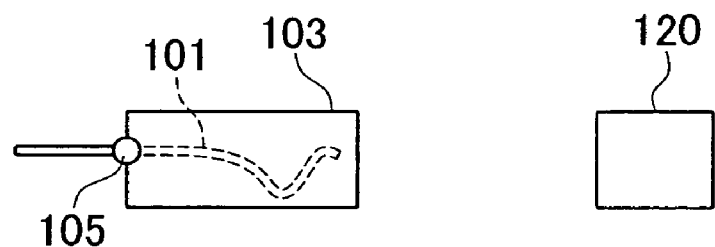
Figure 2C:
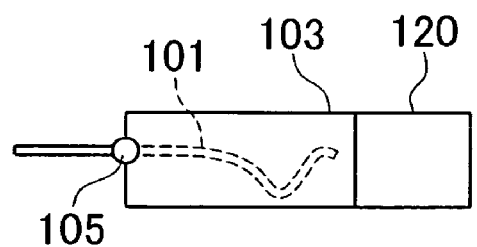
Figure 2D:
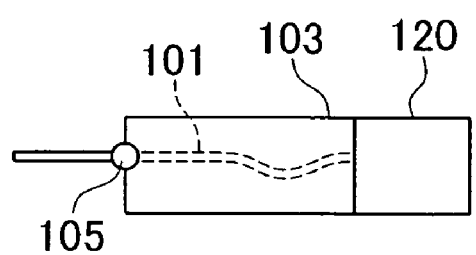
Figure 3A:
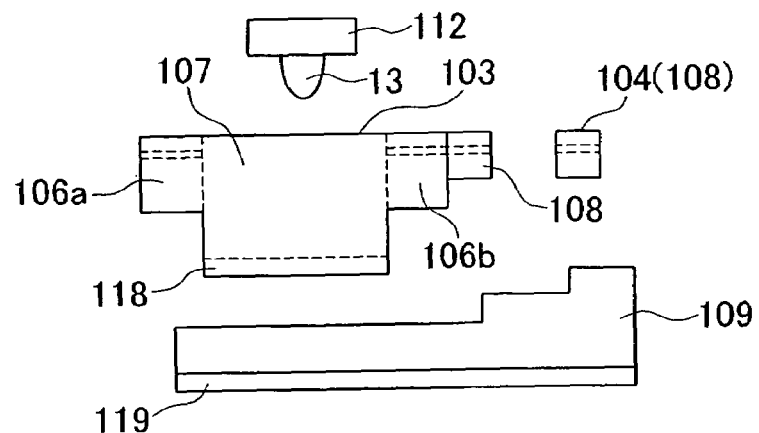
FIG. 3A is a plan view (a front view) showing members used for an example of an embodiment of the optical connecting method of the first aspect of the present invention.

FIG. 3A shows members used in the present embodiment. The first plug 103 has an aligning member 108 (a member having a through-hole) and an optical fiber threading part 106b forward, a bending cell 107 providing a space where an optical fiber bends toward the center, and an optical-fiber threading part 106a backward. In addition, a pressing member 112 pressing the optical fiber from the side can be mounted on the upper part. A curved surface 13 is a part which contacts and presses the optical fiber directly. On the other hand, a second plug 104 is comprised of an aligning member 108 (a member having a through-hole). An adapter 109 is constructed so that the top face is opened, and two plugs are mounted and secured from above. A part 118 of the first plug and the adapter 119 are fitted to each other like a latch and a latch engaging part. A plug 103, adapter 109, and a pressing member 112 are made of an ABS resin. In addition, an aligning member 105 cuts an eight-wire MT ferrule, and the end thereof is only used.

Figure 3B:
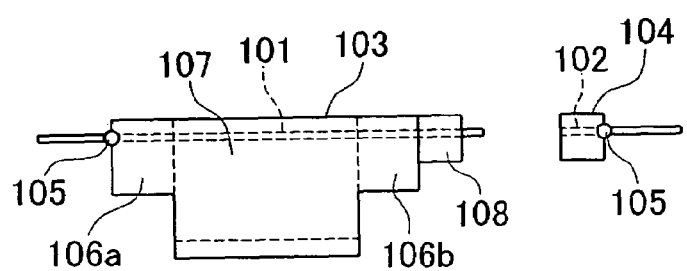
FIGS. 3B to 3E are plan views (front views) showing an example of an embodiment of the optical connecting method of the first aspect of the present invention.

FIG. 3B shows an optical fiber securing step. As the first and the second optical fibers, two optical fibers in which 15 mm of the coating of the silica (quartz) optical fiber of 250 μm in diameter are removed from the end, and optical fiber conductors (125 μm in diameter) are cut at 10 mm from the coating end are used. First a front end of the first optical fiber 101 is threaded from the optical-fiber threading part 106a on the left side of the first plug 103, via the bending cell 107 and the optical-fiber threading part 106b at the right side to the aligning member 108. The optical fiber 101 is secured to the plug 103 with the securing component 105 thereafter. The second optical fiber 103 is threaded through the plug 104, and secured with the securing component 105 (FIG. 3B). Adhesive, etc., is used for fixation of the optical fiber to the plug.

Figure 4:
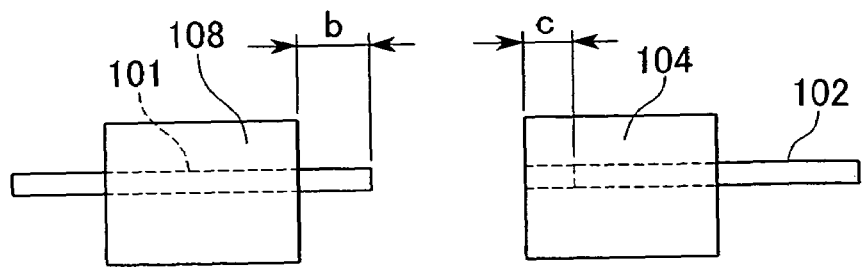
FIG. 4 is a schematic view showing an extrusion length and a retraction length of a fixed optical fiber in an optical fiber securing step of the optical connecting method of the first aspect of the present invention.

FIG. 4 is an enlarged view showing the optical fibers secured to the plugs. The second optical fiber 102 is made not to stick out from the plug 104, rather the end of the optical fiber is retracted inside compared with the end of the plug. The first optical fiber 101 sticks out from the aligning member 108 of the front end of the first plug. A sticking out length (b in FIG. 4) is longer than the distance (c in FIG. 4) which is from the end of the second optical fiber 102 to the end of the second plug 104 by a length "a". Namely, a=b−c. This length "a" decides a flexural quantity of the optical fiber in the optical connection and a stress to the end face of the optical fiber. The length "a" will be mentioned later.

Figure 3C:
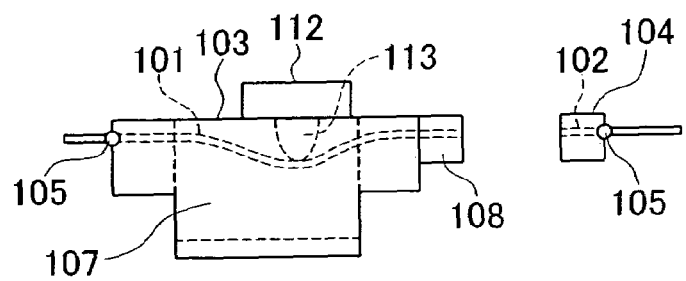

FIG. 3C shows the bending step. In the bending step, a pressing member 112 is installed on the plug 103 so that a curved surface 113 of the pressing member 112 enters in a bending cell 107, the curved surface 113 adds a pressing force to the optical fiber 101 in the bending cell 107 downwards, thereby allowing the optical fiber 101 to bend in the bending cell 107 to form a bending part (FIG. 3C). The end of the first optical fiber which is projected from the first plug is retracted into the inside of the plug.

Figure 3D:
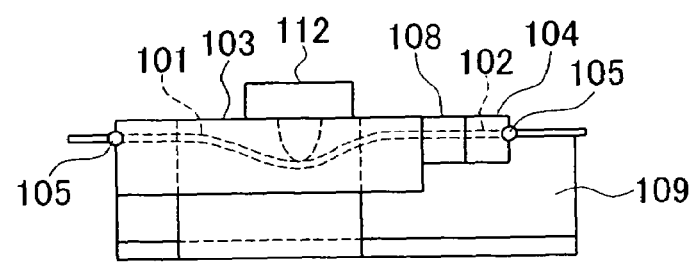
Figure 5:
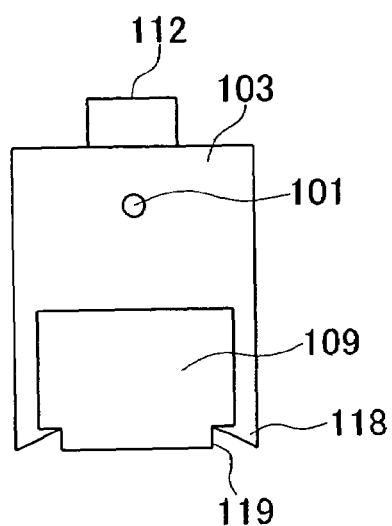
FIG. 5 is a plan view (a side view) showing an example of a fitted structure between a plug and an adapter in the optical connecting method of the first aspect of the present invention.

FIG. 3D shows the aligning step. In the aligning step, the first plug 103 and the second plug 104 are installed in the adapter 109 from above. The plugs 103 and 104 are secured to the adapter after aligning the plugs between the aligning members of the plugs 103 and 104 (FIG. 3D). Thus, all members are secured. Only a part forward from the securing component 105 of the first optical fiber 101 can move in the axial direction of the fiber. In addition, securing the plugs is performed by a fitted structure of 118 and 119 or adhesive. FIG. 5 shows an example of the fitted structure of 118 and 119, and is the figure when FIG. 3D is viewed from the side. The fitted structure of 118 and 119 is not limited to this.

Figure 3E:
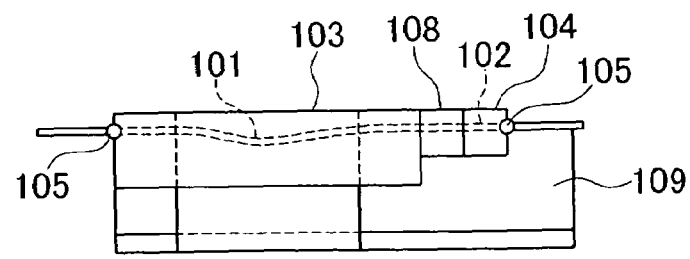

FIG. 3E shows the abutting step. In this process, the pressing member 112 is pulled out upwards and removed from the bending cell 107 of the plug 103. The optical fiber 101 which bends is extended to the end side by its elasticity and inserted into the through-hole of the plug 104, thereby contacting the end face of the second optical fiber 102 inside the plug 104. The optical fiber 101 does not completely extend and the flexure is partially left, so that a stress is applied to the end face of the optical fiber 102 (FIG. 3E). Thus the optical connection between the optical fibers is completed. According to the above-mentioned embodiment, the optical fiber 101 can be bent only by a simple jig without providing a particular device to the plug 103, and the end of the optical fiber 101 can be moved, the optical connecting method can be simplified.

Next, the length "a" (namely, b−c in FIG. 4) which is mentioned above will be described. An appropriate length "a" depends on the kind of the optical fiber and the length of flexion. When the length of the bending part of the optical fiber is 7 mm with a silica (quartz) glass optical fiber of 250 μm in diameter, it is preferable that "a" is 20 μm or more and 300 μm or less. The end of the optical fiber does not leave even if unevenness in the optical fiber is appropriately ±20 μm, and the optical fiber can be connected without damaging the optical fiber by setting the length "a" in this range. A more favorable length "a" is 40 μm or more and 150 μm or less. The flexure which produces an appropriate stress can be acquired, and an increase in bending loss by excessive flexure of the optical fiber can be suppressed by setting a in this range. The favorable length of "a" which is mentioned above becomes longer and a preferable range of "a" becomes wide when the bending part of the optical fiber is longer than 7 mm. That a favorable range of "a" becomes wide means that the necessary precision of an initial cutting length of the fiber becomes reduced, and the optical connection becomes easy. In addition, it is necessary to choose a appropriately according to the optical fiber for use and specifications of a needed insertion loss because a radius of curvature of rupture bending of the optical fiber and a bending loss characteristic are different according to materials of the optical fiber.

In the above-described embodiment (FIGS. 3A to 3E), the optical fiber is secured to the plug, but the ferrule to which the optical fiber is secured may be secured to the plug. In addition, the second optical fiber 102 is secured to the plug 104, and the plug 104 is secured to the adapter 109 subsequently, but the optical fiber 102 may be secured to the adapter 109 after the plug 104 is installed to the adapter 109.

In addition, a refractive index adjusting agent is applied between both the optical fibers 101 and 102 beforehand, and the optical fibers may be connected by PC (Physical Contact) by abutting. Application of a refractive index adjusting agent increases the reliability of the optical connection. When a refractive index adjusting agent is used, material, form, and installation method are not limited in particular. The material can be chosen according to the refractive index and the material of the optical fiber appropriately, and, for example, silicone oil and silicone grease are used preferably. In addition, the form of the refractive index adjusting agent may be solid or liquid, and may be, for example, in a form of oil, grease, gel, or film.

The optical fiber used for the optical fiber connector of the present invention is chosen and used depending on an application purpose of the optical fiber connector, for example, a single mode optical fiber of silica (quartz) or a plastic, or a multi-mode optical fiber are desirably used. In addition, the number of optical fibers connected at a time is not limited. Depending on the number of the optical fibers, the plug and the adapter are designed appropriately.

Not only plastic such as ABS but also ceramic, metal, zirconia, and glass metal can be used for the material of the plug and the adapter used in the optical connecting method of the embodiment mentioned above. In addition, the form is not limited in particular as long as it is reliably secured to the adapter for securing the plug.

In addition, although the through-hole member is used as the aligning means of the optical fiber, other aligning means can be used such as methods for aligning the optical fiber in a groove as long as the optical fiber can be aligned easily. In addition, plastic, ceramic, metal, zirconia, glass, and metal are preferably used for materials of the aligning member of the optical fiber.

In addition, in the above embodiment, a method for pressing the side of the optical fiber is used as a means for applying flexure to the optical fiber, but it is not limited to this method. In addition, the pressing member 112 applying flexure is not limited to the shape shown in FIG. 3A, but any shape that can bend the optical fiber 101 without damage. However, it is preferable to push the side of the optical fiber by the curved surface which is equal to or more than a radius of curvature where the optical fiber 101 is damaged. Materials of the pressing member 112 are not limited, however, the hardness thereof preferably prevents deformation by repulsion of the optical fiber 101 so that the flexural shape is uniquely fixed when equipped to the plug 103. Furthermore, it is preferable that the surface has a sliding property to bend the optical fiber 101 smoothly without strain.

Figure 6:
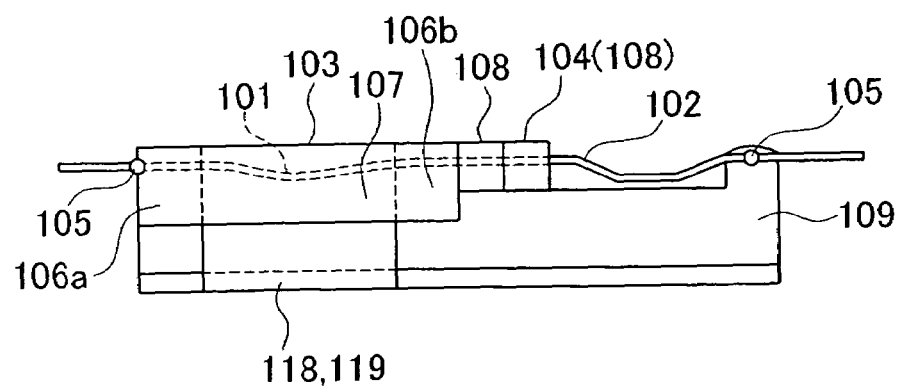
FIG. 6 is a plan view (a front view) showing another example of an embodiment of the optical connecting method of the first aspect of the present invention.
Figure 7A:
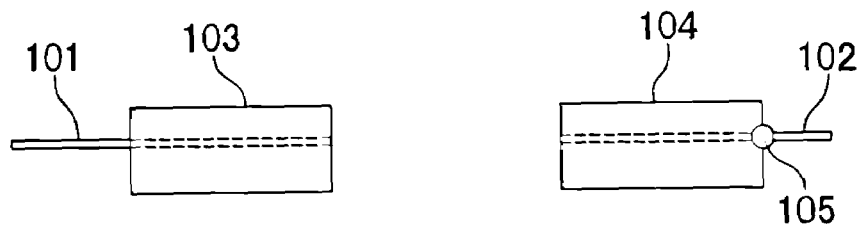
FIGS. 7A to 7C are schematic views showing an example of a conventional technique.
Figure 7B:
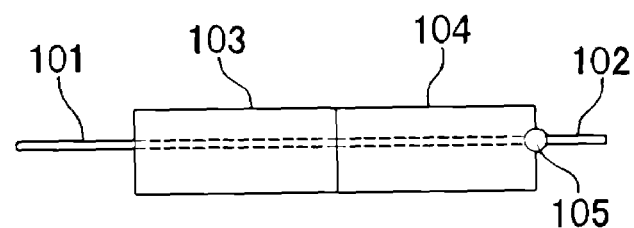
Figure 7C:
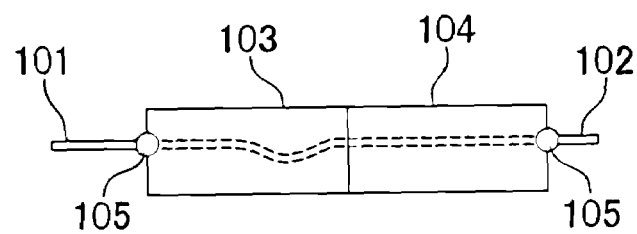

Another example of the optical connecting method of the first aspect of the present invention will be described with reference to FIG. 6. FIG. 6 is an example that both of the first optical fiber 101 and the second optical fiber 102 are abutted with flexure to be optically connected, and shows a time of completion of the optical connection. The first optical fiber 101, the second optical fiber 102, the first plug 103, the second plug 104, and the aligning member 108 used here are the same as used in the previous example (FIG. 3A). The adapter 109 is different from the previous example in shape, and the distance from a place to which the second plug 104 is secured to an edge of the adapter 109 is longer, and the place where the second optical fiber 102 can bend is ensured. In addition, a pressing member for bending the first optical fiber 101 is the same as the pressing member 112 of FIG. 3A. That the first plug 103 and the adapter 109 have a fitted structure of 118 and 119 like a latch and a latch engaging part is similar to the example of FIG. 3A.

Steps to reach FIG. 6 are simply described. First, a front end of the first optical fiber 101 is threaded from the optical-fiber threading part 106a at the left side of the first plug 103, via the bending cell 107 and the optical-fiber threading part 106b on the right side to the aligning member 108. The optical fiber 101 is secured to the plug 103 with the securing component 105 thereafter. Subsequently, similar to FIG. 3C, the pressing member 112 bends the optical fiber 101, and the first plug 103 is installed to the adapter 109 from above.

After threading the second optical fiber 102 through the plug 104, the plug 104 is installed to the adapter from above. Subsequently, after aligning the members of the plugs 103 and 104, both plugs are secured to the adapter, and the second optical fiber is secured to the adapter with the securing component 105. Thus, all members are secured. Only parts forward from the securing component 105 of the first optical fiber 101 and the second optical fiber 102 can move in the axial direction of the fiber.

Lastly, when the pressing member which is not shown is removed, the optical fiber 101 which bends is extended to the end side by its elasticity, contacts with the second optical fiber 102, and bends the second optical fiber. The optical fiber 101 and the second optical fiber apply a stress to each other's end faces in the state where the optical fibers bend together. And the optical connection between the optical fibers is completed (a state of FIG. 6). In this way the length of "a" when there is flexure in both of the optical fibers is preferably two times the length of "a" when one fiber bends. According to this embodiment, the optical fiber 101 and the optical fiber 102 are allowed to bend, and the optical connection in which a stress is applied to each other is enabled without provision of any special device to the plug 103.

Second Aspect

In the following, embodiments of a second aspect of the present invention are described with reference to the drawings. FIG. 9 shows the optical connection structure of a first embodiment of the second aspect of the present invention.

The optical connection structure of this embodiment uses the plug 203, the adapter 204, and two through-hole members 205 as the aligning means shown in FIG. 9, while the plug 203 to which the optical fiber 201 which bends is inserted is mounted on the adapter 204, when the through-hole members 205 through which the optical fiber 202 is inserted is secured to the adapter 204, by linearly extending the optical fiber 201 in the plug 203 to be deviated to the end, the end of the optical fiber 201 and the end of the optical fiber 202 are abutted against each other to be optically connected.

Figure 10:
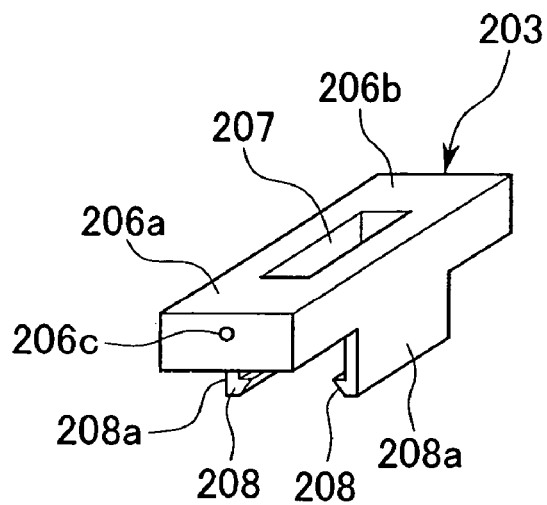
FIG. 10 is a perspective illustration showing a plug of the first embodiment of the second aspect of the present invention.

The plug 203 is a board-shaped body as shown in FIG. 10, optical-fiber threading parts 206a and 206b are longitudinally provided at both sides, and a bending cell 207 is provided between the optical-fiber threading parts 206a and 206b.

An insertion hole 206c to thread the optical fiber 201 is provided at the optical-fiber threading parts 206a and 206b, respectively. The bending cell 207 is to form a space in which the optical fiber 201 bends, and forms the opening that a rectangle shaped by vertically penetrating the central part of the length direction of the plug 203 in the top and bottom direction. In addition, a latch 208 is provided on the plug 203 to attach the plug 203 to the adapter 204. The latch 208 is provided to stretch inside toward the leg 208a extending below in the bottom of the bending cell 207 of the plug 203.

Figure 11:
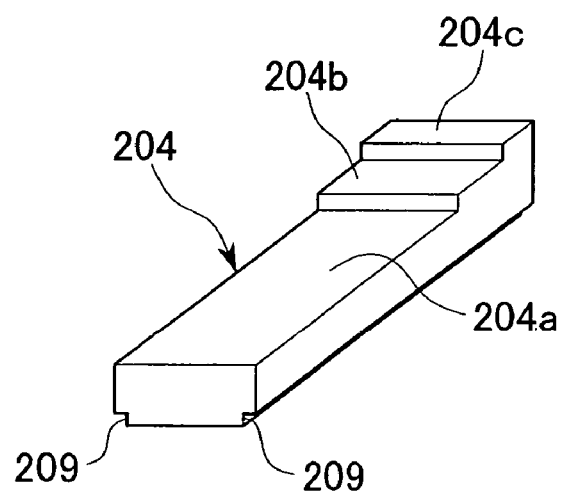
FIG. 11 is a perspective illustration showing an adapter of the second aspect of the present invention.

The adapter 204 is formed in a flat board shape, and the top of the adapter 204 is opened, which is a so-called top opening type, as shown in FIG. 11, and a plug-mounting face 204a mounting the plug 203, a second mounting face 204b mounting two through-hole members 205 at a place next to the mounting face 204a, and a third mounting face 204c mounting the optical fiber 202 are provided on the top surface of the adapter 204. In addition, the engaging part 209 engaging with the latch 208 of the plug 203 along the longitudinal direction is provided on both sides of the bottom of the adapter 204.

The through-hole member 205 is a rectangular form as shown in FIG. 11, and a through-hole 211 through which the optical fibers 201 and 202 are threaded is provided at the center of the through-hole member 205. This through-hole member 205 has an almost same width as that of the plug 203 and the adapter 204.

Figure 13A:
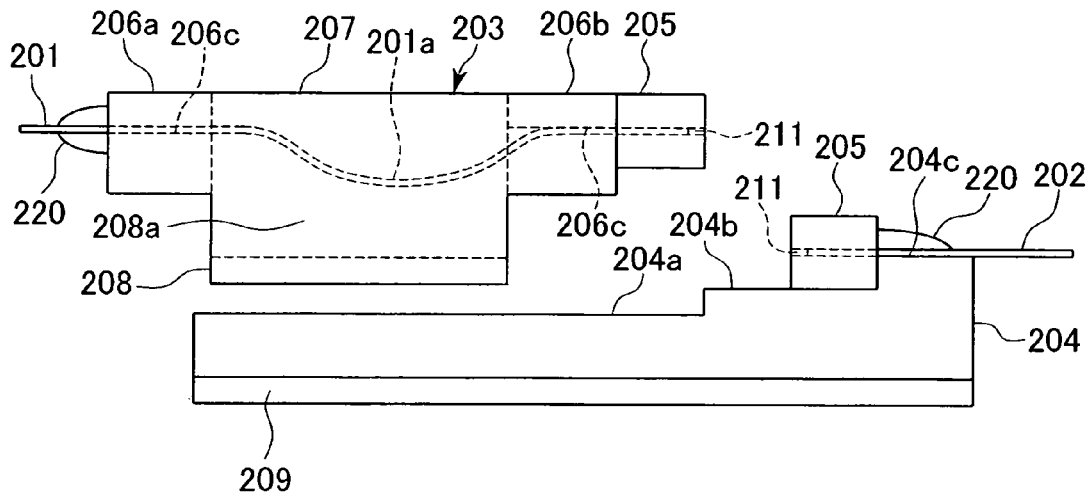
FIGS. 13A to 13C are illustrations showing the first embodiment of the second aspect of the method for manufacturing the optical connection structure shown in FIG. 9.
Figure 13B:
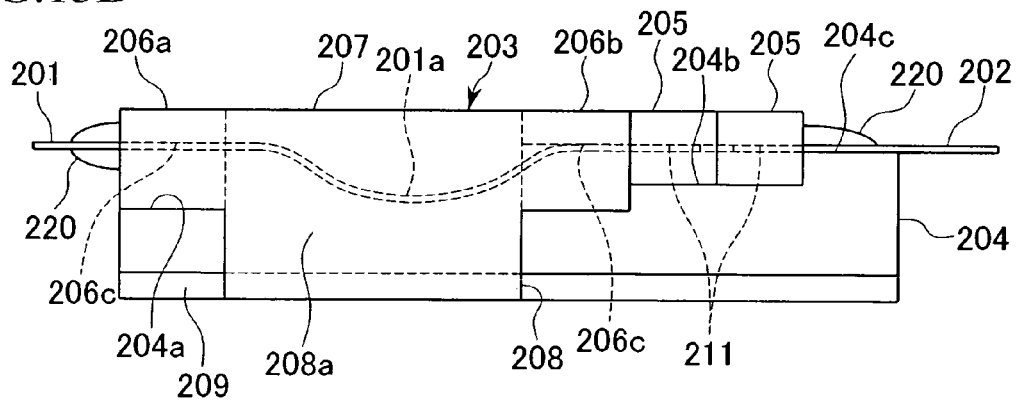
Figure 13C:
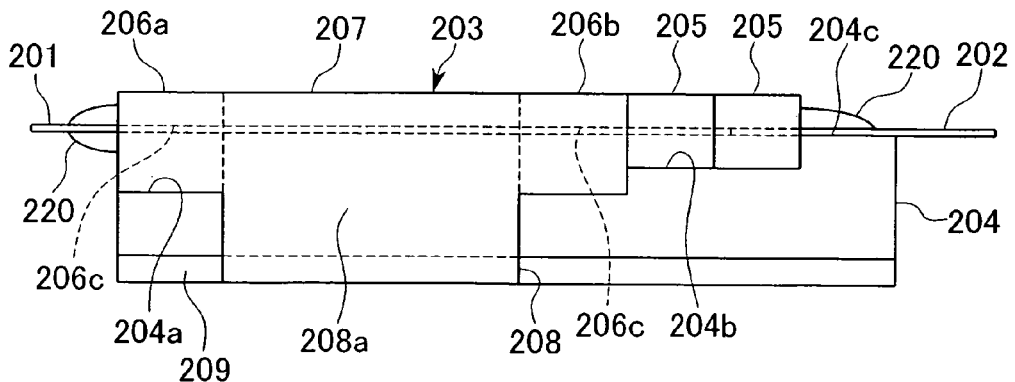

The method for manufacturing the optical connection structure of the embodiment is described below with reference to FIGS. 13A to 13C. FIGS. 13A to 13C are illustrations showing an example of the manufacturing method for the optical connection structure.

In FIGS. 13A to 13C, first, the front end of the optical fiber 201 is threaded through the optical-fiber threading part 206a of the one side (the left) of the plug 203, and led to the bending cell 207, then threaded through the optical-fiber threading part 206b of the other end side (the right) from the bending cell 207, and is drawn to the outside, and the front end of the optical fiber 201 drawn is inserted in the through-hole 211 of the one through-hole member 205, thereby the through-hole member 205 is mounted on the plug 203. Hereinafter, the through-hole member 205 of the plug 203 side is also called the "first through-hole member 205" as follows.

In the bending cell 207 of the plug 203, the bending part 201a is formed by bending the optical fiber 201 sagging downward, with that state, the optical fiber 201 is secured to the optical-fiber threading part 206a of one side (the left side) with the adhesive 220, thus the optical-fiber threading part 206a becomes a securing part (FIG. 13A).

In addition, the other through-hole member 205 is threaded through the optical fiber 202, and the through-hole member 205 having the optical fiber 202 is mounted on the second mounting face 204b of the adapter 204, and is secured by the adhesive 220. This through-hole member 205 of the adapter 204 side is also called the "second through-hole member 205."

Subsequently, one end side of the adapter 204 (the left side) is inserted between the leg 208a (the front side in the figure) and 208a (the back side in the figure) of the plug 203 having the optical fiber 201, and the latch 208 is engaged with the engaging part 209 of the adapter 204, in that state, the plug 203 is slid to the direction of the optical fiber 202 along the adapter 204, the first through-hole member 205 of the plug 203 is abutted against the second through-hole member 205 on the second mounting face 204b, thereby the optical fiber 201 in the first through-hole member 205 and the optical fiber 202 in the second through-hole member 205 are aligned (FIG. 13B).

Subsequently, when, in the optical fiber 201, the bending part 201a which is bent in the bending cell 207 of the adaptor 204 is linearly extended so as to be along the insertion hole 206c of the optical-fiber threading part 206a, the end protrudes to the first through-hole member 205 to be inserted in the through-hole 211 of the second through-hole member 205, and is abutted against the end of the optical fiber 202 in the second through-hole member 205 to be optically connected to each other (FIG. 13C).

Therefore, according to the embodiment, in the connection of the optical fiber in a printed board or a device, the first optical fiber 201 is threaded through the optical-fiber threading part 206a of the plug 203, and becomes a securing part there beforehand, the bending part 201a is formed in the bending cell 207 of the end side from the securing part, the second optical fiber 202 is secured on the adapter 204 with the adhesive 220, after the plug 203 is attached by the adapter 204 so as not to move, the end of the optical fiber 201 is moved in the direction of the optical fiber 202 to connect the optical fibers 201 and 202 to each other, therefore, there is no concern of damage occurring by a shock of sudden contact between the optical fibers 201 and 202, thus the work for connection can be performed easily and safely.

Furthermore, in the plug 203, as described above, a part of the optical fiber 201 rearward of the bending part 201a is secured to the optical-fiber threading part 206a with the adhesive 220 to be the securing part, therefore, when the optical fiber 201 is inserted and extracted, the optical fiber suppresses an excessive force working on the securing part to prevent the securing part from being damaged although it has the bending part 201a.

In addition, the top surface of the adapter 204 is opened and the plug 203 is vertically attached to the top surface of the adapter 204, the plug 203 can be easily inserted and removed, the plug 203 can be easily detached without consideration of placement of other devices, and the space on the substrate can be used effectively.

Further, the work for connection can be performed after mounting an optical component to which the plug 203 and the optical fiber are secured on the substrate, thereby an excessive stress is not applied to the optical fibers 201 and 202, there is no damage of the optical fiber at the edge of the optical component, yields are improved, and the efficiency of the work for the connection is improved.

Further, the manufacturing method for this optical connection structure has a bending step of bending the end side of the optical fiber 201 inside the plug 203 to form the bending part 201a and securing the rear part rearward of the bending part 201a of the optical fiber 201 secured to the optical-fiber threading part 206a of the plug 203, a mounting step of mounting plug 203 to the adapter 204, a step of securing the optical fiber 202 on the adapter 204, and a step of optically connecting the end of the optical fiber 201 and the end of the optical fiber 202 by extending the bending part 201a to move the end of the optical fiber 201 so as to be abutted against the end of the optical fiber 202, thereby the optical connection structure can be easily manufactured.

However, the method for bending the optical fiber 201 is not limited to the above embodiment in particular, the following can be adopted.

Figure 14:
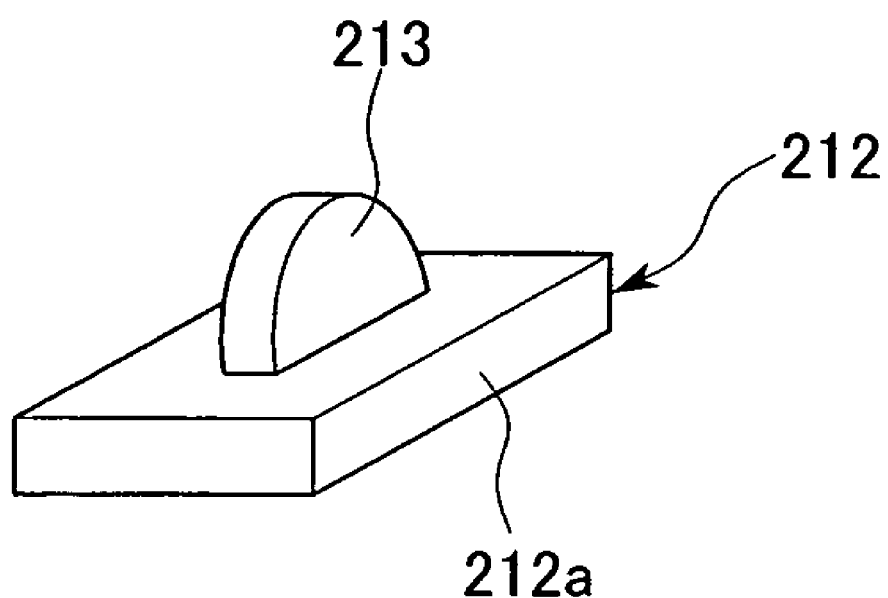
FIG. 14 is a perspective view for explaining a pressing jig applied to the optical connection structure of a second embodiment of the second aspect of the present invention.

FIG. 14 is a perspective view showing the pressing member adopted to the optical connection structure of the second embodiment of the second aspect of this invention.

Figure 12:
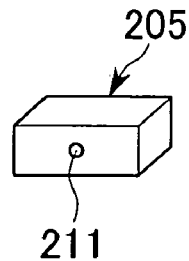
FIG. 12 is a perspective illustration showing a through-hole member mounted on the plug of the first embodiment of the second aspect of the present invention.

In this embodiment, when manufacturing the optical connection structure shown in FIG. 9, a pressing jig 212 shown in FIG. 14 is used in addition to the plug 203 shown in FIG. 10, the adapter 204 shown in FIG. 11, the through-hole member 205 as the aligning means shown in FIG. 12. The pressing projection 213 is provided on the top surface of the body 212a comprising a board, of the pressing jig 212 as shown in FIG. 14. This pressing projection 213, which is an arc, can be inserted in the bending cell 207 of the adapter 204.

The method for manufacturing the optical connection structure using the pressing jig 212 will be described below with reference to FIGS. 15A to 15C.

First, the front end of the optical fiber 201 is threaded from the optical-fiber threading part 206a at the left side of the plug 203, via the bending cell 207 and the optical-fiber threading part 206b, the front end is threaded through the first through-hole member 205, the first through-hole member 205 is secured to the front end of the plug 203, and the optical fiber 201 is secured to the optical-fiber threading part 206a with the adhesive 220 to be the securing part.

Figure 15A:
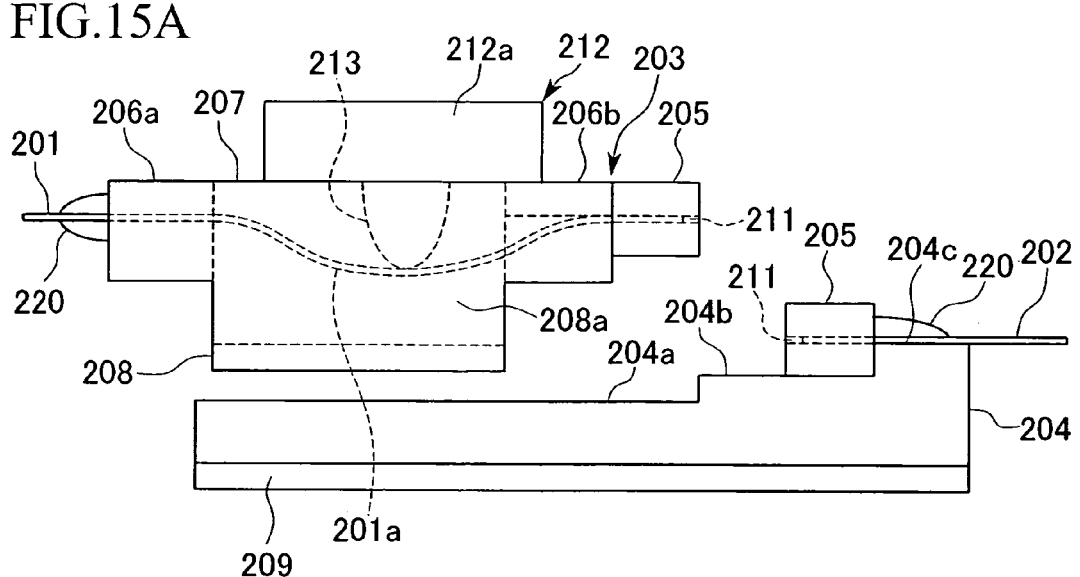
FIGS. 15A to 15C are illustrations showing the optical connection structure of the second embodiment of the second aspect of the present invention.

Subsequently, the pressing jig 212 is mounted on the plug 203 so that the pressing projection 213 of the pressing jig 212 enters the bending cell 207, and the pressing projection 213 adds a pressing force downward to the optical fiber 201 in the bending cell 207, thereby the optical fiber 1 is bent inside the bending cell 207, and the bending part 201a is formed (FIG. 15A).

On the other hand, in the optical fiber 202, the front end of the optical fiber 202 is inserted in the through-hole 211 of the second through-hole member 205, the second through-hole member 205 is mounted on the second mounting face 204c of the adapter 204, at this state, the second through-hole member 205 and the optical fiber 202 are secured to the adapter 204 with the adhesive 220 (FIG. 13A). In this case, the end of the optical fiber 202 does not project from the through-hole 211 in the second through-hole member 205 outside, and is concave for only the predetermined dimensions.

Figure 15B:
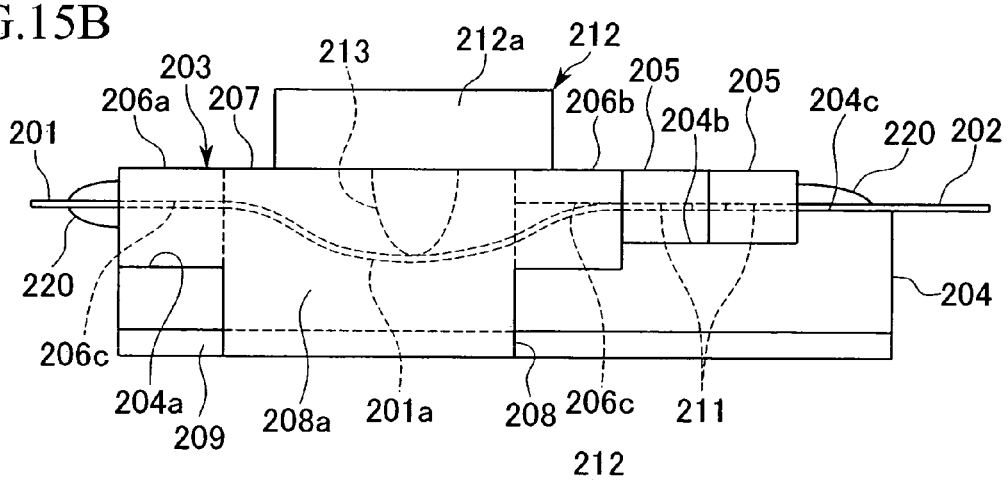

Next, the latch 208 of the plug 203 on which the pressing jig 212 is mounted engages with the engaging part 209 of the adapter 204, the plug 203 is slid on the adapter 204, so that the first through-hole member 205 is abutted against the second through-hole member 205, thereby the plug 203 is mounted on the adapter 204 (FIG. 15B).

Figure 15C:
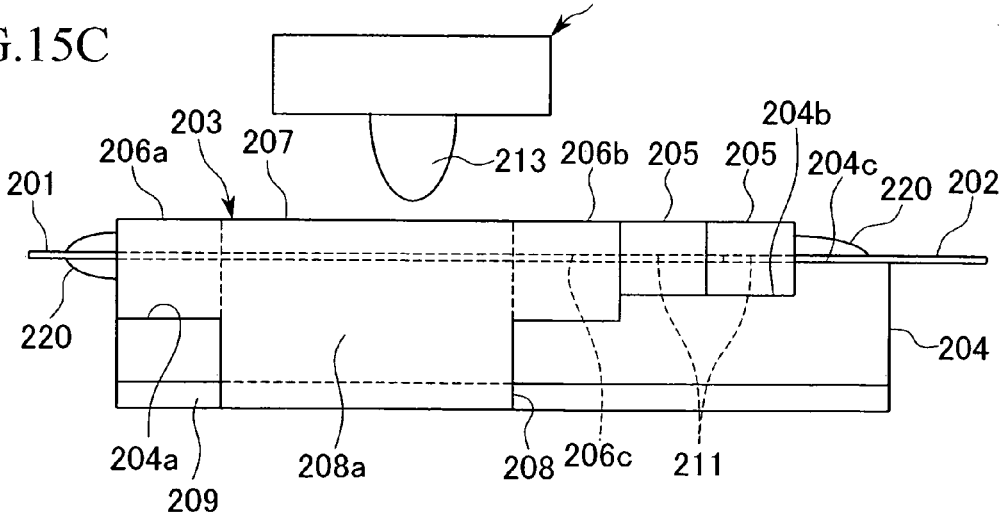

Thereafter, when the pressing jig 212 is pulled out above from the bending cell 207 of the plug 203 to be removed, the optical fiber 201 which is bent is extended to the end side by its elasticity, and is inserted into the through-hole 211 of the second through-hole member 205, thereby the pressing jig 212 is optically connected to the optical fiber 202 inside the second through-hole member 205 (FIG. 15C).

Therefore, according to this optical connection structure, the optical fiber 201 is the bending part 201a inside the bending cell 207 by using the pressing jig 212 for the plug 203, when the plug 203 is attached to the adapter 204, when removing the pressing jig 212, the optical fiber 201 is extended by its elastic restoring force to the end direction to be connected to the optical fiber 202, namely, the pressing jig 212 forms the bending part 201a of the optical fiber 201 and the bending part 201a is linearly restored to the original state by the elasticity, thereby it becomes unnecessary to form a flexural state of the optical fiber 201 or to restore it linearly by hand one by one, thus the optical connection can be easily performed.

And the manufacturing method for this optical connection structure has the securing step of bending the end side of the optical fiber 201 in the plug 203 to form the bending part and securing the rear part rearward of the bending part 201a to the optical-fiber threading part 206a of the plug 203, the mounting step of mounting the plug 203 to the adapter 204, the securing step of securing the optical fiber 202 on the adapter 204, and the step of optically connecting the end of the optical fiber 201 and the end of the optical fiber 202 by extending the bending part 201a by removing the pressing jig 212 to move the end of the optical fiber 201 to be abutted against the end of the optical fiber 202, thereby the optical fibers 201 and 202 can be favorably connected, and the optical connection structure can be easily manufactured.

In addition, in this embodiment, the pressing jig 212 is not limited to the shape shown in FIG. 14, but may be any shape that can bend the optical fiber 201 without damage. However, it is preferable to push the side face of the optical fiber by the curved face which is equal to or more than a radius of curvature where the optical fiber 201 is damaged.

Materials of the pressing jig 212 are not limited, however, the hardness is preferable to prevent the pressing jig 212 from deforming by repulsion of the optical fiber 201 so that the flexural shape is uniquely fixed when it is mounted to the plug 203. Furthermore, it is preferable that the surface has a sliding property to bend the optical fiber 201 smoothly without strain.

According to this embodiment, the optical fiber 201 can be bent only with a simple jig without providing a device particularly to the plug 203, and the end of the optical fiber 201 can be moved, thereby the optical connection structure can be simplified.

Figure 16:
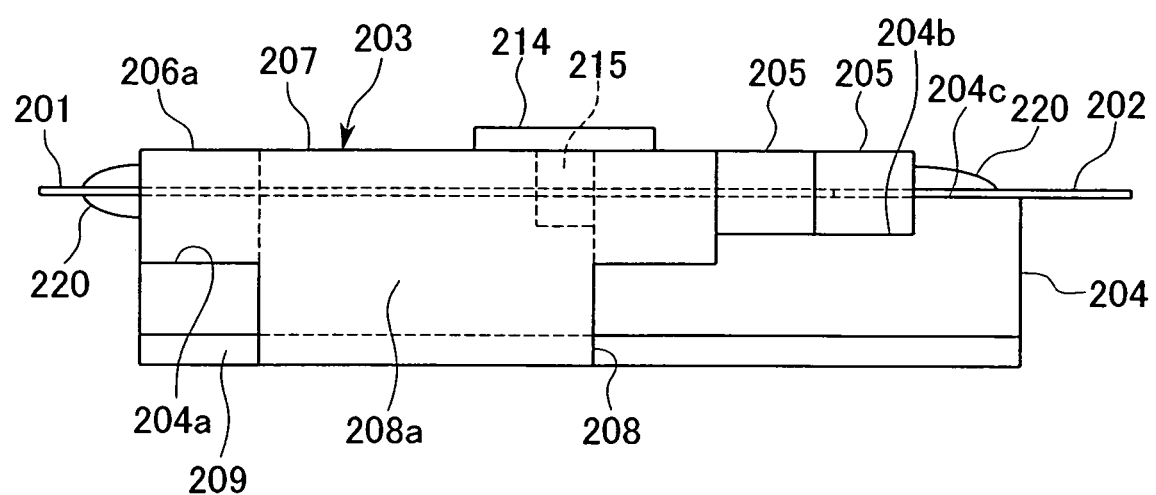
FIG. 16 is an illustration showing the optical connection structure of a third embodiment of the second aspect of the present invention.
Figure 17:
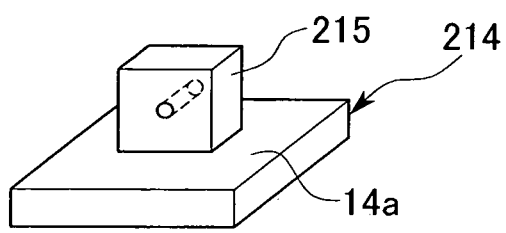
FIG. 17 is a perspective illustration showing a sliding member of the first embodiment of the second aspect of the present invention.

FIGS. 16 and 17 show the optical connection structure of the third embodiment of the second aspect of this invention.

In FIG. 16, the optical connection structure of this embodiment is acquired by using a sliding member 214 other than the plug 203 shown in FIG. 10, the adapter 204 shown in FIG. 11, and the through-hole member 205 as the aligning means shown in FIG. 12.

Namely, the sliding member 214 is slidably mounted on the bending cell 207 of the plug 203 along the axial direction of the optical fiber 201 as shown in FIG. 16, and the optical-fiber securing part 215 which is a rectangular form is provided to be projected on the top surface of the board-shaped body 214a as shown in FIG. 17. The optical-fiber securing part 215 is a size that can be inserted in the bending cell 207 of the plug 203, and the insertion hole 215a which is threaded through the optical fiber is provided on the center to penetrate the optical fiber.

The method for manufacturing the optical connection structure shown in FIG. 16 is described below with reference to FIGS. 18A to 18C.

Figure 18A:
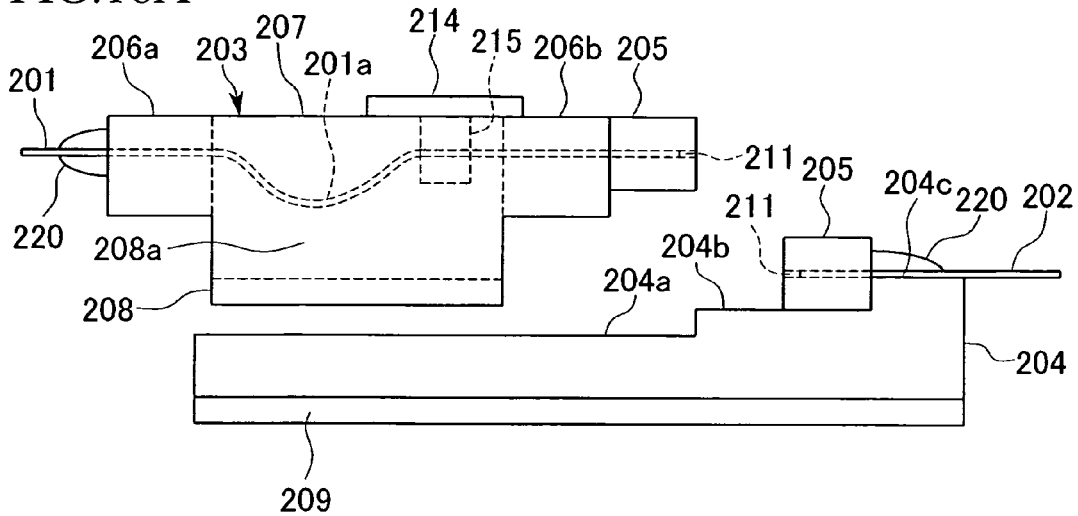
FIGS. 18A to 18C are illustrations showing examples of the method for manufacturing the optical connection structure shown in FIG. 16.
Figure 18B:
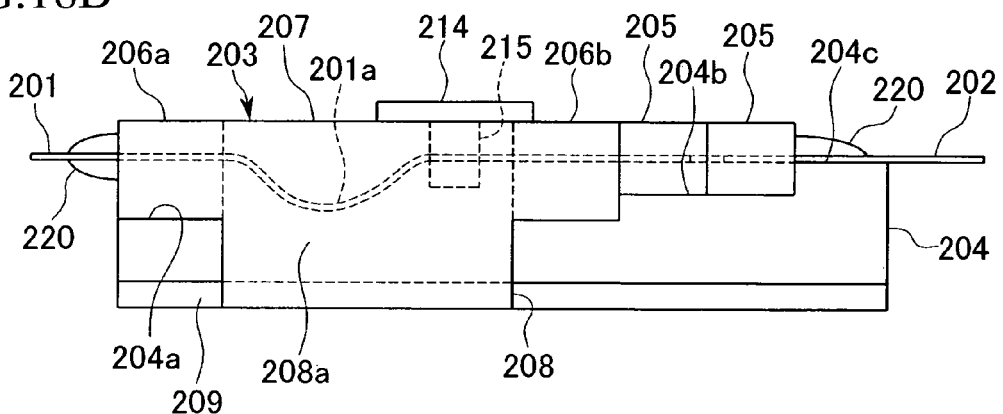
Figure 18C:
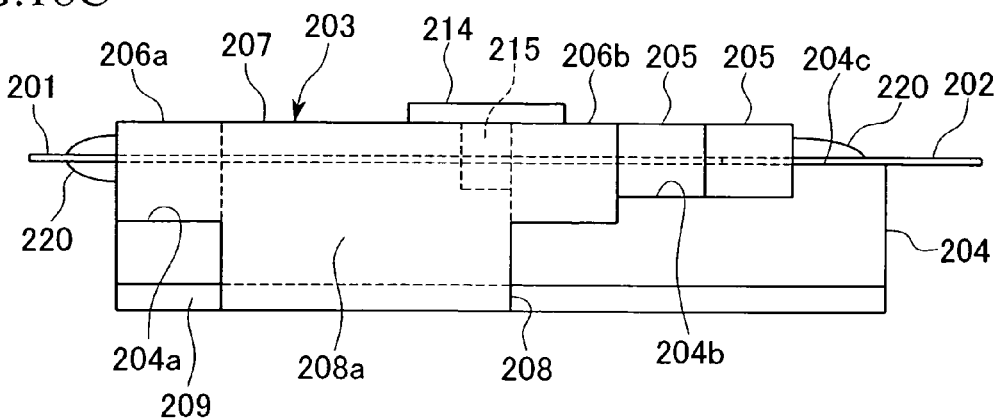

In FIGS. 18A to 18C, first, the front end of the optical fiber 201 is threaded through the optical-fiber threading part 206a of one side (the left) of the plug 203 led to the bending cell 207, after threading the front end of the optical fiber 201 through the aperture 215a of the optical-fiber securing part 215 of the sliding member 214 mounted on the bending cell 207, the front end of the optical fiber 201 is threaded through the optical-fiber threading part 206b of the other end side (the right) from the optical-fiber securing part 215, and is drawn to the outside, and the front end of the optical fiber 201 drawn is inserted in the through-hole 211 of the first through-hole member 205, and the first through-hole member 205 is secured to the end of the plug 203 (FIG. 18A).

In the bending cell 207 of the plug 203, the sliding member 214 is separated from the optical-fiber threading part 206b to the optical-fiber threading part 206a, bending part 201a is formed by bending the optical fiber 201 sagging downward, and with that state the optical fiber 201 is secured to the optical-fiber threading part 206a with the adhesive 220 to be the securing part.

On the other hand, the second through-hole member 205 and the optical fiber 202 are secured to the adapter 204 as in the case of FIGS. 13A to 13C and FIG. 15.

Next, the latch 208 of the plug 203 on which the sliding member 214 is mounted engages with the engaging part 209 of the adapter 204, the plug 203 is slid on the adapter 204, so that the first through-hole member 205 is abutted against the second through-hole member 205, thereby the plug 203 is mounted on the adapter 204 (FIG. 18B).

Thereafter, in the plug 203, when the sliding member 214 is slid to the right side on the bending cell 207 to abut against the optical-fiber securing member 215 of the sliding member 214 to the second optical-fiber threading part 206b, the optical fiber 201 which is bent is extended to the end side by its elasticity, and is inserted into the through-hole 211 of the second through-hole member 205, thereby the optical fiber 201 is optically connected to the optical fiber 202 inside the second through-hole member 205 (FIG. 18C).

Therefore, according to this optical connection structure, when the sliding member 214 is mounted on the plug 203, the bending part 201a of the optical fiber 201 is maintained in that state in the bending cell 207 of the plug 203 by the sliding member 214, and when the sliding member 214 is abutted against the second optical fiber threading part 206a on the bending cell 207, the bending part 201a of the optical fiber 201 is opened, and the end of the optical fiber 201 is extended by its elastic restoring force to be optically connected to the end of the optical fiber 202, thereby the optical connection can be easily performed. Therefore, the same effect as the embodiment mentioned above can be basically acquired.

The manufacturing method for this optical connection structure has the securing step of bending the end side of the optical fiber 201 in the plug 203 to form the bending part and for securing the rear part rearward of the bending part 201a to the optical-fiber threading part 206a of the plug 203, the step of holding the bending part 201a of the optical fiber 201 inside the bending cell 207 by sliding the sliding member 214 and opening the bending part 201a, the mounting step of mounting the plug 203 to the adapter 204, the securing step of securing the optical fiber 202 on the adapter 204, and the step of optically connecting the end of the optical fiber 201 and the end of the optical fiber 202, when the bending part 201a of the optical fiber 201 is opened by the sliding member 214, the bending part 201a is extended by elastic restoring force to move the end of the optical fiber 201, and the end of the optical fiber 201 is abutted against the end of the optical fiber 202, thereby the optical fibers 201 and 202 can be favorably connected, and the optical connection structure can be easily manufactured.

Figure 19:
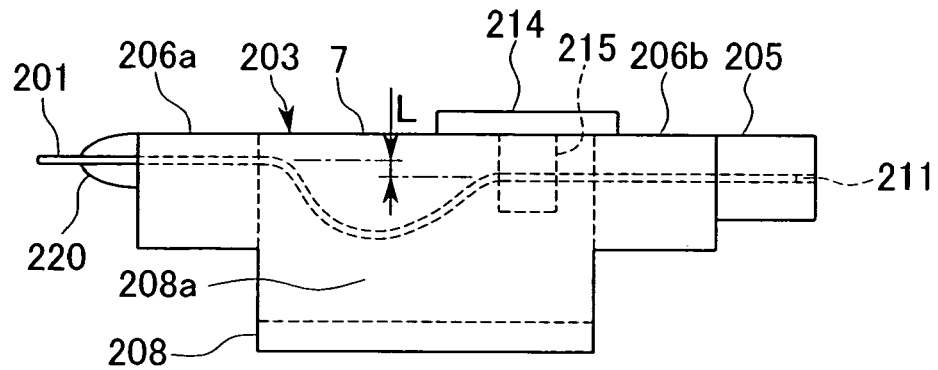
FIG. 19 is an illustration showing dimensional relationships with one end side and another end side of a bending part of an optical fiber in the optical connection structure shown in FIG. 16.

In addition, in the optical connection structure which allows the optical fiber 201 to bend by the sliding member 214, by an axis position of the optical fiber 201 fixed to the optical-fiber threading part 206a of the plug 203 and an axis position of the optical fiber 201 held by the sliding member 214 not being on the same straight line as shown in FIG. 19, in other words, by separating a position at which the optical fiber 201 is threaded through the optical-fiber threading part 206a of the plug 203 from a position at which the optical fiber 201 is threaded through the insertion hole 215a of the sliding member 214 by a slight distance L along the up-and-down direction, the bending part 201a can be easily held, and elastic restoring force of the bending part 201a is favorably acquired.

In this way, holding and releasing of the sliding member 214 for the bending part 201a of the optical fiber 201 is not limited to the sliding member 214 and may be any method as long as the optical fiber 201 is not damaged and an optics characteristic is not influenced, and, may be a method for securing by an adhesive or a method for grasping mechanically. If the optical fiber is not transformed or damaged by the bending work, materials are not limited in particular, but it is desirable that there is a sliding property with a plug.

Therefore, according to this embodiment, by providing the sliding member 214 of a simple constitution on the plug 203, the optical fiber 201 can be bent and released, thereby a quick manufacture of the optical connection structure is enabled.

FIG. 20A to FIG. 22D show the optical connection structure of the fourth embodiment of the second aspect of this invention.

The state where the optical fiber is bent is maintained by the pressing member and the sliding member in the embodiment, however, a temporary securing member 217 is provided on the plug 216 in this embodiment.

Figure 20A:
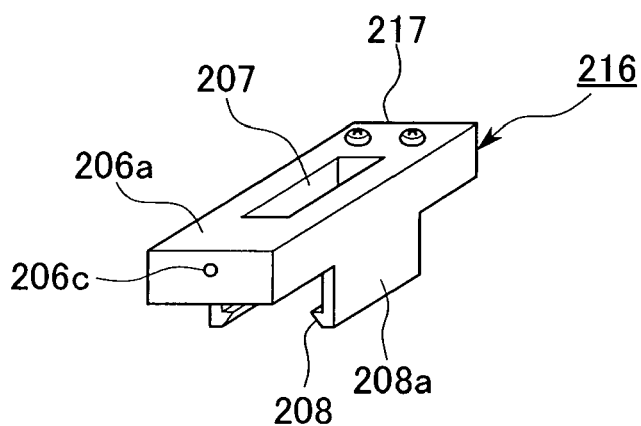
FIGS. 20A and 20B are figures showing the optical connection structure of a fourth embodiment of the second aspect of the present invention.
Figure 20B:
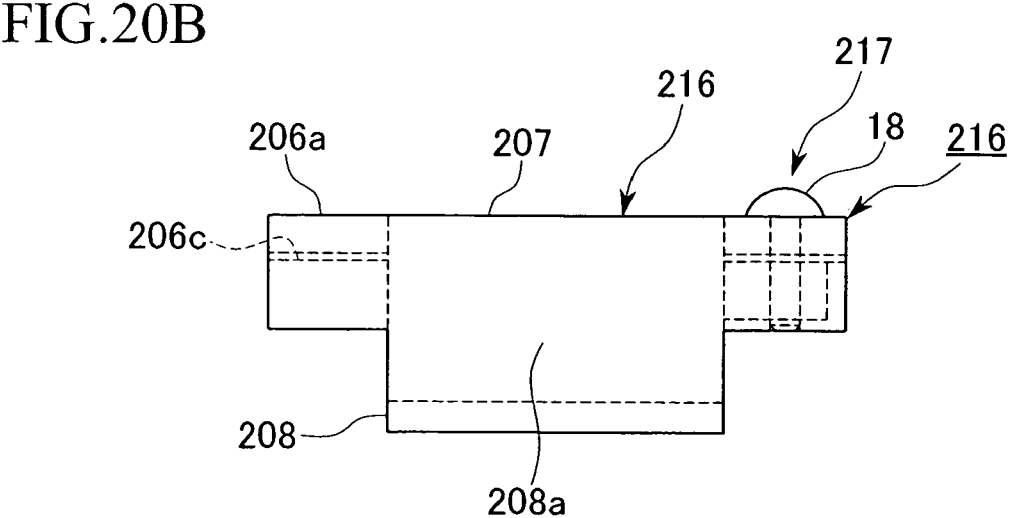

The plug 216 has the optical-fiber threading part 206a, the bending cell 207 and the latch 208, and the temporary securing member 217 is provided on the other side of the optical-fiber threading part 206a at the bending cell 207 as shown in FIGS. 20A and 20B. This temporary securing member 217 is for holding the bending part 201a of the optical fiber 201 in the bending cell 207 at the plug 216 and for releasing the holding, as shown in FIG. 20B, and has the top supporting member 217a and the pressing board 219 mounted on the top supporting member 217a with a screw 218 so as to be vertically movable.

Figure 21:
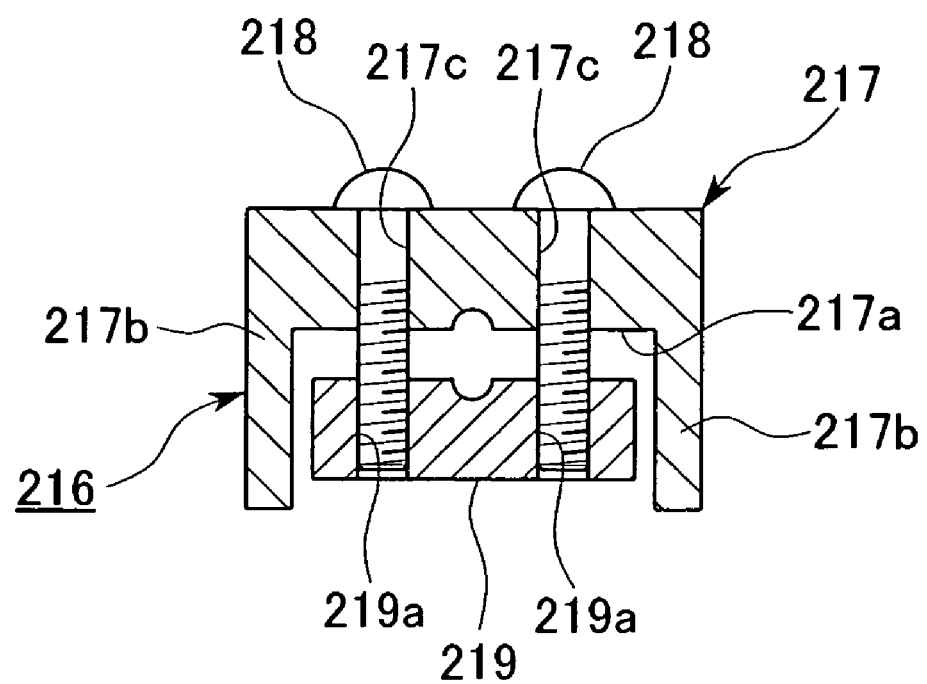
FIG. 21 is a vertical section view showing a temporary securing member of the plug.

The pressing board 219, which is a rectangular shape, enters between side walls 217b hung on both sides of the upper supporting member 217a of the plug 216 as shown in FIG. 21, and a female screw hole 219a engaged with the screw 218 is provided. The end of the screw 218 is threaded through the insertion hole 217c which is provided to penetrate the upper supporting member 217a, and is engaged with the female screw hole 219a of the pressing board 219.

Therefore, the upper supporting member 217a is moved by rotating the screw 218, the pressing board 219 to sandwich the optical fiber 201 by the pressing board 219 and the upper supporting member 217a, while the pressing board 219 is moved to the opposite direction to release sandwiching the optical fiber 201.

The method for manufacturing the optical connection structure in which the plug 216 is used is described below with reference to FIGS. 22A to 22D.

In FIGS. 22A to 22D, first, the front end of the optical fiber 201 is threaded through the optical-fiber threading part 206a of the one side (the left side) of the plug 216 to be led to the bending cell 207, is threaded through between the pressing board 219 and the upper supporting member 217a of the temporary securing member 217 on the other end side (the right side) from the bending cell 207, and is drawn to the outside, and the front end of the optical fiber 201 drawn is inserted in the through-hole 211 of the first through-hole member 205, thus the first through-hole member 205 is mounted on the plug 216 (FIG. 22A).

By securing the end of the optical fiber 201 to the optical-fiber threading part 206a with the adhesive 220 the threading part 206a is secured, in addition, in the bending cell 207 of the plug 216, the pressing member 212 is used to apply a pressing force to the optical fiber 201 by the pressing projection 213 of the pressing member 212, the optical fiber 201 is bent sagging downward to form the bending part 201a, the bending part 201a is held with this state by tightening the screw 218 of the temporary securing member 217 as shown in FIG. 22B.

Subsequently, after removing the pressing member 212 from the plug 216, the second through-hole member 205 and the optical fiber 202 are secured to the adapter 204 as in the case of FIGS. 13A to 13C and FIG. 15.

Subsequently, the plug 216 mentioned above is mounted on the adapter 204 to which the second through-hole member 205 is secured, the latch 208 is engaged with the engaging part 209 and is secured (FIG. 22C).

With this state, the screw 218 of the temporary securing member 217 is loosened to move the pressing board 219 downward, and by releasing holding of the bending part 201a, the bending part 201a is extended by its elasticity, the end of the optical fiber 201 is inserted in the through-hole 211 of the second through-hole member 205 on the adapter side, and is optically connected to the optical fiber 202 inside (FIG. 22D).

Therefore, according to this embodiment, the temporary securing member 217 provided on the plug 216 holds and releases the bending part 201a of the optical fiber 201, when the plug 216 is mounted on the adapter 204 and when the temporary securing member 217 releases holding of the bending part 201a of the optical fiber 201, the optical fiber moves forward to a second fixation member 205 with its restoring force to be optically connected to the optical fiber 202, thereby the optical connection can be easily performed.

The manufacturing method for this optical connection structure does not have only the bending step of bending the end side of the optical fiber 201 in the plug 203 to form the bending part 201a and securing the rear part rearward of the bending part 201 a of the optical fiber 201 to the optical-fiber threading part 206a of the plug 203, the mounting step of mounting the plug 203 to the adapter 204, the securing step of securing the optical fiber 202 on the adapter 204, and the step of optically connecting the end of the optical fiber 201 and the end of the optical fiber 202 by extending the bending part 201a to move the end of the optical fiber 201 to be abutted against the end of the optical fiber 202, but also the temporary step of holding the bending part 201a of the optical fiber 201 by engaging and disengaging the temporary securing member 217, and the releasing step of releasing the bending part 201a to extend the bending part 201a, thus the optical fibers 201 and 202 can be favorably connected, and the optical connection structure can be favorably manufactured.

In addition, the temporary securing member 217 of the optical fiber holds and releases the bending part 201a by sandwiching the optical fiber 201 with the pressing board 219 and the upper supporting member 217a by the screw 218, however, it is not limited particularly and may be other methods as long as the flexural state can be maintained so as to release the optical fiber 201 again without damaging the optical fiber 201.

Namely, when the temporary securing member 217 is provided on the plug 216 as stated above, before manufacturing the optical connection structure, a plurality of the optical fibers 201 can be collectively maintained to be bent beforehand, thereby it is not necessary to bend optical fibers one by one before being connected, a plurality of optical connection structures can be made at once, the work for connection can be performed more easily and smoothly.

In addition, a securing method of the optical fiber 201 in the optical-fiber threading part 206a of the plug may be any kind of method, and may be a method that the optical fiber is introduced into a groove or a through-hole to be secured by an adhesive, or may be a method that the optical fiber is grasped mechanically. Furthermore, the method for securing the second optical fiber 202 to the adapter is not limited particularly, and may be, for example, a method for securing it by an adhesive directly, or a method for grasping it mechanically as long as there is no influence in optical characteristics of the optical fiber. In addition, this is not limited to the above, but may be to fix a plug similar to the plug secured to the adapter beforehand, and to fix the plug to the adapter indirectly by securing the optical fiber to this plug.

Furthermore, an engagement structure by the latch 208 is adopted in the above as a method for attaching the plug to the adapter, but it is not limited to this, and may be any kind of method such as a method for adhesively securing the plug and the adapter, or a method for securing concave and convex portions to each other by a mechanical frictional force as long as the adapter and the plug can be secured. In addition, the mounting direction is not limited in particular if the plug can be mounted on the adapter so that the optical fiber can be aligned, however, it is preferable to attach vertically the plug to the top surface of the adapter when the plug is mounted on the substrate or when the plug is attached to an optical component or an optical module. Accordingly, the optical fiber does not bend abruptly at an installation part of the optical module or the edge of the optical component, not only is the installation part not damaged, but also there is no concern that the optical fiber is damaged.

Materials and shapes of the plug used in the optical connection structure of the embodiment mentioned above are not limited in particular, and plastic, ceramic, metal, zirconia, and glass metal, or the like are used preferably for materials. Also the shape is not limited in particular as long as the plug can be secured to the adapter with reliability.

In addition, although the through-hole member is used as the means for aligning the optical fiber, other aligning means can be used such as methods for aligning the optical fiber in a groove if the optical fiber can be aligned easily. In addition, plastic, ceramic, metal, zirconia, and glass metal, or the like are used preferably for materials of the aligning means of the optical fiber.

The optical fiber used for the optical fiber connecting parts of the present invention is chosen and used depending on an application purpose of the optical fiber connector appropriately, and, for example, a single mode optical fiber of silica (quartz) or a plastic, or a multi-mode optical fiber is desirably used. In addition, the number of optical fibers connected at a time is not limited so that the optical fibers facing each other of the number of the alignment grooves can be connected. Therefore, the number of optical fibers secured to a connection member is not limited in particular.

The optical fiber connecting method is not limited and any kind of existing optical fiber connecting method can be used, for example, a connecting method shown in FIG. 23 and FIGS. 24A to 24C may be used.

FIG. 23 and FIGS. 24A to 24C show the optical connection structure of a fifth embodiment of this invention.

Figure 24A:
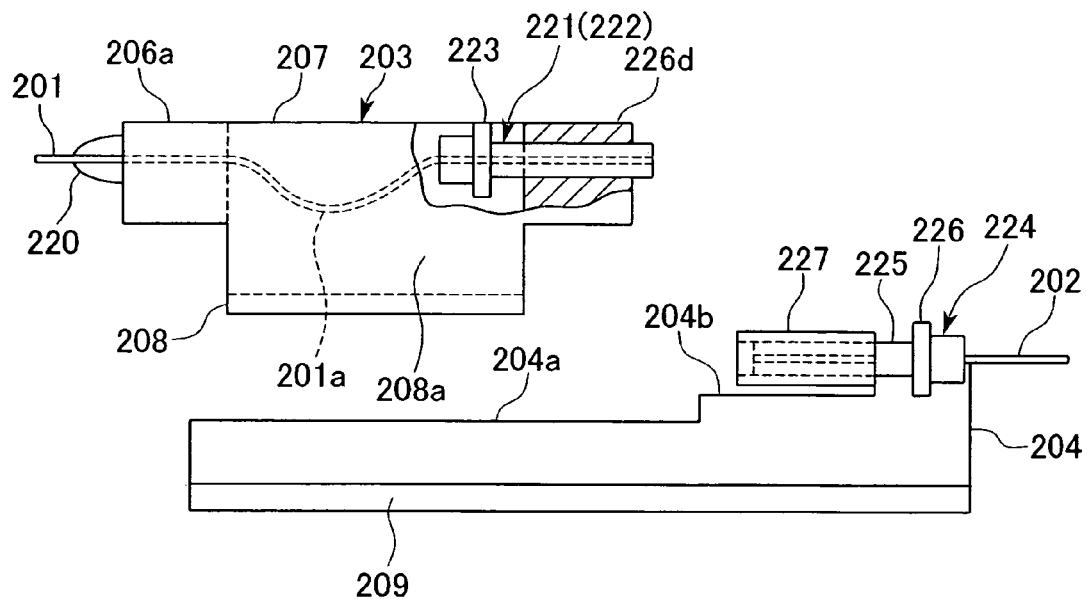
FIGS. 24A to 24C are illustrations showing the method for manufacturing the optical connection structure according to the fifth embodiment of the second aspect of the present invention.
Figure 24B:
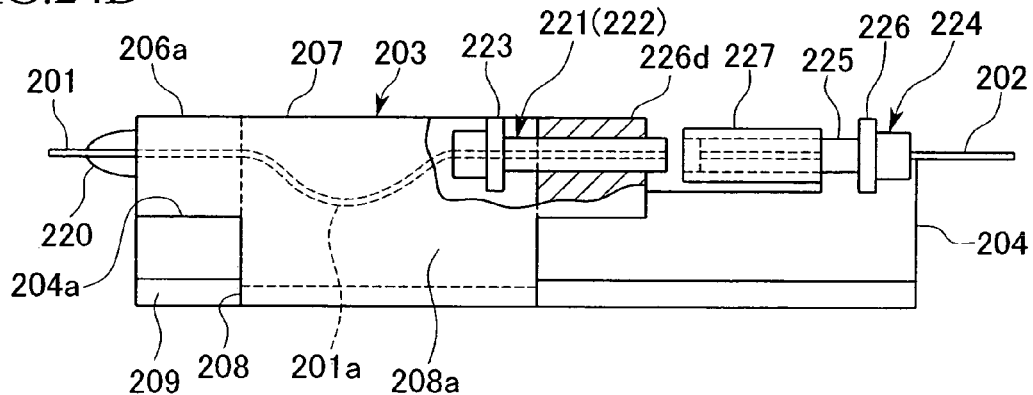
Figure 24C:
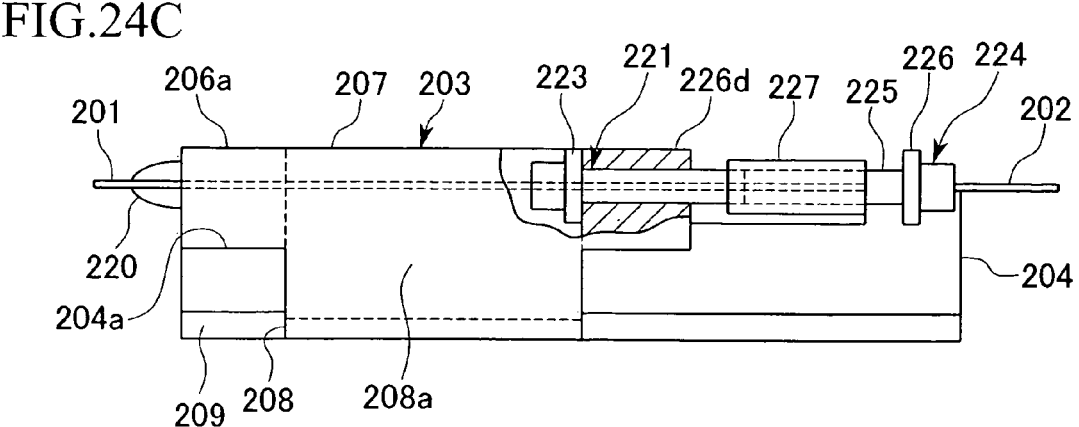

In this case a ferrule 221 is used as shown in FIGS. 24A to 24C, and a flexure state of the optical fiber is maintained and released by mounting the ferrule 221 on the plug 203.

Figure 23:
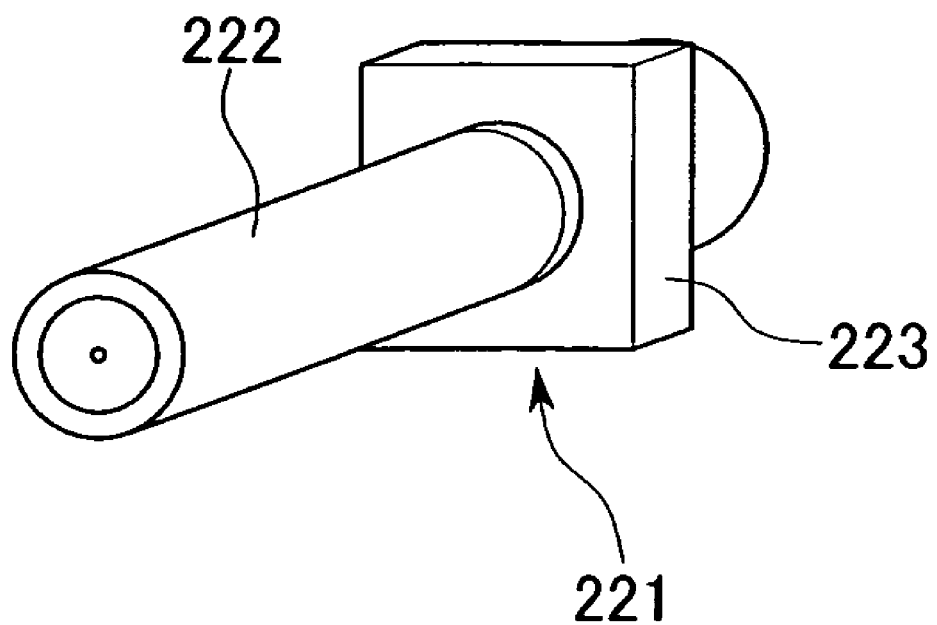
FIG. 23 is a perspective view for description of a ferrule which applies the optical connection structure of a fifth embodiment of the second aspect of the present invention.

The ferrule 221 forms a sleeve 222 through which the optical fiber 201 is threaded and a collar 223 is provided at the one end of the axial direction of the sleeve 222 as shown in FIG. 23, and the sleeve 222 can be threaded through the second optical-fiber threading part 206a of the plug 203 as shown in FIG. 24. Therefore, the plug 203 of this embodiment is formed to have not only the optical-fiber threading part 206a, the bending cell 207 and the latch 208, but also the optical-fiber threading part 206d through which the optical fiber 201 is threaded via the ferrule 221.

The manufacturing method for this optical connection structure is described below with reference to FIGS. 24A to 24C.

In FIGS. 24A to 24C, first, the front end of the optical fiber 201 is threaded through the optical-fiber threading part 206a of the plug 203, and is led to the bending cell 207, and is threaded through the sleeve 222 of the ferrule 221 which is inserted into the optical-fiber threading part 206d from the bending cell 207, thereby the ferrule 221 is attached to the plug 203. In the bending cell 207, the collar 223 of the ferrule 221 is separated from the optical-fiber threading part 206d thereby the optical fiber 201 is bent sagging downward to form the bending part 101b, and with that state, the optical fiber 201 is secured to the optical-fiber threading part 206a of one side (the left side) with the adhesive 220, thus the optical-fiber threading part 206a becomes a securing part (FIG. 24A).

In addition, the end of the optical fiber 202 is threaded through a second ferrule 224 to be mounted, and the second ferrule 224 is secured to the third mounting face 204c of the adapter 204. The second ferrule 224 has a collar 226 provided to protrude on a sleeve 225 and the end thereof the same as the ferrule 221, the collar 226 is engaged with a groove (not shown with a reference numeral) provided on the third mounting face 204c of the adapter 204, the sleeve 225 is mounted on the third mounting face 204c so as to extend to the second mounting face 204b side, and a split sleeve 227 is adhered to the sleeve 225.

Subsequently, the plug 203 is attached to the adapter 204 by engaging the latch 208 of the plug 203 having the ferrule 221 with the engaging part 209 of the adapter 204 from above (FIG. 24B).

Thereafter, when, in the plug 203, the collar 223 of the ferrule 221 is moved to abut against the second optical-fiber threading part 206a, with the movement, the end of the sleeve 222 of the ferrule 221 is fitted into the split sleeve 227 of the second ferrule 224, and at the same time, the bending part 201a is extended by its elasticity, since the bending part 201a of the optical fiber 201 is released, the end of the optical fiber 201 is abutted against the optical fiber 202 in the sleeve 225 of the second ferrule 224 to be optically connected (FIG. 24C).

In this case, the optical connection is favorable, if a refractive index adjusting agent is applied between both the optical fibers 201 and 202 beforehand, and the optical fibers may be connected by PC (Physical Contact) by abutting against the optical fibers. When a refractive index adjusting agent is used, materials, forms, and installation methods are not limited in particular, and the material can be chosen according to the refractive index and the material of the optical fiber appropriately, and, for example, silicone oil and silicone grease are used preferably. In addition, the form of the refractive index adjusting agent may be solid or liquid, and may be, for example, in a form of oil, grease, gel, or film.

Therefore, according to this embodiment, because the ferrule 221 provided on the plug 203 holds the bending part 201a of the optical fiber 201, when the plug 203 is mounted on the adapter 204 and the ferrule 221 moves in the direction of the second ferrule 224 inside the plug 203 to release the bending part 201a of the optical fiber 201, the optical fiber 201 moves to the second ferrule 224 with its elastic restoring force to be optically connected to the optical fiber 202, thereby the optical connection can be easily performed hereby.

The manufacturing method for this optical connection structure has a step of forming the bending part 201a at the optical fiber 201 in the bending cell 207 by the ferrule 221 which is mounted on the adapter 203 so as to be slidable along the axial direction of the optical fiber 201 and holding the flexural state, and a releasing step of releasing the flexural state of the optical fiber 201 by movement of the ferrule 221, thereby the optical fibers 201 and 202 can be favorably connected, and the optical connection structure can be favorably manufactured.

In addition, in any form of the embodiment of the present invention described above, the optical fiber is bent once, thereafter, extends to be abutted against the other optical fiber. When the optical fiber extends the cutting length of the optical fiber or precision of a fixed place is not sufficient, some flexure is left at the optical fiber even after the extension the optical fiber can be abutted against another of optical fiber can happen, and the present invention includes this case.

Next, concrete examples of the second aspect of the present invention are described below, however, the present invention is not limited to this.

EXAMPLE 2-1

To manufacture the optical connection structure shown in FIG. 9, two optical fibers, which correspond to the optical fibers 201 and 202 shown in FIG. 15, in which 15 mm of a coating of the optical fiber conductor of 250 µm in diameter is removed from the end, and optical fiber conductors (125 µm in diameter) are cut at 10 mm from the coating end are provided.

Next, the plug 203 shown in FIG. 10, the adapter 204 shown in FIG. 11, and the pressing jig 212 shown in FIG. 14 were made of ABS resin. In addition, as the first and the second through-hole members 205 shown in FIG. 12, an eight-wire MT ferrule was cut and only an end thereof was used.

The optical connection structure with the above members is manufactured as shown in FIGS. 15A to 15C.

In FIG. 15A, the first through-hole member 205 was secured to the plug 203, the optical fiber 201 was inserted in the through-hole 211 of the first through-hole member 205 from the side of the optical-fiber threading part 206a of the plug 203, and at the state where the optical fiber 201 was protruded by 1 mm from the end of the first through-hole member 205, the optical fiber 201 was secured to the optical-fiber threading part 206a of the plug 203 with an adhesive.

The second through-hole member 205 was secured to the adapter 204 with the adhesive 220, and the optical fiber 202 was inserted in the second through-hole 211. In this case, after the end of the optical fiber 202 was retracted by 1 mm into the inside of the through-hole 211 of the second through-hole member 205, the optical fiber 202 was secured with the adhesive 220.

Subsequently, the pressing jig 212 was mounted on the plug 203 made as described above, thereby the optical fiber 201 is bent to form the bending part 201a, the end of the optical fiber 201 was retracted in the through-hole 211 of the first through-hole member 205 (FIG. 15A). Thereafter, the plug 203 was attached to the adapter 204 by engaging the latch 208 to the engaging part 209 (FIG. 15B), the bending part 201a of the optical fiber 201 was released by removing the pressing jig 212 from the plug 203, the optical fiber 201 was restored to the original straight shape by elastic restoring force, thereby the optical fibers 201 and 202 were optically connected to each other, and the optical connection structure of the present invention was manufactured (FIG. 15C).

In the optical connection structure provided by this Example 2-1, in the connection of the optical fiber on the printed board and in the device, as described above, when the plug was attached to the adapter, after the plug was secured to the plug so as not to move, the end of the optical fiber was moved, and the work for connection of the optical fiber could be performed, so that the connected optical fibers did not give a shock of sudden contact to each other and there was no concern for damage to the optical fibers, thus the work for connection was performed easily and safely. Thus, yields were improved, and the efficiency of the work for the connection was improved. Furthermore, the optical fiber is bent only with a simple jig without making a device particularly for the plug, and the end of the optical fiber can be moved, the optical connection structure could be simplified.

Thereafter, the connection loss was measured at the connection point between the optical fibers, the result was 0.5 dB or less, so the characteristic was excellent for the optical connection structure and it was sufficiently available for use.

EXAMPLE 2-2

To make the optical connection structure shown in FIG. 16, two optical fibers, which correspond to the optical fibers 201 and 202 shown in FIG. 16, in which 15 mm of the coating of the optical fiber conductor of 250 μm in diameter was removed from the end, and optical fiber conductors (125 μm in diameter) were cut at 10 mm from the coating end were provided.

The plug 203 shown in FIG. 10, the adapter 204 shown in FIG. 11, and the sliding member 214 shown in FIG. 17 were made of ABS resin. In addition, as the first and the second through-hole members 205 shown in FIG. 12, an eight-wire MT ferrule was cut and only the end thereof was used.

The optical connection structure with the above members was made by a method as shown in FIGS. 18A to 18C.

In FIG. 18A, the sliding member 214 and the first through-hole member 205 were mounted on the plug 203, the optical fiber 201 was inserted in the sliding member 214 and the through-hole member 205 from the side of the optical-fiber threading part 206a of the plug 203, and at the state where the optical fiber was protruded by 1 mm from the end of the first through-hole member 205, the optical fiber 201 was secured to the optical-fiber threading part 206a with the adhesive 220.

The second through-hole member 205 was secured to the adapter 204 with the adhesive 220, and the optical fiber 202 was inserted in the second through-hole 211. In this case after the end of the optical fiber 202 was retracted by 1 mm into the inside of the through-hole 211 of the second through-hole member 205, the optical fiber 202 was secured with the adhesive 220 (FIG. 18A).

Next, the sliding member 214 of the plug 203, which was made as described above, was slid in the direction of the optical-fiber threading part 206a of the plug 203, the optical fiber 201 was bent to form the bending part 201a, and the end of the optical fiber 201 was retracted in the through-hole 211 of the first through-hole member 205 (FIG. 18A).

Subsequently, after the plug 203 was attached to the adapter 204 by engaging the latch 208 to the engaging part 209 (FIG. 18B), the sliding member 214 of the plug 203 was slid to the side of the optical-fiber threading part 206b to release the bending part 201a, and the bending part 201a was restored to the extended state by elastic restoring force, thereby the ends of the optical fibers 201 and 202 were optically connected to each other, thus the optical connection structure of the present invention was manufactured (FIG. 18C).

In the optical connection structure provided by the Example 2-2, in the connection of the optical fiber on the printed board and in the device, as described above, when the plug was attached to the adapter, after the plug was secured to the plug so as not to move, the end of the optical fiber was moved, and the work for connection of the optical fiber could be performed, therefore, the optical fibers which were secured to the plug did not give a shock of sudden contact to each other and there was no concern for damage to the optical fibers, thus the work for connection could be performed easily and safely. Thus, yields were improved, and the efficiency of the work for the connection was improved. Furthermore, the plug alone could bend the optical fiber by providing the sliding member, which was simple, on the plug, thereby the optical connection structure was made quickly.

Thereafter, the connection loss was measured at the connection point between the optical fibers, the result was 0.5 dB or less, so the characteristic was excellent for the optical connection structure and it was sufficiently available for use.

EXAMPLE 2-3

To manufacture the optical connection structure shown in FIGS. 22A to 22D, two optical fibers, which correspond to the optical fibers 201 and 202 shown in FIG. 22, in which 15 mm of the coating of the optical fiber conductor of 250 μm in diameter were removed from the end, and optical fiber conductors (125 μm in diameter) was cut at 10 mm from the coating end were provided.

The plug 216 shown in FIG. 20A, the adapter 204 shown in FIG. 11, and the pressing jig 212 shown in FIG. 14 were made of ABS resin next. In addition, as the first and the second through-hole members 205 shown in FIG. 12, an eight-wire MT ferrule was cut and only the end thereof was used.

The optical connection structure with the above members was manufactured by a method as shown in FIGS. 22A to 22D.

In FIG. 22A, the first through-hole member 205 was attached to the plug 216, the optical fiber 201 was inserted from the side of the optical-fiber threading part 206a of the plug 216, and at the state where the optical fiber was protruded by 1 mm from the end of the first through-hole member 205, the optical fiber 201 was secured to the optical-fiber threading part 206a of the plug 203 with the adhesive 220.

The second through-hole member 205 was secured to the adapter 204 with the adhesive 220, and the optical fiber 202 was inserted in the through-hole 211. In this case after the end of the optical fiber 202 was retracted for 1 mm into the inside of the through-hole 211 of the second through-hole member 205, the optical fiber 202 was secured with the adhesive 220 (FIG. 22B).

Subsequently, the pressing jig 212 is mounted on the plug 203 made as described above for the optical fiber 201 is bent to form the bending part 201a (FIG. 22A), the end of the optical fiber was retracted in the through-hole 211, and the pressing board 219 of the temporary securing member 217 was tightened with the screw 218 to sandwich the optical fiber 201, and it was temporarily secured in the state where the bending part 201 a was held (FIG. 22B).

After that, the plug 216 was secured to the adapter 204 by engaging the latch 208 to the engaging part 209 (FIG. 22C), the screw 218 of the plug 216 was loosened, and the optical fiber 201 was released from the temporary securing member, thereby the optical fiber 201 was restored to the extended state to move and connect the end of the optical fiber 201, thus the optical connection structure of the present invention was manufactured (FIG. 22D).

In the optical connection structure provided by the Example 2-3, in the connection of the optical fiber on the printed board and in the device, as described above, when the plug was attached to the adapter, after the plug was secured to the plug so as not to move, the end of the optical fiber was moved, and the work for connection of the optical fiber could be performed, therefore, the optical fibers which were secured to the plug did not give a shock of sudden contact to each other and there was no concern for damage to the optical fibers, thus the work for connection could be performed easily and safely. Thus, yields were improved, and the efficiency of the work for the connection was improved.

Furthermore, the temporary securing member was provided to the plug, before manufacturing the optical connection structure, the flexure of the optical fiber was maintained, therefore, it was not necessary to bend the optical fiber at the time of connection, and the work for connection could be performed smoothly.

Thereafter, the connection loss was measured at the connection point between the optical fibers, the result was 0.5 dB or less, so the characteristic was excellent for the optical connection structure and it was sufficiently available for use.

EXAMPLE 2-4

To manufacture the optical connection structure shown in FIG. 24C, two MU ferrules (made by Sanwa Denki Kogyo Co., Ltd., including a zirconia ferrule) which correspond to the ferrules 221 and 224 shown in FIG. 23 were used, optical fiber conductors (125 μm in diameter) were bared by removing the coating in the vicinity of the end of the optical fibers 201 and 212 (made by Furukawa Electric Co., Ltd., 900 μm in diameter) to be inserted to the ferrules and secured and polished.

The plug 203 and the adapter 204 shown in FIGS. 24A to 24C were made of ABS resin.

The optical connection structure with the above members was manufactured by a method as shown in FIGS. 24A to 24C.

In FIG. 24A, one ferrule 221 in which the optical fiber was attached to the plug 203 was slidably threaded through the optical-fiber threading part 206d of the plug 203, and the optical fiber 201 was secured to the optical-fiber threading part 206a with the adhesive 220. To the other MU ferrule 224 the metal split sleeve (made by Sanwa Denki Kogyo Co., Ltd., made of phosphor bronze) 227 was attached, and the ferrule was secured to the adapter 204 by an adhesive (not shown).

Next, the bending part 201a was formed by slightly retracting the MU ferrule 221 of the plug 203 made as described above backward in the direction of the optical-fiber threading part 206a (FIG. 24A).

Thereafter, the plug 203 was attached to the adapter 204 by engaging the engaging part 209 with the latch 208 (FIG. 24B), the collar 223 of the MU ferrule 221 was abutted against the optical-fiber threading part 206d, the end of the MU ferrule 221 was inserted in the metal split sleeve 227, with this the bending part 201a in the bending cell 207 was released, the bending part 201a was extended by elastic restoring force to extend to restore to the straight state, the ends of the optical fiber 201 and 202 were abutted against each other to be optically connected, thus the optical connection structure of the present invention was manufactured (FIG. 24C).

In the optical connection structure provided by the Example 2-4, in the connection of the optical fiber on the printed board and in the device, as described above, when the plug was attached to the adapter, after the plug was secured to the adaptor so as not to move, the end of the optical fiber which was attached to the ferrule was moved, and the work for connection of the optical fiber could be performed, therefore, the ferrules and the optical fibers which were fixed to the plug did not give a shock of sudden contact to each other and there was no concern for damage to the optical fibers, thus the work for connection could be performed easily and safely. Thus, yields were improved, and the efficiency of the work for the connection was improved.

Furthermore, as the Example 2-2, the plug alone could bend the optical fiber by providing the ferrule as the sliding member on the plug, thereby the optical connection structure was made quickly.

Thereafter, the connection loss was measured at the connection point between the optical fibers, the result was less than 0.2 dB, so the characteristic was excellent for the optical connection structure and it was sufficiently available for use.

Third Aspect

Figure 26A:
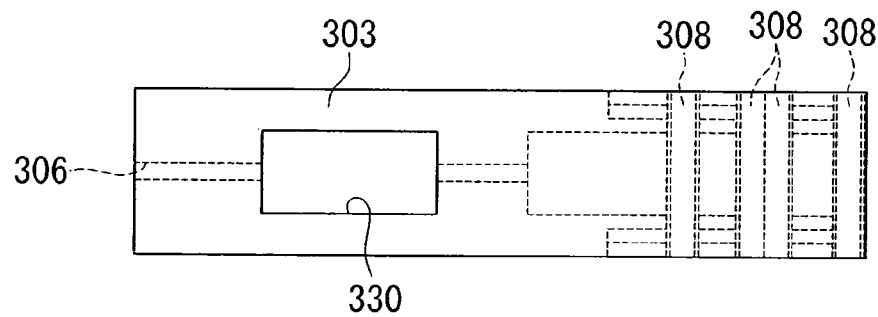
FIGS. 26A and 26B are plan views showing the optical connection structure of the third aspect of the present invention.
Figure 26B:
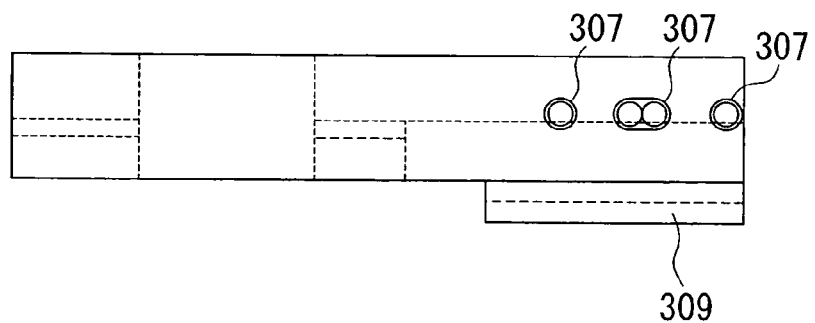
Figure 27A:
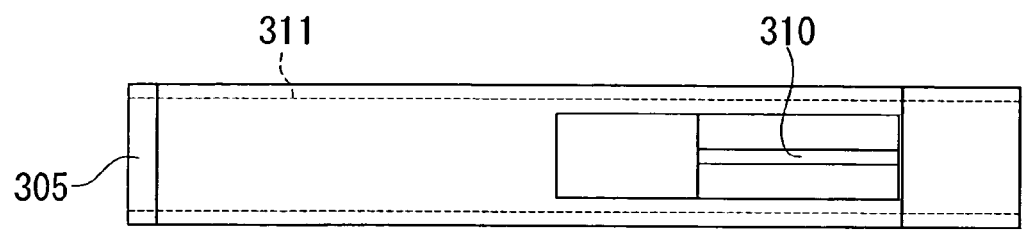
FIGS. 27A and 27B are plan views showing the optical connection structure of the third aspect of the present invention.
Figure 27B:
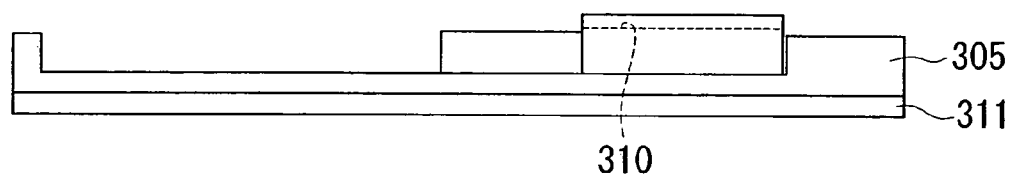

Examples of the third aspect of the present invention will be described with reference to the drawings as follows. The optical connection structure shown in FIG. 25 comprises a first plug 303 to which a first optical fiber is attached as shown in FIGS. 26A and 26B and an adapter 305 having an alignment groove 310 as shown in FIGS. 27A and 27B. The first plug 303 in FIGS. 26A and 26B has an optical-fiber securing member 306 securing a part of the optical fiber 301, pin-shaped lead members 308 mounted on a mounting hole 7, and a latch 309. In addition, the adapter 305 has the alignment groove 310 and the latch engaging part 311.

The manufacturing method of such optical connection structure will be described below with reference to FIGS. 28A to 28C. First the second optical fiber 302 is secured to the adapter 305 (refer to FIG. 28A). Next, the front end side of the first optical fiber 301 which is secured to the first plug 303 by the optical-fiber securing member 306 bends, and the first plug 303 is attached to the adapter 305 (refer to FIG. 28B). On that occasion the first optical fiber and the second optical fiber are closedly-contacted and supported to the alignment groove 310 by the force of the pin-shaped lead members 308 (308a, 308b, 308c, and 308d) of the first plug 303, and thus the optical fibers are aligned to each other. Thereafter because the bending first optical fiber 301 extends, the first optical fiber 301 and the second optical fiber 302 are abutted against make the optical connection structure of the present invention (refer to FIG. 28C).

Therefore, in the connection of the optical fiber on the printed board or in the device, by mounting the plug to the adapter from above, space for the work for connection is not needed on the substrate, space can be saved. In addition, the end of the optical fiber is moved by extending the optical fiber which bends after the plug is mounted on the adapter, so that the work for connection of the optical fibers can be performed. Therefore, the connected optical fibers do not give a shock of sudden contact to each other and there is no concern for damage to the optical fibers, thus the work for connection can be performed easily and safely. In addition, by pressing the optical fiber to the V-shaped groove by a pin-shaped member, the optical fibers are aligned to each other with reliability and the end of the optical fiber can move to an axial direction of the optical fiber smoothly.

Figure 29:
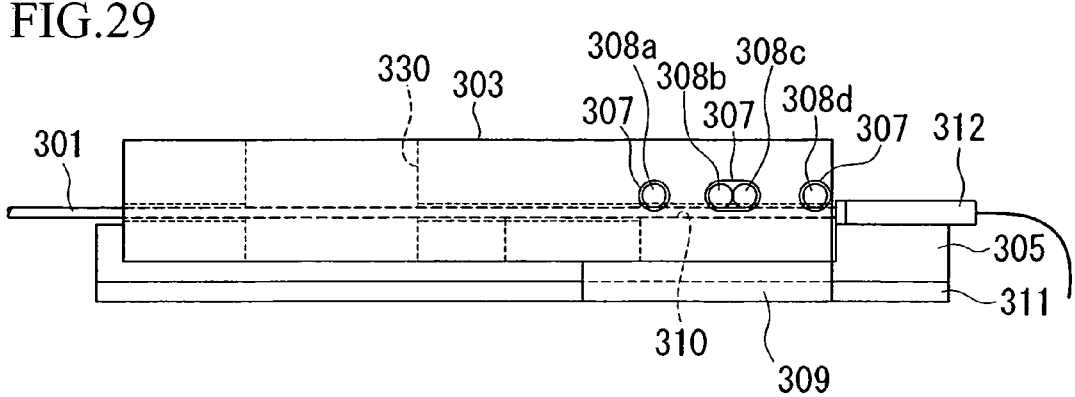
FIG. 29 is a plan view showing another optical connection structure of the third aspect of the present invention.

The present invention provides the optical connection structure wherein the first and the second optical fibers are optically connected by abutting the ends of the optical fibers against each other in the alignment groove on the adapter that has the alignment groove of which the top surface is opened. However, when the first optical fiber is optically connected to an optical component such as a laser module directly, namely, when the connection is performed without a second optical fiber, the connection structure of the present invention can be used in an approximately same form. An example of this is shown in FIG. 29. The reference numeral 312 in FIG. 29 denotes a laser module, and other reference numerals are the same as in FIG. 25. PC connection is enabled by extending the length of the first optical fiber 301 to an end face of the laser module 312.

In addition, the adapter in the optical connection structure of the present invention is unified with a package used for a laser module, and an electric terminal such as a lead frame may be mounted so that the adapter is implemented on a printed board. In this way the connection of the optical fiber and the optical component that the second optical fiber does not exist among them is included by the present invention.

Figure 30:
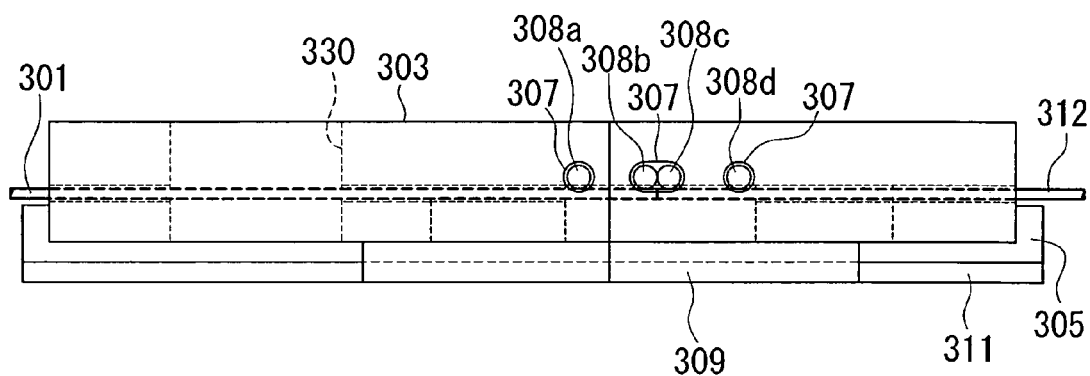
FIG. 30 is a plan view showing another optical connection structure of the third aspect of the present invention.
Figure 31A:
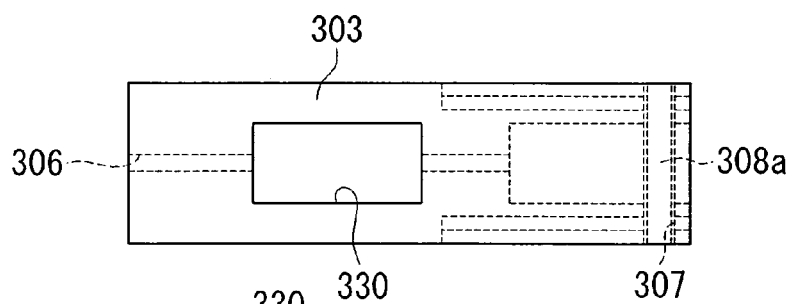
FIGS. 31A and 31B are plan views showing another optical connection structure of the third aspect of the present invention.
Figure 31B:
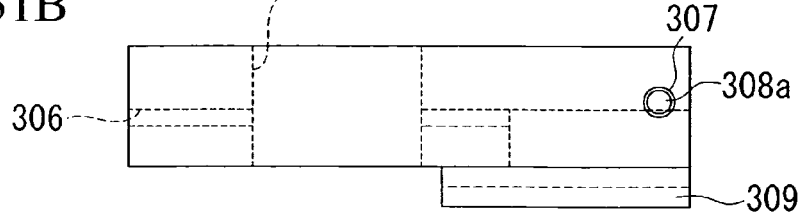
Figure 32A:
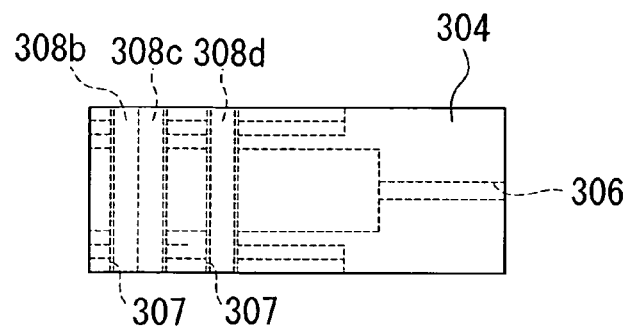
FIGS. 32A and 32B are plan views showing another optical connection structure of the third aspect of the present invention.
Figure 32B:
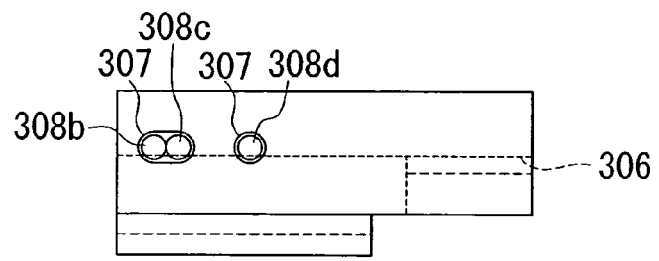
Figure 33:
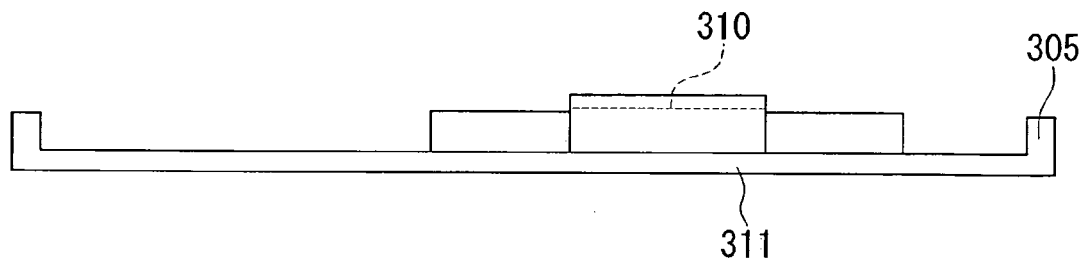
FIG. 33 is a plan view showing another optical connection structure of the third aspect of the present invention.

Furthermore, FIG. 30 shows the optical connection structure between the first optical fiber 301 attached to the first plug 303 and the second optical fiber 302 attached to the second plug 304, and the optical connection structure is constituted of the first plug 303 shown in FIGS. 31A and 31B, the second plug 304 shown in FIGS. 32A and 32B, and the adapter 305 having the alignment groove 310 on which two plugs shown in FIG. 33 can be mounted. The first plug 303 and the second plug 304 shown in FIGS. 31A and 31B and 32A and 32B comprise the optical-fiber securing member 306 securing a part of the optical fiber, the pin-shaped lead members 308 (308a, 308b, 308c, and 308d) mounted on the mounting hole 7 of the pin-shaped lead members, and the latch 309. In addition, the adapter has the alignment groove 310 and the latch engaging part 311.

The manufacturing method of such an optical connection structure will be described below with reference to FIGS. 34A to 34D. First, the front end side of the first optical fiber 301 which is secured to the first plug 303 by the optical-fiber securing member 306 bends (refer to FIG. 34A), the first plug 303 is attached to the adapter 305 (refer to FIG. 34B), next, the second plug 304 is attached to the adapter 305 (refer to FIG. 34C). On that occasion the first optical fiber 301 and the second optical fiber 302 are closedly-contacted and supported to the alignment groove 310 by the force of the pin-shaped lead members 308 (308a, 308b, 308c, and 308d) of the first plug 303 and the second plug 304, and thus the optical fibers are aligned to each other (refer to FIG. 34C).

Figure 34A:
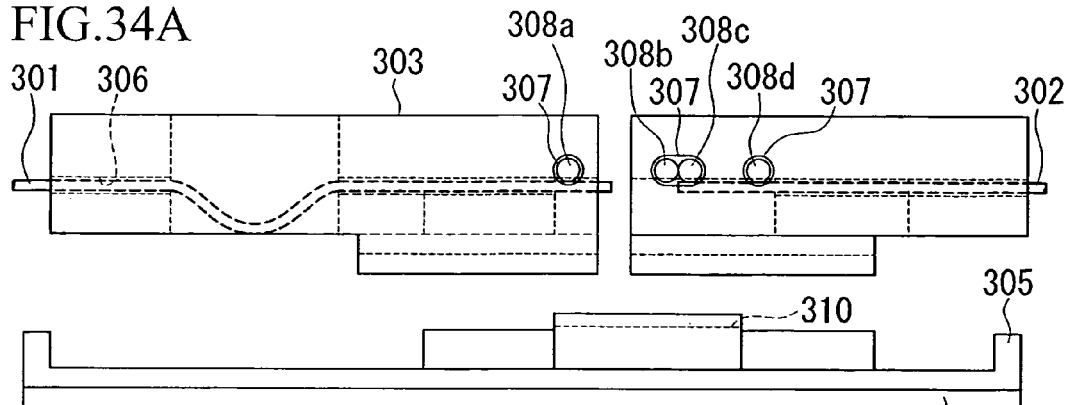
FIGS. 34A to 34D are plan views showing a method for manufacturing the optical connection structure of the third aspect of the present invention.
Figure 34B:
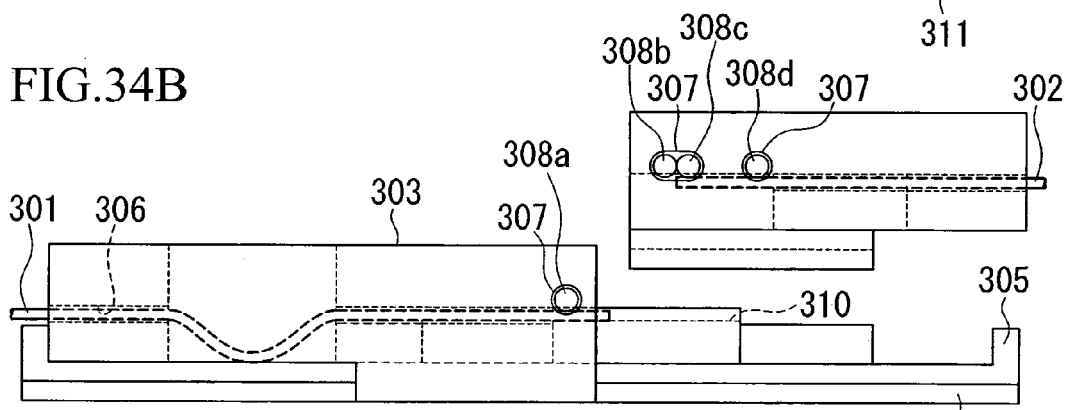
Figure 34C:
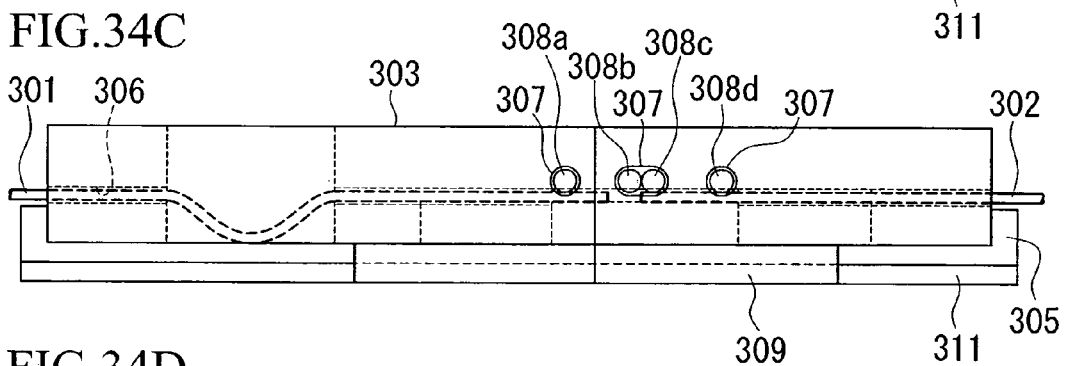
Figure 34D:
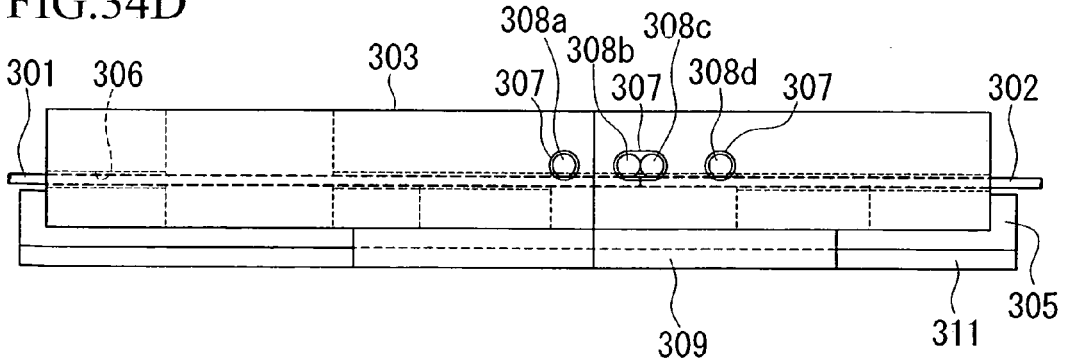

Thereafter, the bending first optical fiber 301 is extended, thereby the first optical fiber 301 and the second optical fiber 302 are abutted against form the optical connection structure of the present invention (refer to FIG. 34D). In the method for manufacturing the optical connection structure shown in FIG. 34, the first optical fiber 301 is bent before the first plug 303 is attached to the adapter 305, on the contrary, it does not matter that the first optical fiber 301 bends after the first plug 303 is attached to the adapter 305.

Therefore, according to the above, all optical fibers can be treated separately from the adapter by attaching the second optical fiber 302 to the second plug 304. Thus, the work to install the adapter on the substrate can be performed easily, and there is no concern for damage to the optical fiber at the time of installation work.

Figure 35:
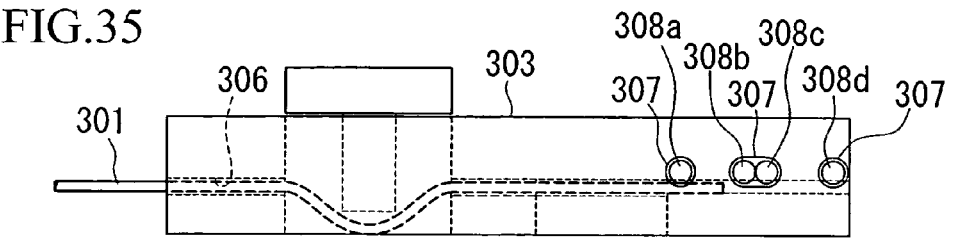
FIG. 35 is a plan view showing the method for manufacturing the optical connection structure of the third aspect of the present invention.

In the first plug 303 used for the optical connection structure of the present invention mentioned above, a flexural shape of the bending part of the first optical fiber 301 is not limited in particular. However, the bending cell is provided in the first plug mentioned above and the bending part is housed in the plug in consideration of an effect to protect the optical fiber, but not limited to this, the bending part may be exposed as long as the optical fiber is not damaged. In addition, the bending part can be made by mounting the fiber bending member 318 as shown in FIG. 35 on the first plug 303 from above the first plug 303.

By using such a fiber bending member, without touching the thin optical fiber directly, the bending step can be performed safely. In addition, with regard to the shape of the optical fiber after connecting the optical fibers or the optical fiber and the optical component, before the first optical fiber 301 is fully extended on the extending process, the first optical fiber 301 is abutted against the second optical fiber 302, the state where the optical fiber 301 is bent can be maintained. In some cases the first optical fiber 301 is fully extended, and the second optical fiber 302 is bent. In any case, if the optical fiber is not damaged and the optical characteristic is not influenced, there is no problem in particular.

Figure 36:
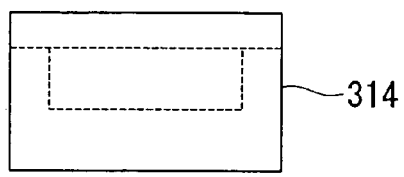
FIG. 36 is a plan view showing the method for manufacturing the optical connection structure of the third aspect of the present invention.
Figure 37:
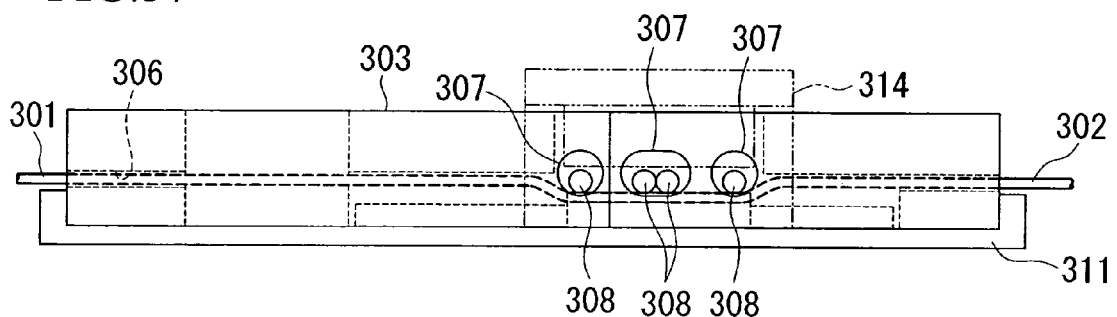
FIG. 37 is a plan view showing the method for manufacturing the optical connection structure of the third aspect of the present invention.

The first optical fiber 301 and the second optical fiber 302 are pressed in the alignment groove 310 of the adapter 305 by the pin-shaped lead members 308 attached to the respective plugs 303 and 304 by mounting the first and the second plugs 303 and 304 on the adapter 305. In addition, the pressing fixation member 314 shown in FIG. 36 is attached to the adapter 305 shown in FIG. 37, and the pin-shaped lead members 308 are sandwiched by the pressing fixation member 314 and the alignment groove 310, thereby the optical fiber can be pressed and secured.

Figure 38A:
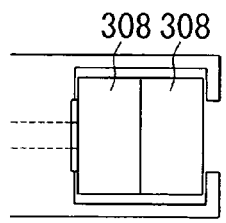
FIGS. 38A and 38B are plan views showing the method for manufacturing the optical connection structure of the third aspect of the present invention.
Figure 38B:
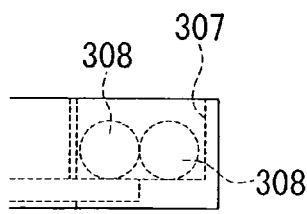

Thus, the optical fibers 301 and 302 can be secured in the alignment groove 310 more reliably, and the optical characteristics can be stabilized more. In addition, for a method for mounting the pin-shaped lead members 308 on the plugs 303 and 304, the through-hole which can be opened from the side of the first plug is used in FIG. 25, however, a form such as a groove which is opened from the above surface as shown in FIGS. 38A and 38B can be adopted if the pin-shaped lead members 308 can be held by the plugs 303 and 304. In addition, when the pin-shaped lead members 308 are pressed to the alignment groove 310 by using the above-described pressing fixation member 314, it is preferable to mount the plugs 303 and 304 on the pin-shaped lead members 308 so that the pin is urged to the alignment groove 310 directly, and the through-hole which holds the pin or the lowest surface of the groove becomes lower than the top surface of the alignment groove.

The first and the second plugs 303 and 304 mentioned above can be detachably mounted in an intersection direction against the top surface of the adapter 305. In this case an operator of the connection can perform the work for connection from above, workability is improved, and connection yields can be improved. In addition, when the optical connection structure of the present invention is used on a printed board, there is no connection work parallel with the surface of the substrate, the work space on the substrate necessary for the connection becomes unnecessary. Thus, the space on the substrate can be saved.

Figure 39:
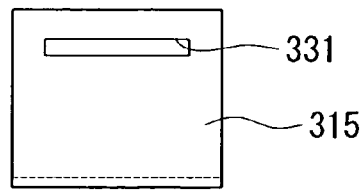
FIG. 39 is a plan view showing the method for manufacturing the optical connection structure of the third aspect of the present invention.
Figure 40A:
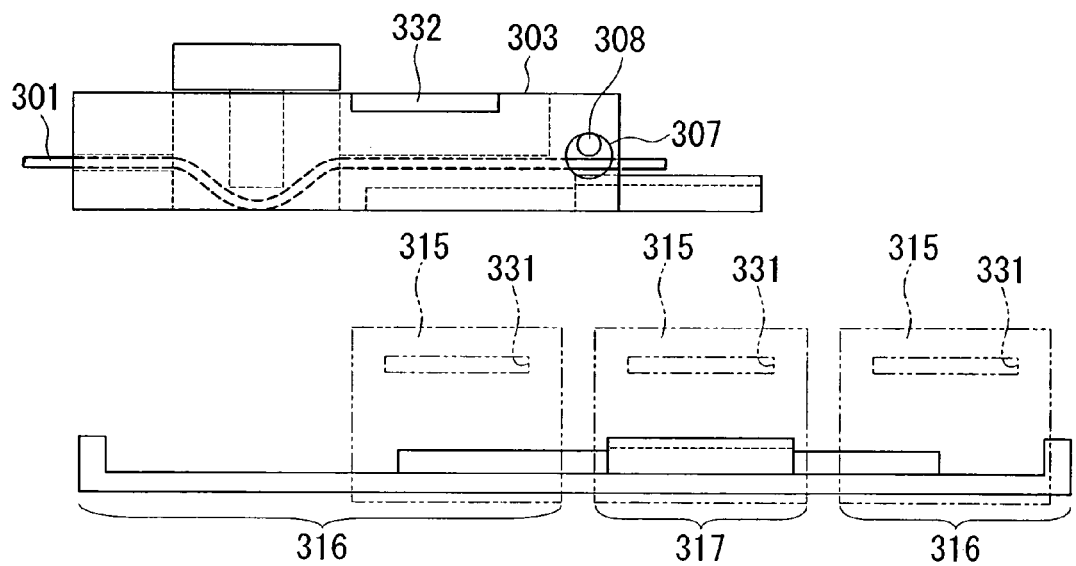
FIGS. 40A and 40B are plan views showing the method for manufacturing the optical connection structure of the third aspect of the present invention.
Figure 40B:
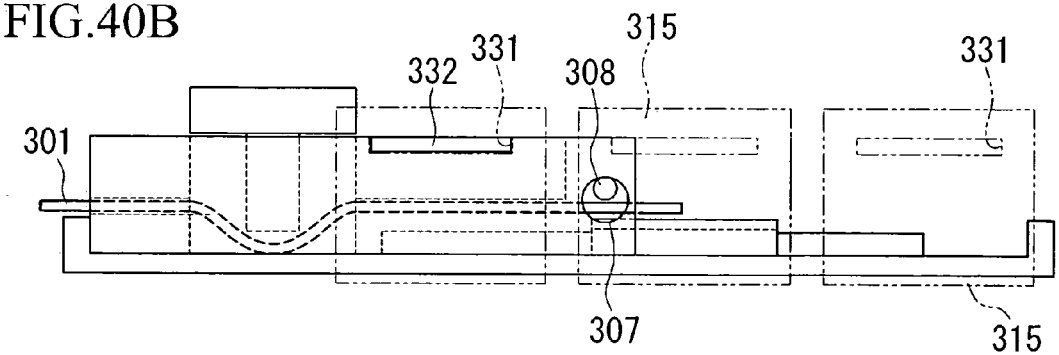

In the description stated above, when the plugs 303 and 304 or the pressing fixation member 314 is attached to the adapter 305, the latch 309 and the latch engaging part 311 are used to fix, however, as shown in FIG. 39, an engagement member 15 which is opened upward can be provided on a place to which the plug is attached 317 and a place to which the pressing fixation member is attached 317 of the adapter as shown in FIG. 40. This engaging method of the engagement member is performed by engaging the protrusion 332 of the pressing fixation member 314 or the plug with a window 331 of the engagement member, however, it is not limited to this, so a latch may be provided on the end of the engagement member. These engagement members may be mounted separately from the adapter or may be formed integrally, either of which is good. Thus, detaching of members from above can be performed easily.

Materials and the shape of the plug and adaptor used in the optical connection structure of the present invention mentioned above are not limited in particular, and plastic, ceramic, metal, zirconia, and glass metal, or the like are used preferably for materials. Also the shape is not limited in particular if the plug is secured to the adapter with reliability. Also, the shape of the alignment groove provided on the adapter is not limited in particular V-character shape is preferable to hold the cylindrical optical fiber with stability. In addition, the alignment groove may be integrated with or separated from the adapter, and the materials are not limited, but materials similar to materials of the adapter can be chosen appropriately and used. The optical fiber used for the optical connecting part of the present invention is chosen and used depending on an application purpose of the optical connection structure appropriately, for example, a single mode optical fiber of silica (quartz) or a plastic, or a multi-mode optical fiber is desirably used. In addition, the number of the optical fibers connected at a time is not limited, therefore, the optical fibers corresponding to the number of the alignment grooves can be connected. Therefore, the number of optical fibers secured to the plug does not have a limit in particular, and an optical fiber tape conductor which bundling up optical fibers can be used similarly.

The optical fiber connecting method may be a method that polishes the end, or a PC (Physical Contact) connection that the optical fibers which are cut are abutted against each other may be adopted. When a refractive index adjusting agent is used, materials, forms, and installation methods are not limited in particular, and the material can be chosen according to the refractive index and the material of the optical fiber appropriately, and, for example, silicone oil and silicone grease are used preferably. In addition, the form of the refractive index adjusting agent may be solid or liquid, and may be, for example, in a form of oil, grease, gel, or film.

EXAMPLE 3-1

Figure 25:
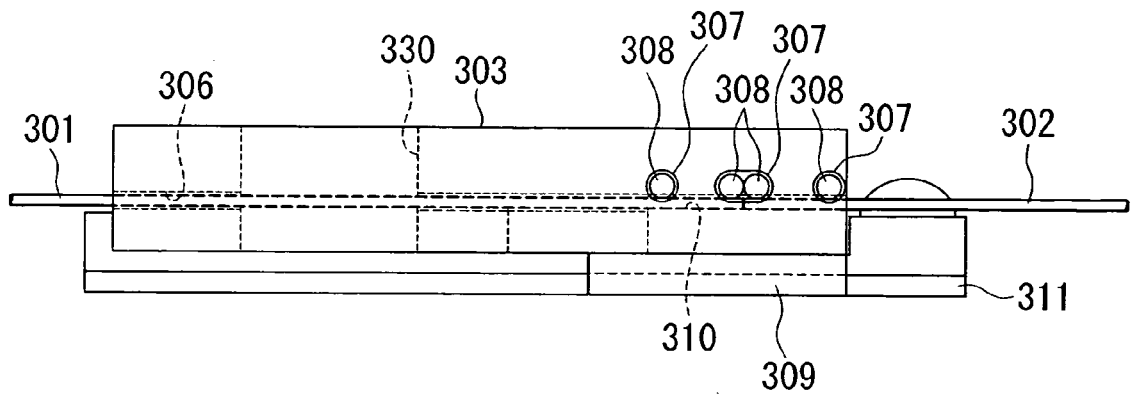
FIG. 25 is a plan view showing the optical connection structure of the third aspect of the present invention.

To manufacture the optical connection structure shown in FIG. 25, a first optical fiber conductor 301 and a second optical conductor 302 shown in FIG. 25, in which 15 mm of the coating of the 250-μm diameter optical fiber conductors were removed from the end, and optical fiber conductors (125 μm in diameter) were cut at 10 mm from the coating end were provided. Next, the first plug 303 shown in FIG. 26A, the adapter 305 shown in FIG. 27A, and the fiber bending member 318 shown in FIG. 35 were made of ABS resin. The four-wire plastic V-shaped groove 310 was cut and was secured to the adapter 305.

The optical connection structure was manufactured as follows. In the following a description will be given with reference to FIGS. 28A to 28C. First stainless steel pins 308a, 308b, 308c, and 308d were used as pin-shaped lead members provided on the first plug, and was attached to the pin mounting hole 307 of the first plug, and in the state where the end of the first optical fiber 301 was aligned to the middle of the stainless steel pins 308b and 308c, the first optical fiber 301 was secured to the optical-fiber securing member 306 of the first plug 303 by an adhesive. In addition, the second optical fiber was secured to the adapter with the adhesive 319 so that the end was located in the center of the V-shaped groove.

Figure 28A:
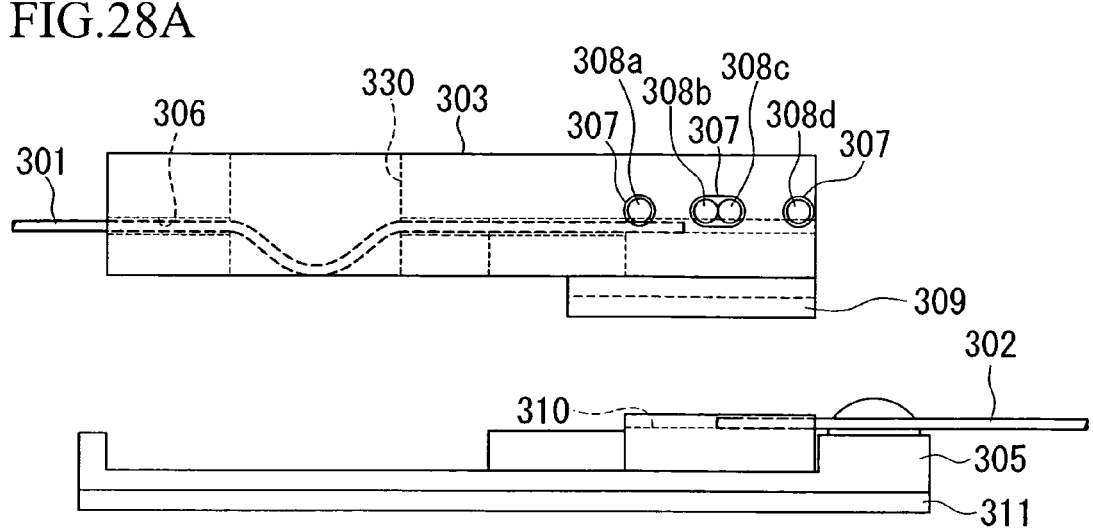
FIGS. 28A to 28C are plan views showing the optical connection structure of the third aspect of the present invention.
Figure 28B:
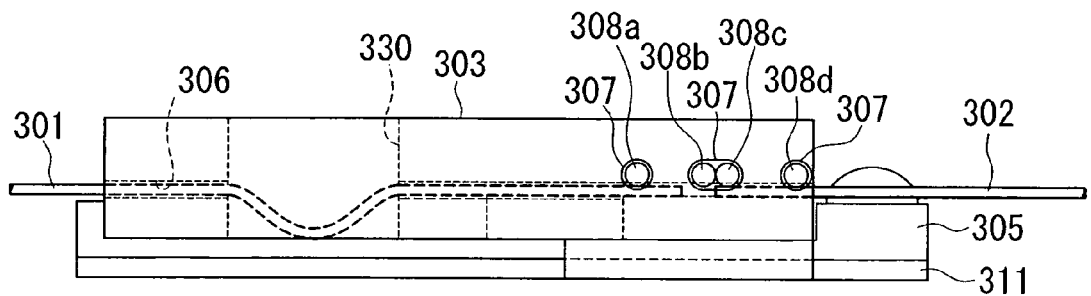
Figure 28C:
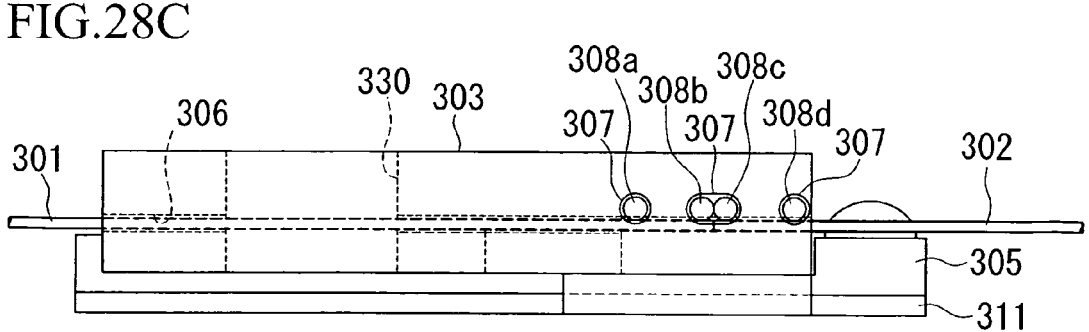

Next, the fiber bending member 318 (the member shown in FIG. 35) which is not illustrated was attached to the first plug 303 to bend the first optical fiber 301, and the end of the optical fiber was retracted by 1 mm (refer to FIG. 28A). Thereafter the first plug 303 was attached and secured to the adapter 305 by engaging the latch 309 with the latch engaging part 311, the first optical fiber 301 and the second optical fiber 301 were pressed into the V-shaped groove 310 by the stainless steel pins 308a, 308b, 308c, and 308d, the end faces of the first optical fiber 301 and the second optical fiber 302 were aligned (refer to FIG. 28B), after that, the fiber bending member 318 was separated from the first plug 303, and the first optical fiber 301 and the second optical fiber 302 were abutted by extending the first optical fiber 301, thus the optical connection structure of the present invention was acquired (refer to FIG. 28C). In the optical connection structure provided in this way, as described above, in the connection of the optical fiber on the printed board or in the device, by mounting the plug to the adapter from above, space for the work for connection was not needed on the substrate, and space could be saved. In addition, the end of the optical fiber was moved by extending the optical fiber which is bent after the plug was mounted on the adapter, thereby the work for connection of the optical fibers could be performed. Therefore, the connected optical fibers did not give a shock of sudden contact to each other and there was no concern for damage to the optical fibers, thus the work for connection could be performed easily and safely, and yields were improved, and the efficiency of the work for connection was improved.

In addition, by pressing the optical fiber to the V-shaped groove by the stainless pins, the optical fiber was aligned with reliability and the end of the optical fiber could be move to the axial direction of the optical fiber smoothly. Therefore, the above-stated work for connection could be performed with still further good yields. Thereafter, the connection loss was measured at the connection point and was 0.5 dB or less, so that it was verified that it was sufficiently available for use for the optical connection structure.

EXAMPLE 3-2

Figure 41:
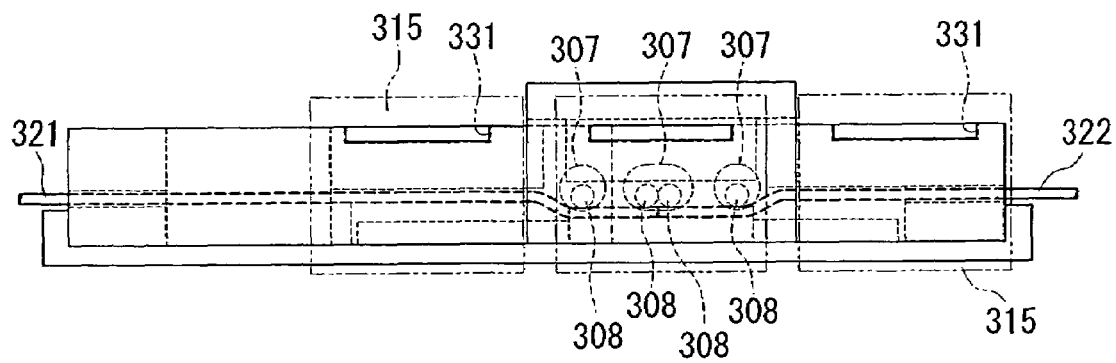
FIG. 41 is a plan view showing the optical connection structure in Example 3-2.

To make the optical connection structure as shown in FIG. 41, a first optical fiber tape conductor 321 and a second optical tape conductor 322, in which 15 mm of the coating of the 250-μm-diameter four-wire optical fiber tape conductors were removed from the end, and optical fiber conductors (125 μm in diameter) were cut for 10 mm from the coating end were provided.

Figure 42A:
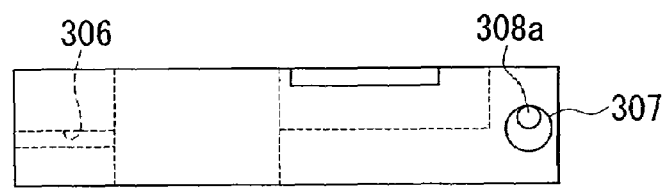
FIGS. 42A and 42B are plan views showing the optical connection structure in Example 3-2.
Figure 42B:
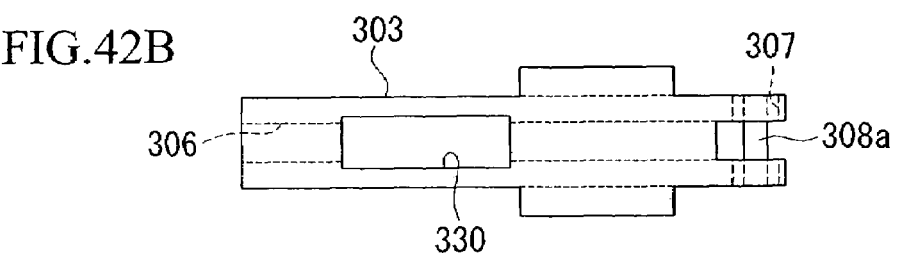
Figure 43A:
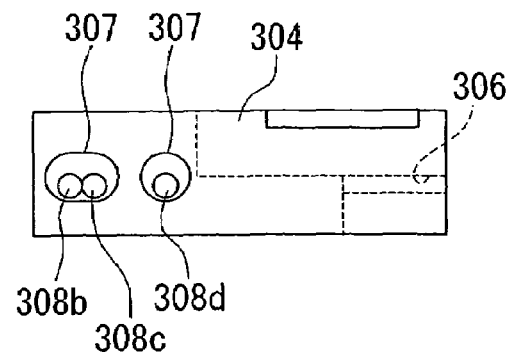
FIGS. 43A and 43B are plan views showing the optical connection structure in Example 3-2.
Figure 43B:
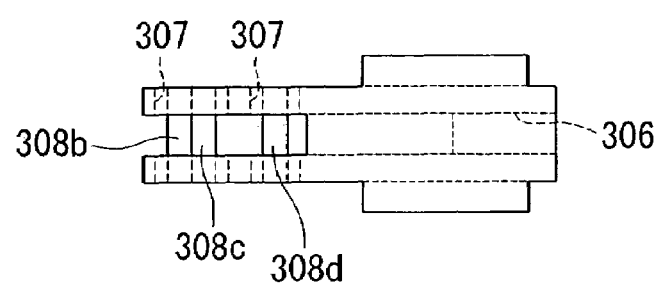
Figure 44A:
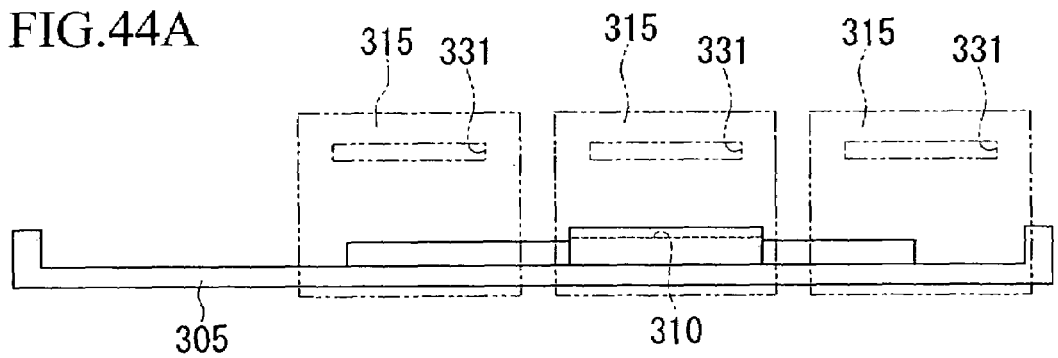
FIGS. 44A and 44B are plan views showing the optical connection structure in Example 3-2.
Figure 44B:
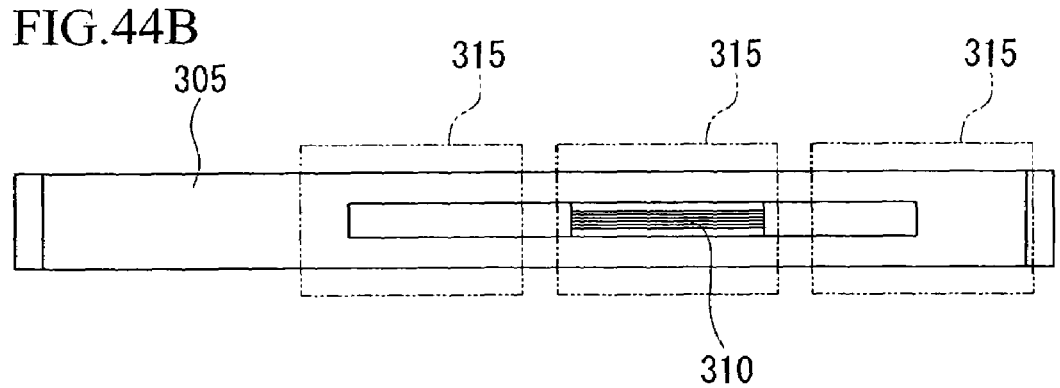
Figure 45:
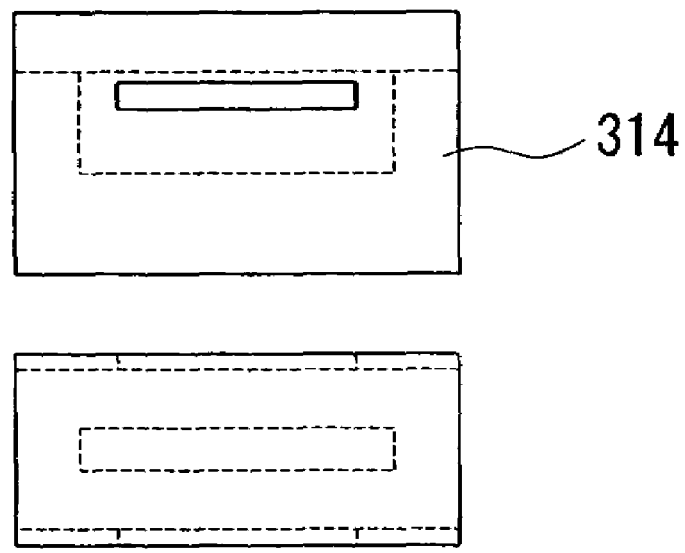
FIG. 45 is a plan view showing the optical connection structure in Example 3-2.

Next, the first plug 303 shown in FIG. 42B, the second plug 304 shown in FIGS. 43A and 43B, the adapter 305 shown in FIGS. 44A and 44B, the pressing fixation member 314 shown in FIG. 45, and the fiber bending member 318 shown in FIG. 35 were made of PPS resin. The four-wire plastic V-shaped groove 310 was cut and was secured to the adapter 305. In addition, three engagement members 315 that fix the pressing fixation member 314 and the plugs 303 and 304 to the adapter 305 as shown in FIG. 39 were made of phosphorus bronze.

The optical connection structure was manufactured as follows. The following description will be given with reference to FIGS. 46A to 46D. First, one stainless steel pin 308a to press the optical fiber in the V-shaped groove to the first plug 303 was attached to a pin-mounting groove 307, in the state where the first optical fiber 301 is protruded by 1.5 mm from the front end of the first plug 303, the first optical fiber 301 was secured to the optical-fiber securing member 306 of the first plug 303 by an adhesive. In addition, three stainless steel pins, 308b, 308c, and 308d were attached to pin mounting grooves of the second plug 304, the second optical fiber 302 was secured to the optical-fiber securing member 306 of the second plug 303 by an adhesive so that the end of the second optical fiber 302 was located between the stainless steel pins 308b and 308c.

Figure 46A:
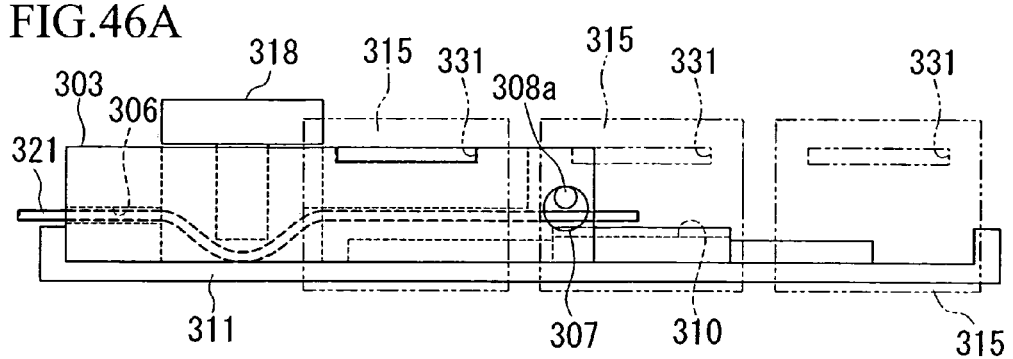
FIGS. 46A to 46D are plan views showing the optical connection structure in Example 3-2.
Figure 46B:
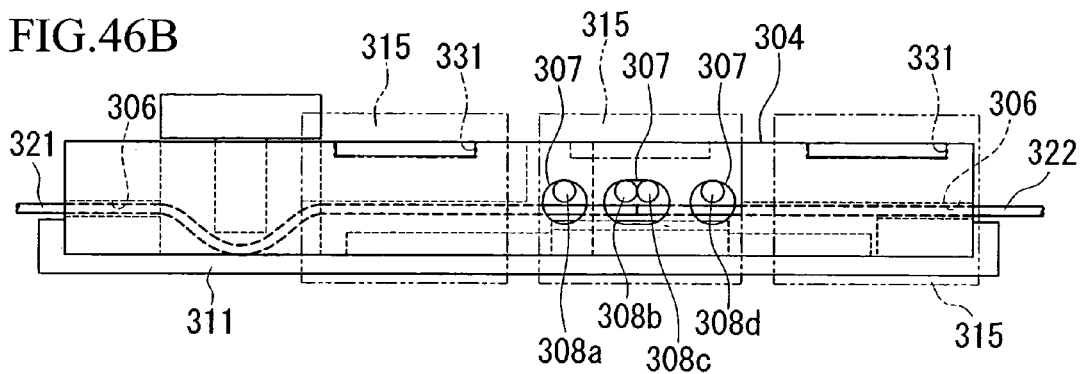
Figure 46C:
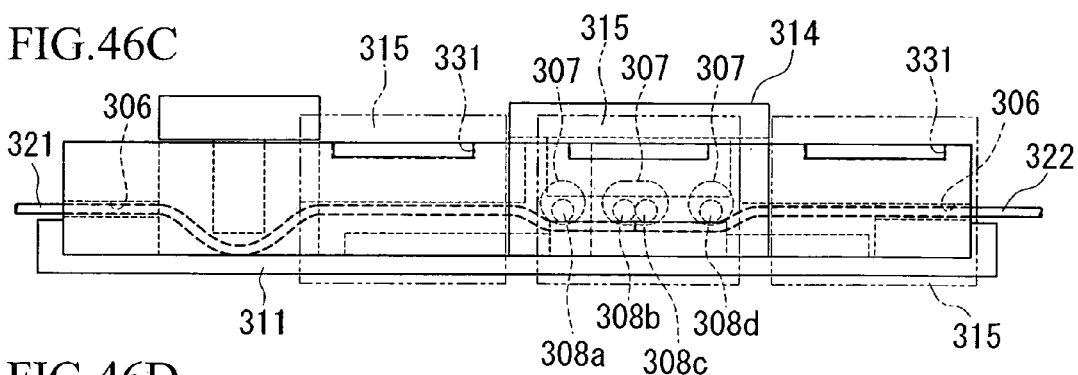
Figure 46D:
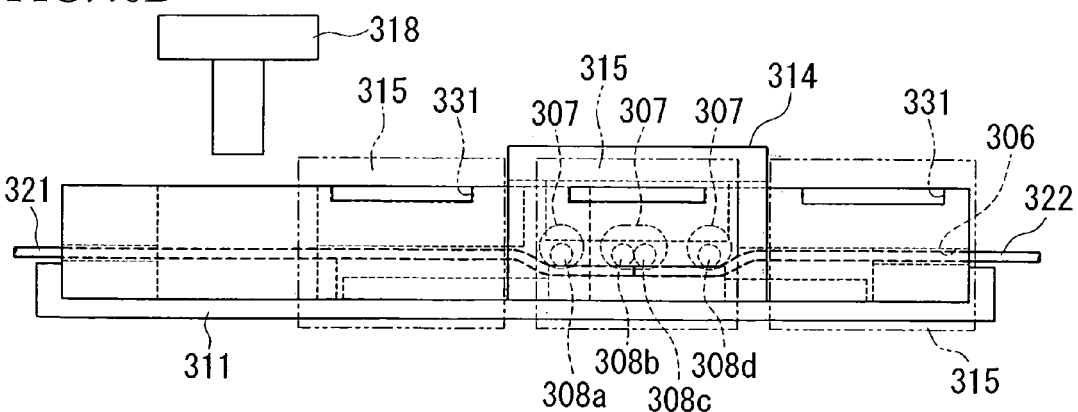
Figure 47:
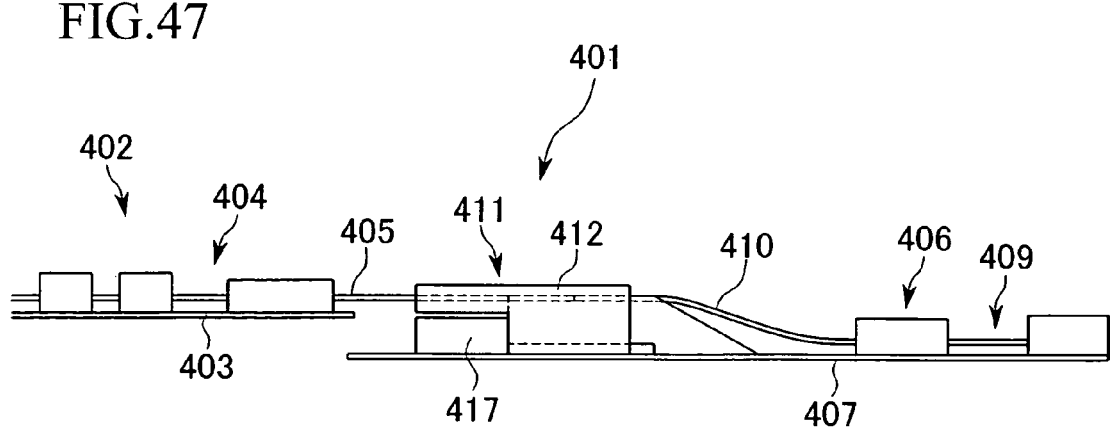
FIG. 47 is a front view showing the whole of the optical connection structure according to the first embodiment of the fourth aspect of the present invention.

The fiber bending member 318 was attached to the first plug 303 made as stated above to bend the first optical fiber 301, and the end of the optical fiber was retracted by 1 mm (refer to FIG. 46A). Thereafter the first plug 303 was attached and secured to the adapter 305 by an engagement member 315, subsequently the second plug 304 was attached and secured to the adapter 305 similarly (refer to FIG. 46B), the fiber bending member 318 was attached to the adapter 305 along notches of the plugs 303 and 304 so as to sandwich the stainless steel pins 308a, 308b, 308c, and 308d between the V-shaped groove 310, the first optical fiber 301 and the second optical fiber 302 were pressed in the V-shaped groove 310 by stainless steel pins 308a, 308b, 308c, and 308d, by securing with the engagement member 315 the same as the plugs 303 and 304, the end faces of the first optical fiber 301 and the second optical fiber 302 were aligned (refer to FIG. 46C), after that, by separating the fiber bending member 318 from the plugs 303 and 304, and the first optical fiber 301 and the second optical fiber 302 were abutted by extending the first optical fiber 301, thus the optical connection structure of the present invention was acquired (refer to FIG. 46D).

The optical connection structure which was provided had an excellent effect the same as the Example 3-1. In addition, by attaching the second optical fiber 302 to the second plug 304 as described above, all optical fibers were able to be treated separately from the adapter, the work to install the adapter on the substrate could be performed easily, and there was no concern for damage to the optical fiber at the time of installation work.

In addition, by pressing and securing the stainless steel pins 308 by sandwiching them with the pressing fixation member and the V-shaped groove, the optical fiber could be secured in the V-shaped groove with more reliability, and the optical property could be stabilized more. In addition, the plug and the pressing fixation member were attached and secured to the adapter with the engagement member which is opened upward, thus detaching of members from above became possible to be performed easily.

By these, the work for connection could be performed with good yields further still. Thereafter, the connection loss was measured at the connection point and was 0.5 dB or less, thereby it was verified that it was sufficiently available for use for the optical connection structure.

Fourth Aspect

Examples of the fourth aspect of the present invention will be described as follows. In the following description, the optical fiber is cited as a light transmitting medium, however, light transmitting mediums but optical fibers are included in the present invention.

Figure 48A:
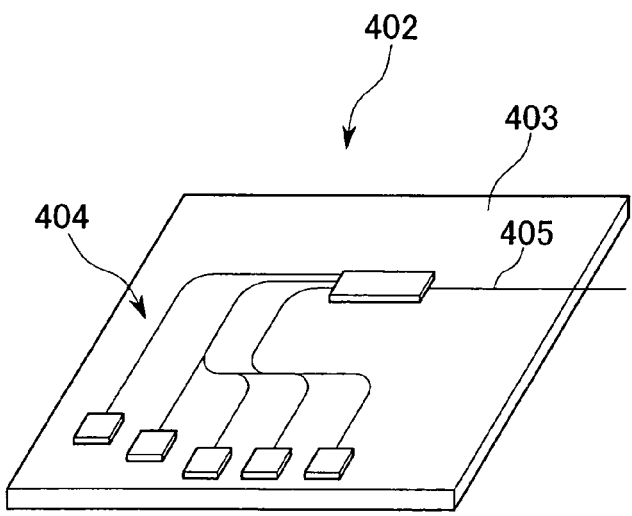
FIGS. 48A and 48B are perspective views showing a first optical body and a second optical body of FIG. 47.
Figure 48B:
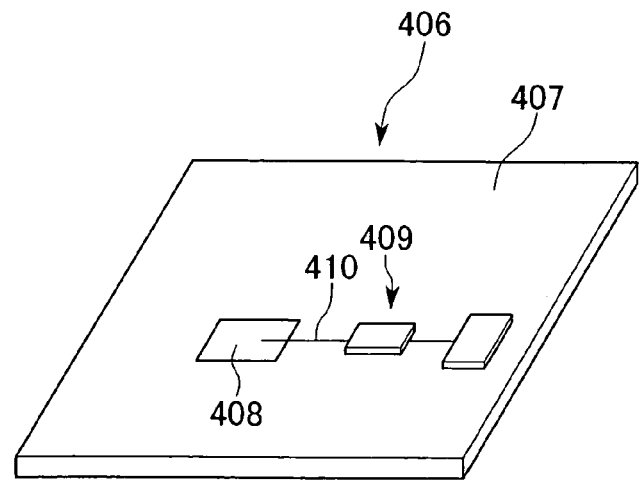
Figure 49:
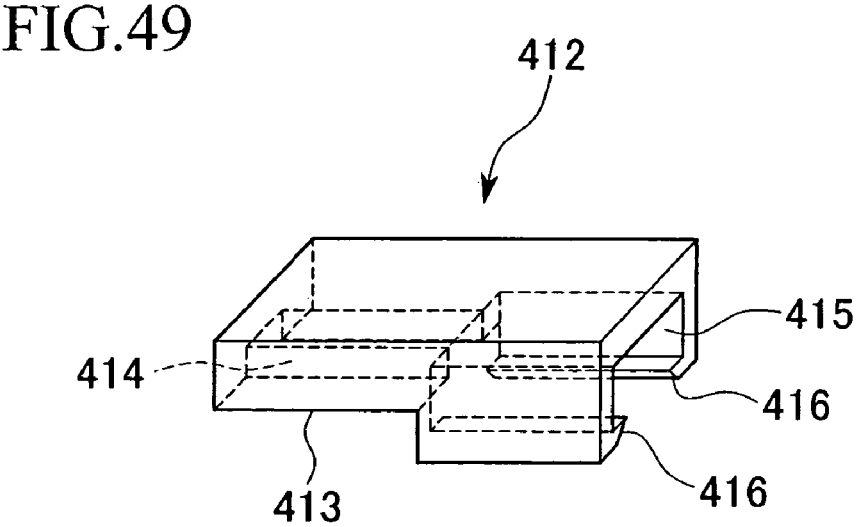
FIG. 49 is a perspective view showing the plug of a connection means of FIG. 47.
Figure 50:
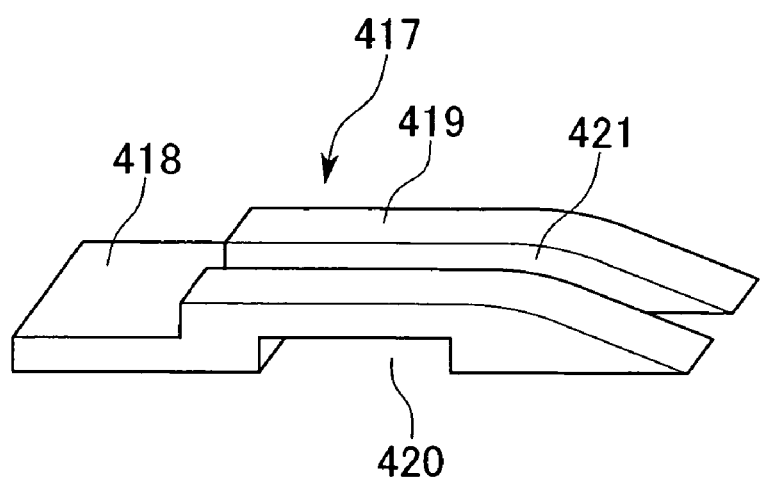
FIG. 50 is a perspective view showing an adapter of the connection means of FIG. 47.
Figure 51A:
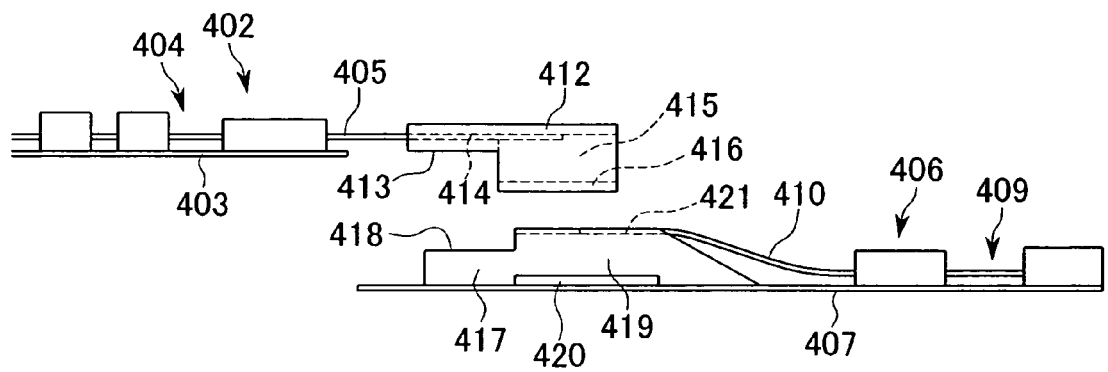
FIGS. 51A to 51C are illustrations showing manufacturing procedures of the optical connection structure shown in FIG. 47.
Figure 51B:
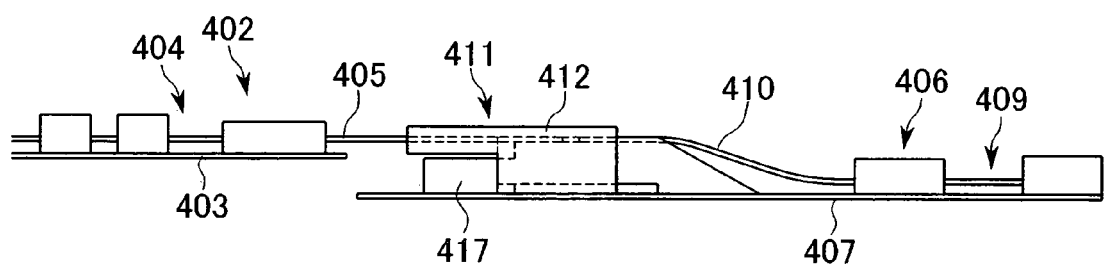
Figure 51C:
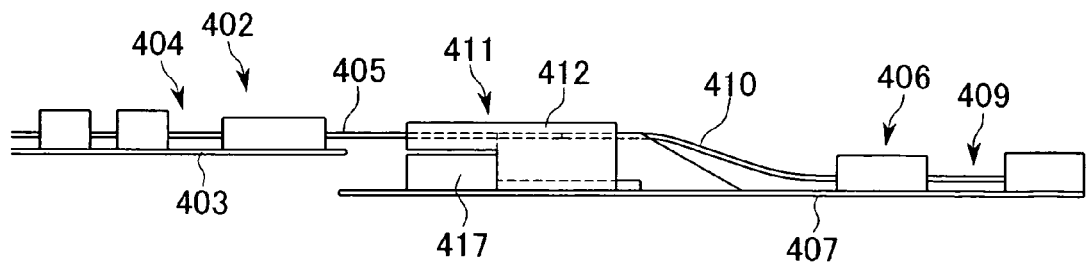
Figure 52:
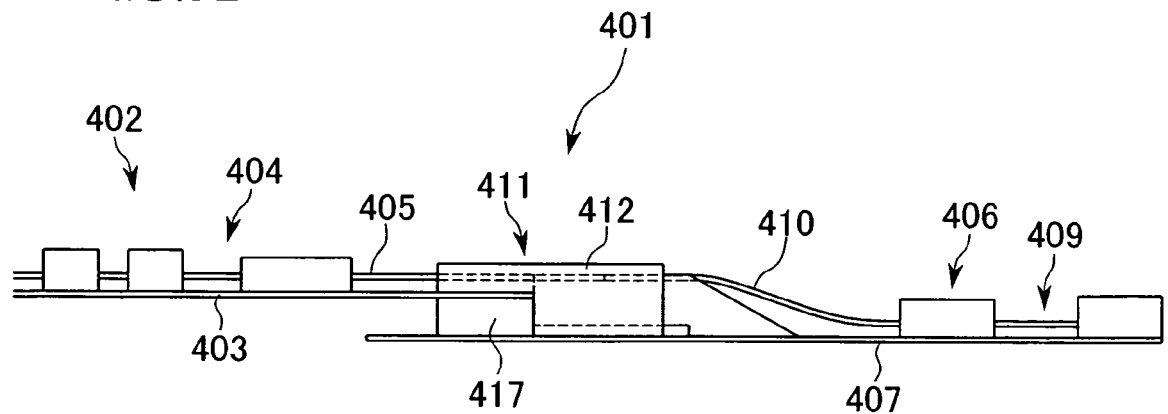
FIG. 52 is a front view showing the whole of the second embodiment of the optical connection structure of the fourth aspect of the present invention.

A first embodiment of the optical connection structure and the method for manufacturing the optical connection structure by the fourth aspect of the present invention are shown in FIGS. 47 to 51A to 51C, FIG. 47 is a front view showing the whole of the optical connection structure, FIGS. 48A and 48B are perspective views showing a first optical body and a second optical body, FIG. 49 is a perspective view showing a plug of a connection means, FIG. 50 is a perspective view showing an adapter of the connection means, and FIGS. 51A to 51C are illustrations showing procedures of the manufacturing method for the optical connection structure.

In other words this optical connection structure 401 has the first optical body 402, the second optical body 406, and the connection means 411 to connect the first optical body 402 and the second optical body 406 to each other as shown in the drawings.

The first optical body 402 consists of a board-shaped first substrate 403, a first optical circuit 404 comprising various parts and provided at the upper part of the first substrate 403, and a first optical fiber 405 which is drawn from the first optical circuit 404 and is wired to the upper part of the first substrate 401 as shown in FIG. 48A.

The second optical body 406 consists of a board-shaped second substrate 407, a second optical circuit 409 comprising various parts and provided at the upper part of the second substrate 407, and a second optical fiber 410 which is drawn from a second optical circuit 409 and is wired in the upper part of the second substrate 407 as shown in FIG. 48B.

The connection means 411 consists of a plug 412 and an adapter 417 connected to the plug 412 to each other as shown in FIGS. 49 and 50, and the first optical fiber 405 of the side of the first optical body 402 and the second optical fiber 410 of the side of the second optical body 406 are optically connected to each other via the connection means 411.

The plug 412 is approximately a rectangular solid as shown in FIG. 49, an optical-fiber securing part 413 which is one step lower than the right half region is provided on the left half on the underside, the optical-fiber storing groove 414 with a predetermined depth that one end opens to the one end surface of the plug 412 is provided in the central part of this optical-fiber securing part 413, and the front end of the first optical fiber 405 is constructed so as to be inserted inside the optical-fiber storing groove 414.

In the right half of the underside of the plug 412, an engaging groove 415, in which the one end is communicated with the other end of the optical-fiber storing groove 414, the other end is opened to the other end face of the plug 412, of which the depth is the same as the optical-fiber storing groove 414, and the width is wider than the optical-fiber storing groove 414, is provided, and the engaging part 419 of the adapter 417 which will be described later is constructed so as to be engaged in the engaging groove 415.

A pair of the locking hooks 416 and 416 which protrude to the inside of the engaging groove 415 are provided integrally on the both ends of the width direction of the opening of the engaging groove 415, and the plug 412 is secured to the upper part of the adapter 417 by locking the locking hooks 416 and 416 in the locking grooves 420 and 420 of the adapter 417 which will be described later.

The adapter 417 is approximately a rectangular solid longer than the plug 412 as shown in FIG. 50, an optical-fiber securing part 418 which is lower by one stage than the other part is provided on the left end on the upper face side, and when the plug 412 is attached to the adapter 417, the optical-fiber securing part 413 of the plug 412 is located in the optical-fiber securing part 418.

A central part consecutive to the optical-fiber securing part 418 of the top surface side of the adapter 417 is formed in the engaging part 419 which can be engaged in the engaging groove 415 of the plug 412, the locking grooves 420 and 420 with a predetermined depth are provided on the both side faces of the engaging part 419, and when the plug 412 is attached to the adapter 417, the locking hooks 416 and 416 on the plug 412 side are locked in the locking grooves 420 and 420.

The right end part of the top surface side of the adapter 417 is formed on the inclined plane which gradually lowers from the central part toward the right end plane of the adapter 417. At the central part of the upper surface side of the adapter 417, an alignment groove 421 with a predetermined depth of which the one end is communicated with the optical-fiber securing part 418 and the other end is opened to the right end surface of the adapter 417 is provided, the front end part of the second optical fiber 410 of the second optical body 406 is constructed so as to be inserted in the alignment groove 421, and by inserting the front end of the second optical fiber 410 in the alignment groove 421, the first optical fiber 405 and the second optical fiber 410 are relatively positioned.

The adapter 417 is secured to the upper part of an adapter securing part 408 of the second substrate 407 by a securing means (not shown) such as an adhesive or screw.

Next, the method for manufacturing the optical connection structure constructed as described above will be described.

First, the plug 412 is attached to the end of the first optical fiber 405 by inserting the front end of the first optical fiber 405 which is wired to the upper part of the first substrate 403 of the first optical body 402 in the optical-fiber storing groove 414 of the plug 412 as shown in FIG. 51A.

Next, as shown in FIG. 51A, the adapter 417 is secured to the adapter securing part 408 of the second substrate 407 of the second optical body 406 by securing means such as an adhesive, and the end of the second optical fiber 410 which is wired to the upper part of the second substrate 407 is inserted in the alignment groove 421 of the adapter 417.

Next, as shown in FIG. 51B, the engaging part 419 of the adapter 417 is engaged in the engaging groove 415 of the plug 412, the locking hooks 416 and 416 of the plug 412 side are locked in the locking grooves 420 and 420 of the adapter 417 side, thus the plug 412 is secured to the adapter 417. Thus, the first optical fiber 405 in the optical-fiber storing groove 414 of the plug 412 and the second optical fiber 410 in the alignment groove 421 of the adapter 417 are relatively positioned, and both of the optical fibers 405 and 410 are located on the same axis.

Next, as shown in FIG. 51C, by moving the first substrate 403 of the first optical body 402 and the second substrate 407 of the second optical body 406 in the relatively approaching direction, the first optical fiber 405 of the plug 412 side and the second optical fiber 410 of the adapter 417 side are axially moved in the relatively approaching direction, thus the both of the ends of the optical fibers 405 and 410 are optically connected to each other. In this way the first optical circuit 404 and the second optical circuit 409 are optically connected through the first optical fiber 405 and the second optical fiber 410.

In the optical connection structure and the method for manufacturing the optical connection structure according to this embodiment constructed as described above, the first optical body 402 and the second optical body 406 are relatively slightly moved in the top and bottom direction, the plug 412 mounted on the first optical body 402 side is attached to the adapter 417 mounted on the second optical body 406 side, and by relatively slightly moving the first optical body 402 and the second optical body 406 in the horizontal direction in this state, the second optical fiber 410 of the adapter 417 side and the first optical fiber 405 of the plug 412 side can be optically connected.

Therefore, in the case of optical connection, the movement distance of the first optical fiber 405 and the second optical fiber 410 can be reduced, a space needed for the optical connection work can be reduced. In addition, quantity of movement of the first substrate 403 and the second substrate 407 can be reduced, both substrates 403 and 407 do not come in contact with parts to damage them, thus optical connection with stable high quality can be performed.

In addition, the first optical body 402 having the first optical circuit 404 and the second optical body 406 having the second optical circuit 409 can be arranged in a very close state in the top and bottom direction, thus an optical circuit of a multistage can be made in a small space, and the range of use can be enlarged.

Furthermore, the first optical circuit 404 of the first optical body 402 and the second optical circuit 409 of the second optical body 406 are optically connected by cooperation between the plug 412 and the adapter 417 of the connection means 411, thereby the first substrate 403 and the second substrate 407 can be secured at the same time, thus the efficiency of assembly can be largely enhanced.

In the above description, the plug 412 is secured to the adapter 417 by locking the locking hooks 416 and 416 of the plug 412 to the locking grooves 421 and 421 of the adapter 417, but not limited to this method, the plug and the adapter may be secured with an adhesive, by fitting recesses and projections to each other, by mechanical frictional force, or by a screw, it is sufficient that the adapter and the plug are fixed.

Figure 53:
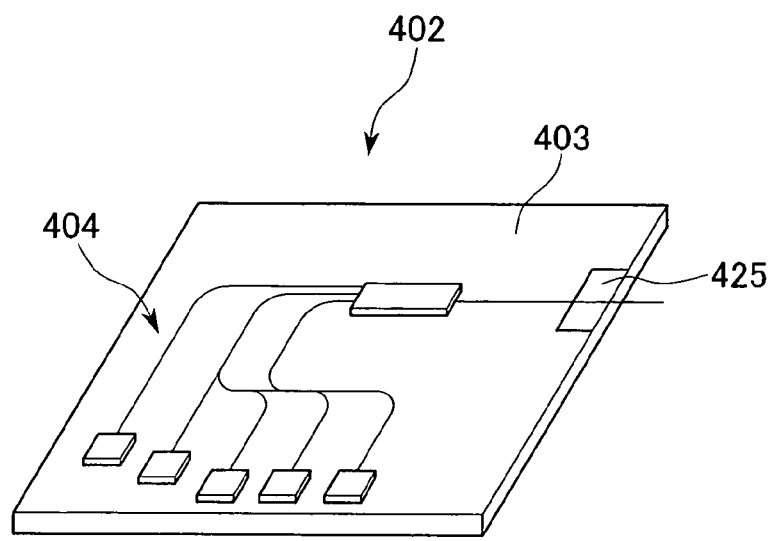
FIG. 53 is a perspective view showing the first optical body of FIG. 52.
Figure 54A:
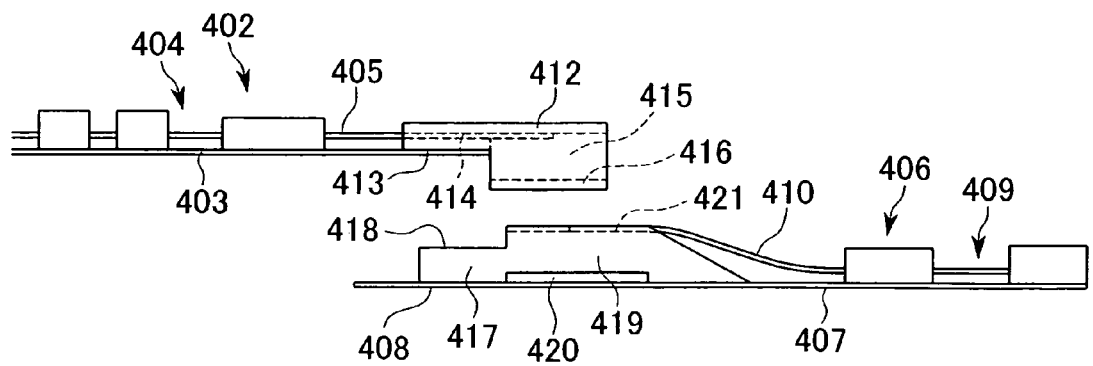
FIGS. 54A to 54C are illustrations showing manufacturing procedures of the optical connection structure shown in FIG. 52.
Figure 54B:
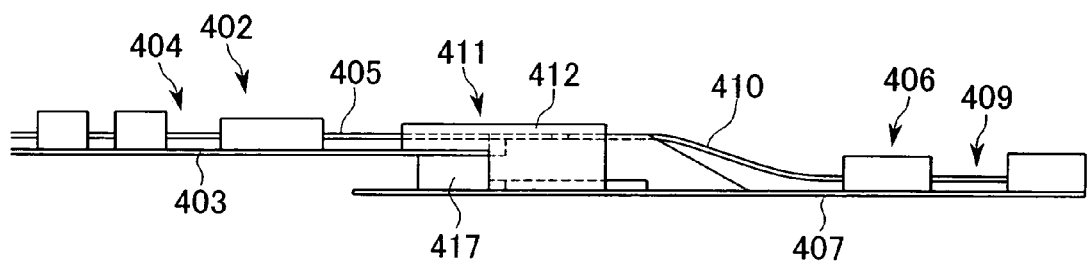
Figure 54C:
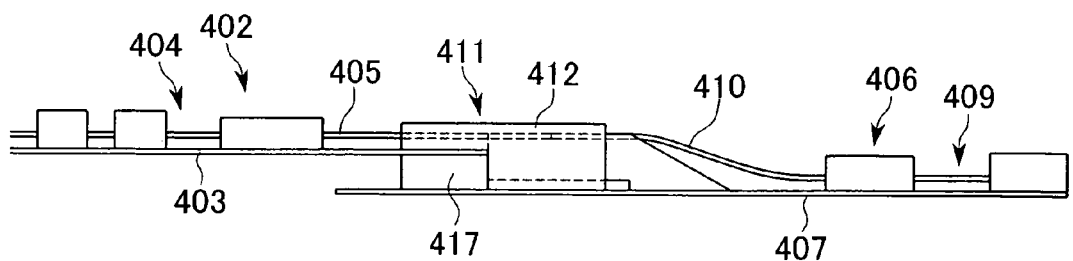

A second embodiment of the optical connection structure and the method for manufacturing the optical connection structure by the present invention are shown in FIGS. 52 to 54A to 54C, FIG. 52 is a front view showing the whole of the optical connection structure, FIG. 53 is a perspective view showing the first optical body, and FIGS. 54A to 54C are illustrations showing procedures of the manufacturing method for the optical connection structure.

In the optical connection structure 401 which is shown in this embodiment, a plug securing part 425 for securing the plug 412 of the connection means 411 is provided on the upper part of the first substrate 403 of the first optical body 402, and the optical-fiber securing part 413 of the plug 412 is secured to the plug securing part 425 by securing means (not shown) such as an adhesive and screw, and because other constitutions are the same as the first embodiment, the same reference numerals are used for the same parts, and detailed description is omitted.

Next, the method for manufacturing the optical connection structure of the constitution as described above will be described.

First, as shown in FIG. 54A, the plug 412 is attached to the end of the first optical fiber 405 by inserting the front end of the first optical fiber 405 which is wired to the upper part of the first substrate 403 of the first optical body 402 in the optical-fiber storing groove 414 of the plug 412, and in this state, the optical-fiber securing part 413 of a plug 12 is secured to the plug securing part 425 of a substrate 403 by the securing means such as an adhesive.

Next, as shown in FIG. 54A, the adapter 417 is secured to the adapter securing part 408 of the second substrate 407 of the second optical body 406 by the securing means such as an adhesive, and the end of the second optical fiber 410 which is wired to the upper part of the second substrate 407 is inserted in the alignment groove 421 of the adapter 417.

Next, as shown in FIG. 54B, the engaging part 419 of the adapter 417 is engaged in the engaging groove 415 of the plug 412, the locking hooks 416 and 416 of the plug 412 side are locked in the locking grooves 420 and 420 of the adapter 417 side, thus the plug 412 is secured to the adapter 417. Thus, the first optical fiber 405 in the optical-fiber storing groove 414 of the plug 412 and the second optical fiber 410 in the alignment groove 421 of the adapter 417 is relatively positioned, and both of the optical fibers 405 and 410 are located on the same axis.

Next, as shown in FIG. 54C, by moving the first substrate 403 of the first optical body 402 and the second substrate 407 of the second optical body 406 in the relatively approaching direction that relatively come close, the first optical fiber 405 of the plug 412 side and the second optical fiber 410 of the adapter 417 side are axially moved in the relatively approaching direction, thus the both of the ends of the optical fibers 405 and 410 are optically connected to each other. In this way the first optical circuit 404 and the second optical circuit 409 are optically connected through the first optical fiber 405 and the second optical fiber 410.

Also in the optical connection structure and the method for manufacturing the optical connection structure by this embodiment constructed as described above, just as in the first embodiment, the first optical body 402 and the second optical body 406 are relatively slightly moved in the top and bottom direction, the plug 412 mounted on the first optical body 402 side is attached to the adapter 417 mounted on the second optical body 406 side, and by relatively slightly moving the first optical body 402 and the second optical body 406 in the horizontal direction in this state, the second optical fiber 410 of the adapter 417 side and the first optical fiber 405 of the plug 412 side can be optically connected.

Therefore, in optical connection, the movement distance of the first optical fiber 405 and the second optical fiber 410 can be reduced, a space needed for the optical connection work can be reduced. In addition, the quantity of movement of the first substrate 403 and the second substrate 407 can be reduced, both substrates 403 and 407 are not damaged by contact with other parts, thus optical connection with stable high quality can be performed.

In addition, the first optical body 402 having the first optical circuit 404 and the second optical body 406 having the second optical circuit 409 can be arranged in a very close state in the top and bottom direction, thus an optical circuit of a multistage can be made in a small space, and the range of use can be enlarged.

Furthermore, the first optical circuit 404 of the first optical body 402 and the second optical circuit 409 of the second optical body 406 are optically connected by collaboration between the plug 412 and the adapter 417 of the connection means 411, thereby the first substrate 403 and the second substrate 407 can be secured at the same time, thus the efficiency of assembly can be largely enhanced.

Furthermore, in this embodiment, the plug 412 is secured to the plug securing part 425 of the substrate 403 by securing means such as an adhesive, the first optical fiber 405 is not drawn alone to the outside of the substrate 403, and the first optical fiber 405 is not damaged by contact with other parts, thus the work for connection can be performed safely.

In each embodiment described above, the plug 412 is secured to the adapter 417 by locking the locking hooks 416 and 416 of the plug 412 to the locking grooves 421 and 421 of the adapter 417, but not limited to this method, the plug and the adapter may be secured by an adhesive, by fitting recesses and projections to each other, by a mechanical frictional force, or by a screw, it is sufficient that the adapter and the plug are secured.

In each embodiment described above, when the first optical fiber 405 and the second optical fiber 410 are optically connected, by relatively approaching the first optical body 402 and the second optical body 406, the first optical fiber 405 and the second optical fiber 410 are moved in the relatively approaching direction that relatively come close, thus both ends of the optical fibers 405 and 410 are optically connected, but at least one of the ends of the optical fibers 405 and 410 may be bent beforehand, in this state both substrates 403 and 407 may be secured by attaching the plug 412 to the adapter 417, the bending parts of the optical fibers 405 and 410 may be extended, and the ends of the optical fibers 405 and 410 may be connected to each other.

Figure 55:
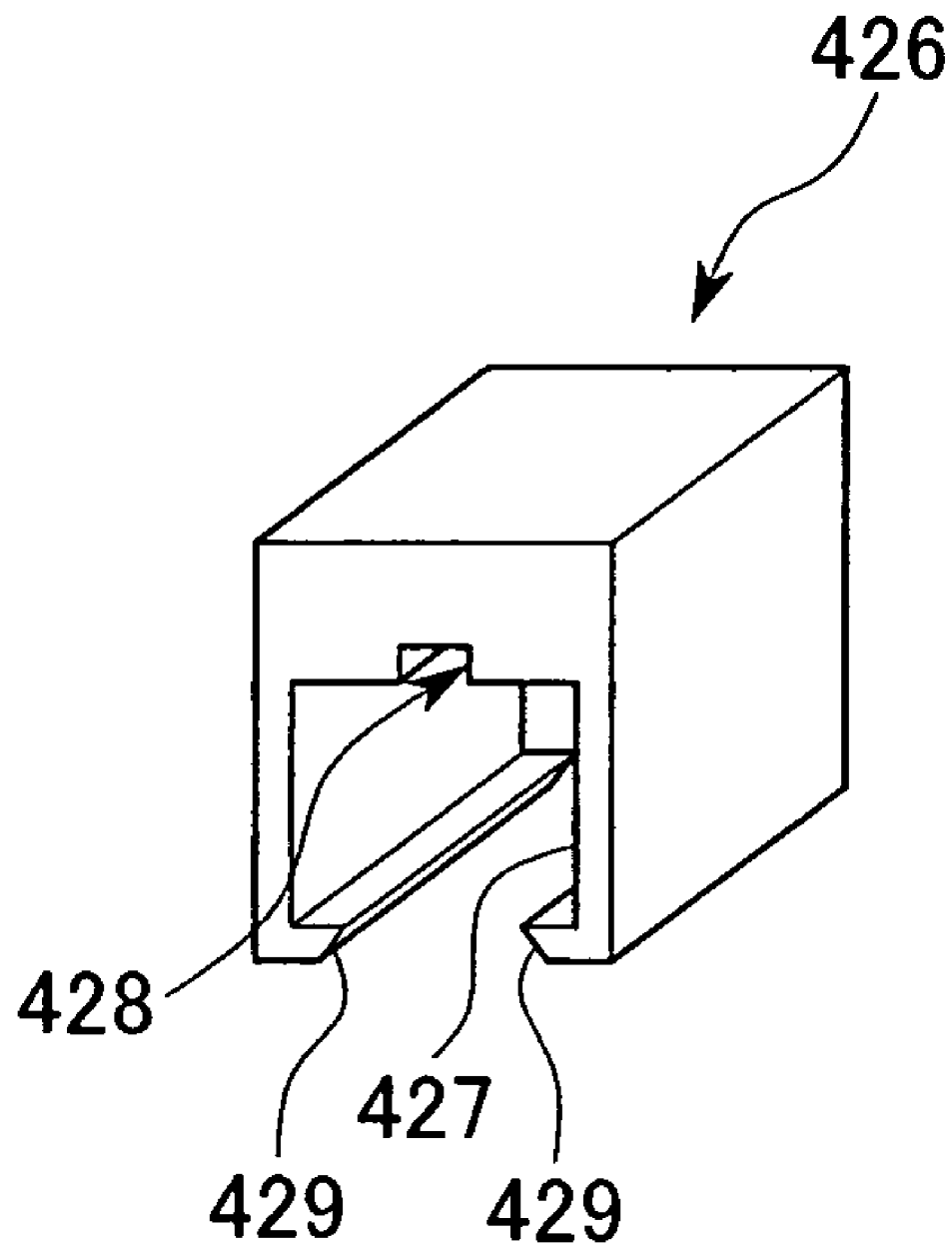
FIG. 55 is a perspective view of an optical fiber movement member of the fourth aspect of the present invention.

In this case, as shown in FIG. 55, by using an optical fiber movement member 426 of which section is an angular U shape having an engaging groove 427 on the bottom side and a support groove 428 supporting the second optical fiber 410 at the bottom of the engaging groove 427, the first optical fiber 405 and the second optical fiber 410 may be optically connected.

Figure 56A:
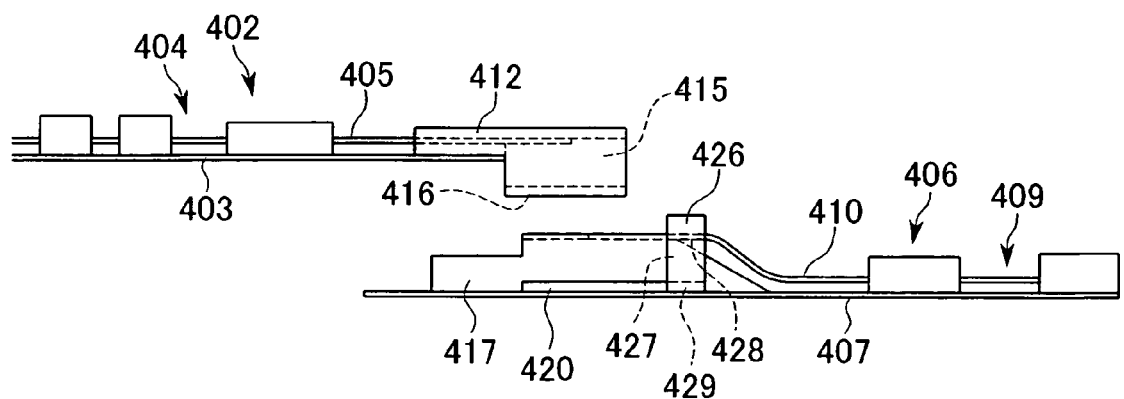
FIGS. 56A to 56C are illustrations showing a modification example of the optical connection structure of the fourth aspect of the present invention, or illustrations showing manufacturing procedures of the modification example.

In other words, as shown in FIG. 56A, the second optical fiber 410 is located in the support groove 428 of the optical fiber movement member 426, in this state the right end of the adapter 417 is engaged in the engaging groove of the optical fiber movement member 426, and the locking hooks 429 and 429 provided on the opening end of the engaging groove 427 of the optical fiber movement member 426 are locked in the locking grooves 420 and 420 of the adapter 417. In this case the locking grooves 420 and 420 are extended to the right end face of the adapter 417.

Figure 56B:
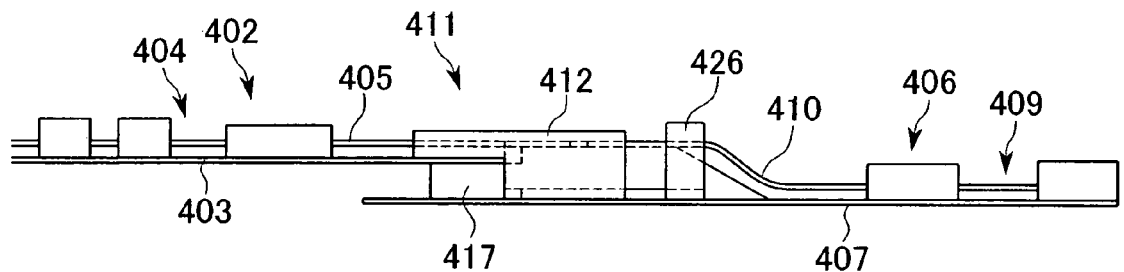
Figure 56C:
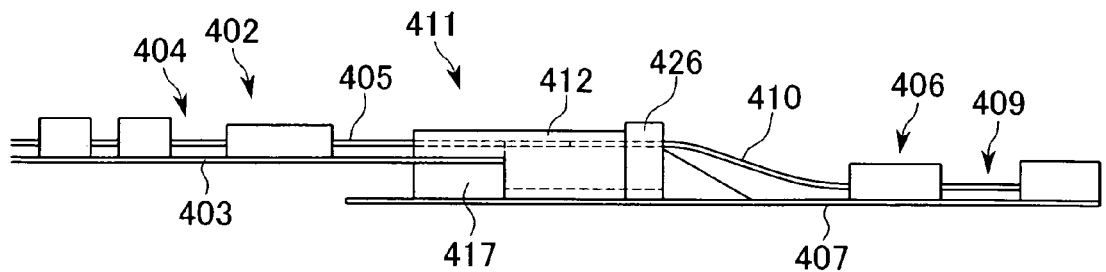

As shown in FIG. 56B, the second optical fiber 410 is moved to the direction of the first optical body 402 integrally with the optical fiber movement member 426, and as shown in FIG. 56C the end of the second optical fiber 410 is abutted against the end of the first optical fiber 405, and both optical fibers 405 and 410 are optically connected.

Figure 57A:
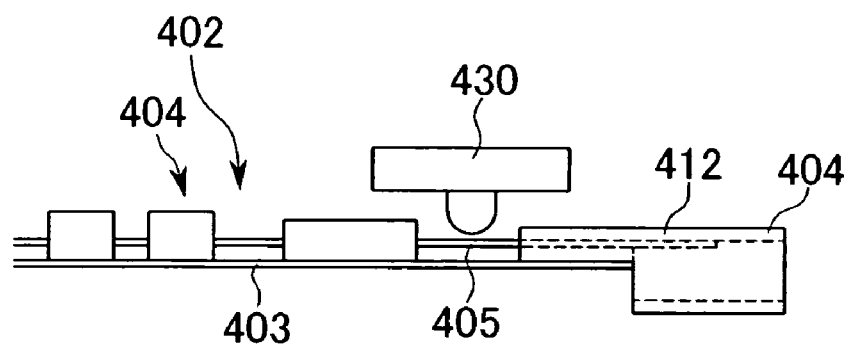
FIGS. 57A and 57B are illustrations showing a modification example of the optical connection structure of the fourth aspect of the present invention, or illustrations showing manufacturing procedures of the modification example.
Figure 57B:
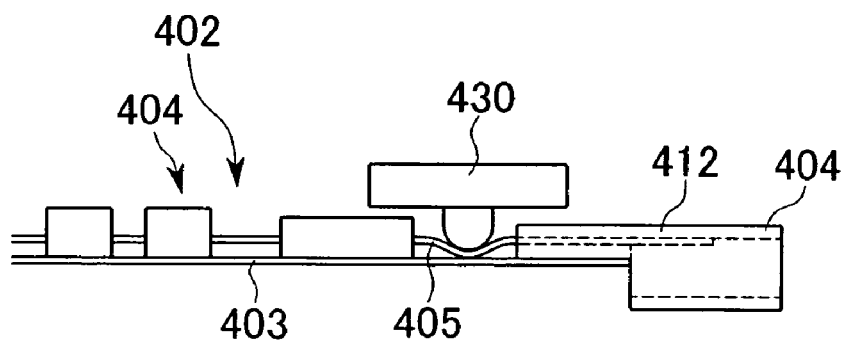

In the example shown in FIGS. 56A to 56C, a slack is made in the second optical fiber 410 by moving (sliding) the optical fiber movement member 426 in the axial direction of the second optical fiber 410, however, the first optical fiber 405 (or the second optical fiber 410) wired to the upper part of the first substrate 403 may be pressed to bend by a pressing jig 430 from above (or the side) as shown in FIGS. 57A and 57B.

Furthermore, a securing method of the plug 412 and the adapter 417 and a connecting method of the first optical fiber 405 and the second optical fiber 410 need not be performed for the same members to stabilize a secured state of the first substrate 403 and the second substrate 407 and a connection state of the first optical fiber 405 and the second optical fiber 410 any more.

Figure 58A:
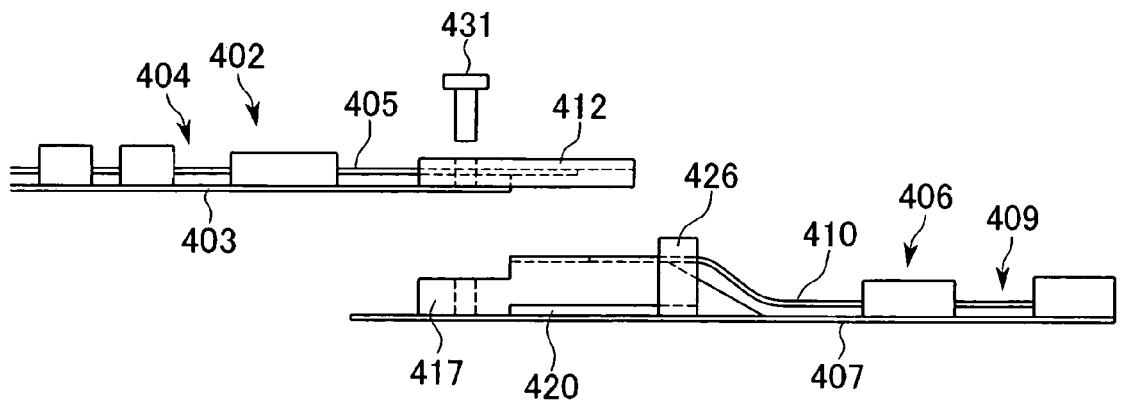
FIGS. 58A to 58D are illustrations showing a modification example of the optical connection structure of the fourth aspect of the present invention, or illustrations showing manufacturing procedures of the modification example.
Figure 58B:
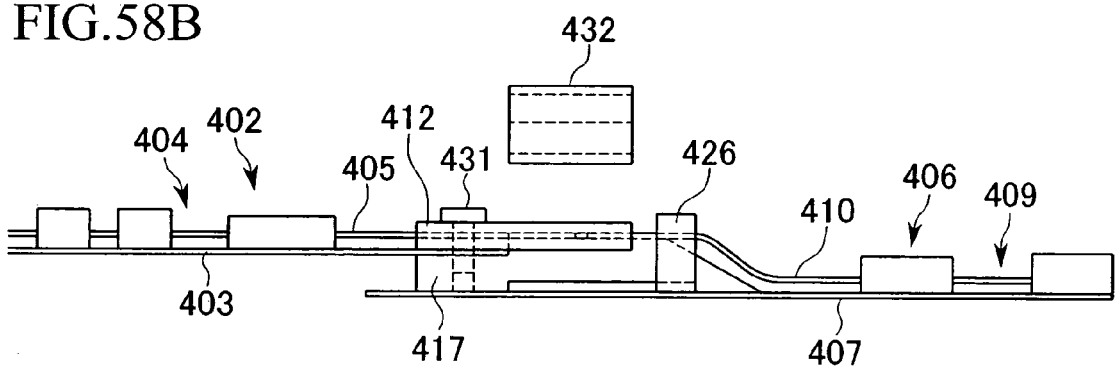
Figure 58C:
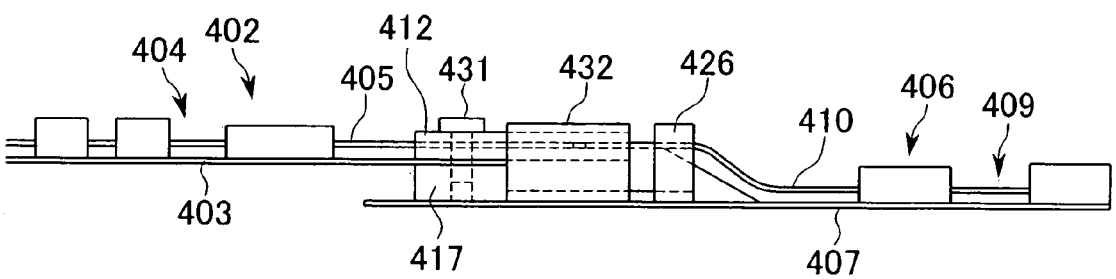
Figure 58D:
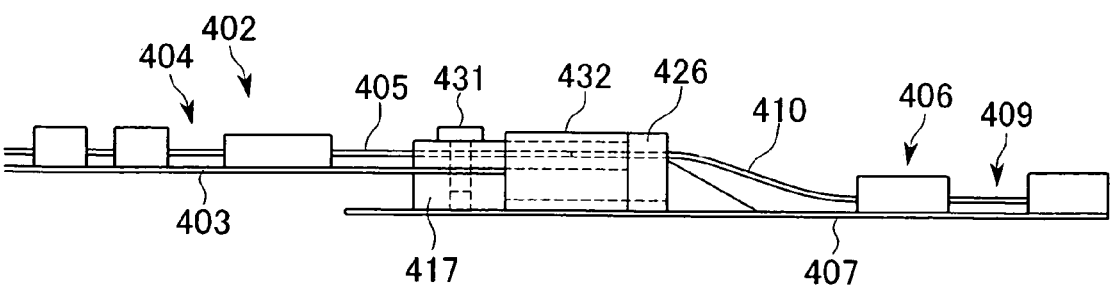
Figure 59:
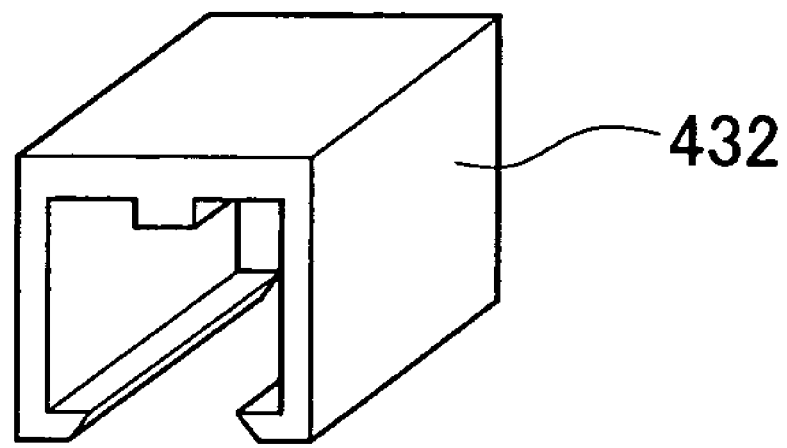
FIG. 59 is a perspective view of a pressing fixation member.

For example, in the example of FIGS. 56A to 56C mentioned above, the plug 412 and the adapter 417 are secured by collaboration between the locking hook 416 and the locking groove 420, and at the same time, the first optical fiber 405 and the second optical fiber 410 are aligned, but, as shown in FIGS. 58A and 58B, after the plug 412 and the adapter 417 may be secured with the screw 31, by attaching a pressing fixation member 32 as shown in FIG. 59 to the adapter 417, the first optical fiber 405 and the second optical fiber 410 may be aligned in the alignment groove 421 as shown in FIG. 58C, and the first optical fiber 405 and the second optical fiber 410 may be optically connected as shown in FIG. 58D.

As the aligning means of the optical fiber, the alignment groove 421 is used in the above description, but it is not limited to this if a method is an optical connecting method that mounts the plug 412 on the adapter 417 from above, and that can align the first optical fiber 405 and the second optical fiber 410.

Figure 60A:
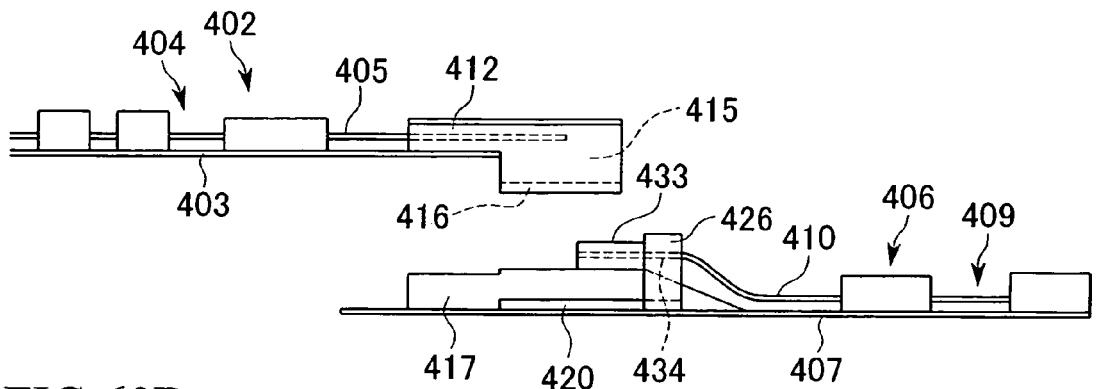
FIGS. 60A to 60D are illustrations showing a modification example of the optical connection structure of the fourth aspect of the present invention, or illustrations showing manufacturing procedures of the modification example.
Figure 60B:
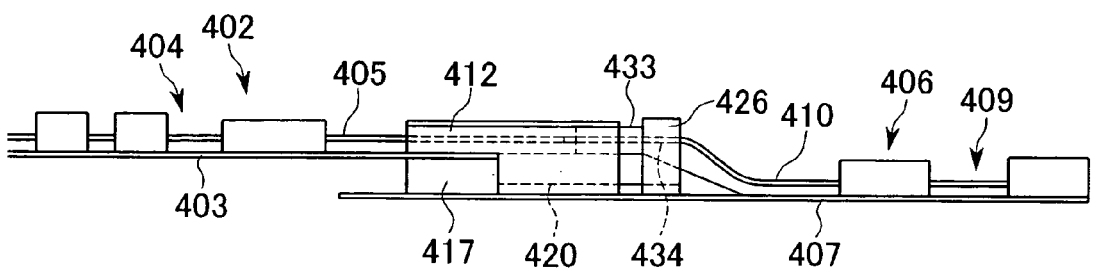
Figure 60C:
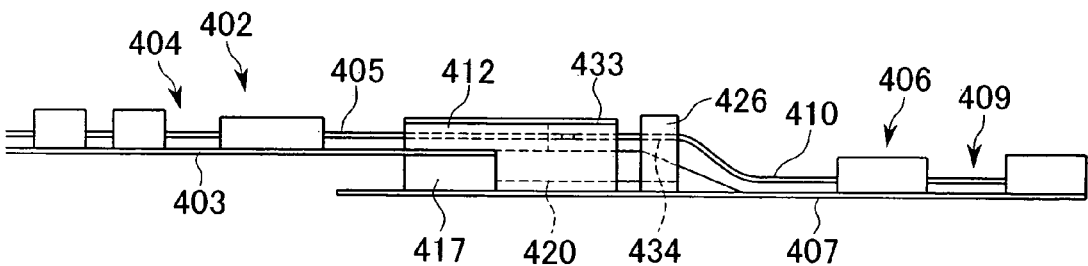
Figure 60D:
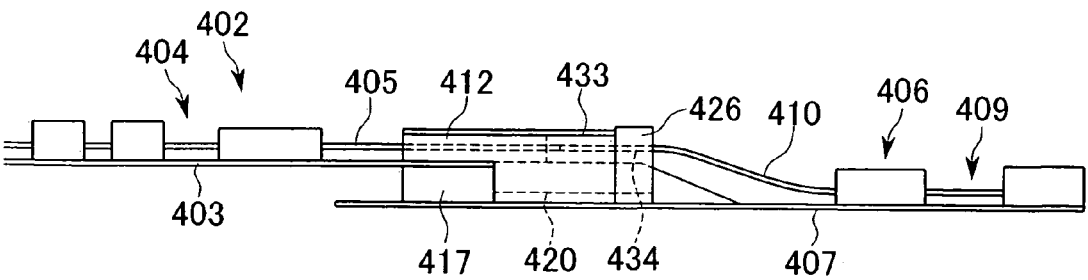

For example, as shown in FIG. 60A, a through-hole member 433 having the through-hole 434 may be attached to the adapter 417 instead of the alignment groove, the second optical fiber 410 may be led in the through-hole 434 of the through-hole member 433, the plug 412 may be attached to the adapter 417 as shown in FIG. 60B, and as shown in FIG. 60C the through-hole member 433 may be moved in the direction of the first optical fiber 405, the first optical fiber 405 may be inserted in the through-hole 434, and the ends of the first optical fiber 405 and the second optical fiber 410 may be aligned, and as shown in FIG. 60D the optical fiber movement member 426 may be moved in the direction of the first optical fiber 405, and the first optical fiber 405 and the second optical fiber 410 may be optically connected.

Plastic, ceramic, metal, zirconia, and glass metal, or the like are used preferably for materials of the aligning means of the first optical fiber 405 and the second optical fiber 410.

The method for securing the first optical fiber 405 to the plug 412 is not limited to the optical-fiber storing groove 414, but the first optical fiber 405 may be threaded through a through-hole, or may be grasped mechanically, what is important is to fix it to the plug 412.

Furthermore, the method for securing the second optical fiber 410 to the adapter 417 is not limited particularly, and may be, for example, a method for securing it by an adhesive directly, or a method for grasping it mechanically if there is no influence in optical characteristics of the optical fiber. Furthermore, the first substrate 403 and the plug 412, or the second board and the adapter 417 may be temporarily secured so that positions can be corrected, and may be secured after mounting. In this case also, the work for connection can be performed safely because the second optical fiber 417 is not damaged by contact with other parts.

Materials and shapes of the plug 412 and the adapter 417 used in the optical connection structure of the present invention mentioned above are not limited in particular, and plastic, ceramic, metal, zirconia, and glass metal, or the like are used preferably for materials. Also the shape is not limited in particular if the plug 412 is secured to the adapter 417 with reliability.

A light transmitting medium used for the optical connection structure of the present invention uses the optical fibers (the first optical fiber 405 and the second optical fiber 410) in the above, but it is not limited in particular and another light transmitting medium can be used as long as it can be installed on the plug 412 and can be aligned on the adapter 417, for example, an optical fiber may be installed on the substrate 403 of the plug 412 side and an optical waveguide may be installed on the second substrate 407 of the adapter 417 side. In addition, a source of light such as an LD and LED and a photodetector such as a photodiode may be attached to the plug 412 or the adapter 417 directly.

The optical fiber which comprises the first optical fiber 405 and the second optical fiber 410 can be chosen and used depending on the application purpose of the optical fiber connector appropriately, and, for example, a single mode optical fiber of silica (quartz) or a plastic, or a multi-mode optical fiber are desirably used.

In addition, the number of optical fibers collectively connected is not limited, and the optical fibers corresponding to the number of alignment grooves can be connected. Thus, the number of optical fibers connected is not limited in particular.

In addition, the optical waveguide may be made of materials of inorganic type such as silica (quartz) and silicon or organic type such as polyimide, acrylic, and epoxy can be used.

The connecting method of the optical fiber is not limited in particular, and a well-known connecting method can be used. For example, a connecting method shown in FIGS. 61A to 61D can be used.

Figure 61A:
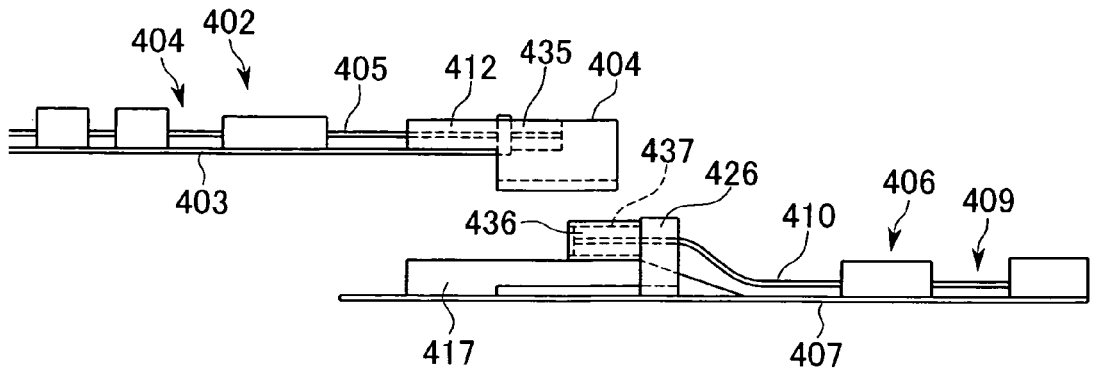
FIGS. 61A to 61D are illustrations showing modification examples of the optical connection structure of the fourth aspect of the present invention, or illustrations showing manufacturing procedures of the modification example.

At first, as shown in FIG. 61A, a ferrule 435 is mounted on the first optical fiber 405 of the first substrate 403, and the ferrule 435 is mounted on the plug 412. In addition, a ferrule 436 is mounted on the second optical fiber 410 of the adapter 417, and the ferrule 436 is mounted on the optical fiber movement member 426. Furthermore, a split sleeve 437 is mounted on the ferrule 436 as the aligning member of the ferrule 435 and 436, the ferrule 436 is moved backward while allowing the second optical fiber 410 to sag by the optical fiber movement member 426.

Figure 61B:
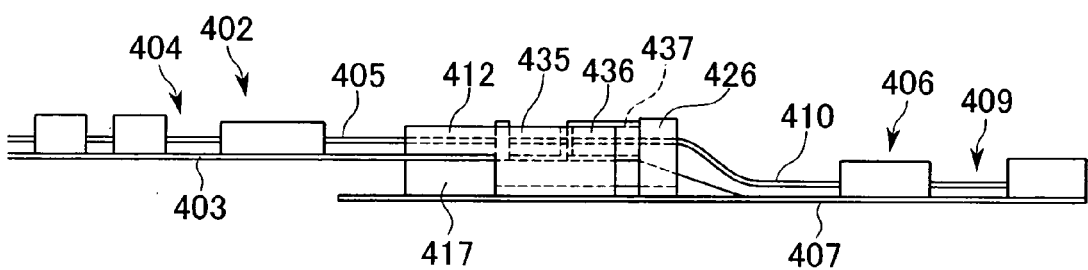
Figure 61C:
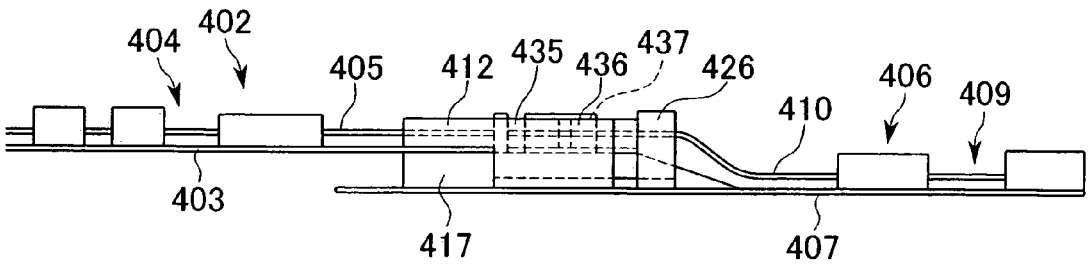
Figure 61D:
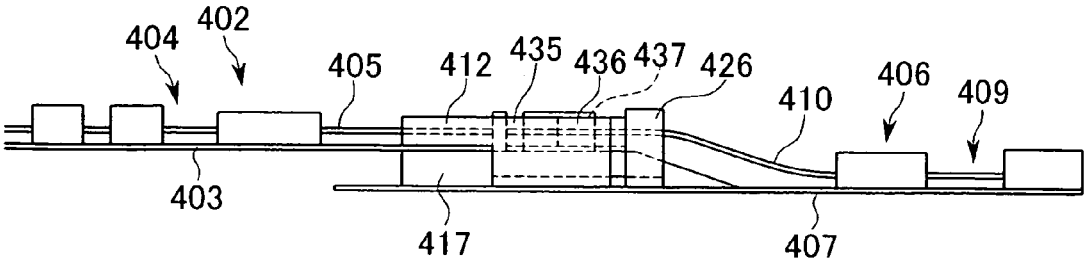

Next, the plug 412 is attached to the adapter 417 as in FIG. 61B, the split sleeve 437 is slid to the direction of the first optical fiber 405 to align the ferrules 435 and 436 as shown in FIG. 61C, the ferrules 435 and 436 are abutted by moving the optical fiber movement member 426 as shown in FIG. 61D, and the first optical fiber 405 and the second optical fiber 410 are optically connected.

A refractive index adjusting agent may be applied between the first optical fiber 405 and the second optical fiber 410, which are abutted for connecting, or PC (Physical Contact) connection may be performed by abutting the first optical fiber 405 and the second optical fiber 410. When a refractive index adjusting agent is used, materials, forms, and installation methods are not limited in particular, and the material can be chosen according to the refractive index and the material of the optical fiber appropriately, and, for example, silicone oil and silicone grease are used preferably. In addition, the form of the refractive index adjusting agent may be solid or liquid, and may be, for example, in a form of oil, grease, gel, or film.

Substrates (the first substrate 403 and the second substrate 407) used in the optical connection structure of the present invention are chosen and used appropriately according to the purpose of use and an environment, but when a power supply is necessary for an optical module and an optical component installed on the substrate or when the substrate is controlled by an electrical signal can be used.

For example, the printed wiring board may be a glass-epoxy substrate, a glass-triazine substrate, a glass-fluorine substrate, or a polyester substrate, or a film substrate represented by a polyimide film used as a flexible printed board can be used for the substrates. Or substrates which already have a printed substrate and electronic elements and optical modules are mounted and optical wiring is carried out or substrates in which only light transmitting mediums are wired can be used.

In addition, a place to mount the plug 412 is not limited to the fringe of the first substrate 403, as long as the end of the first optical fiber 405 is located outside the first substrate 403. For example, the first substrate 403 is cored, and the plug 412 can be mounted on the inner flange.

Examples of the fourth aspect of the present invention will be described as follows. The invention is not limited to the examples shown below.

EXAMPLE 4-1

Figure 65A:
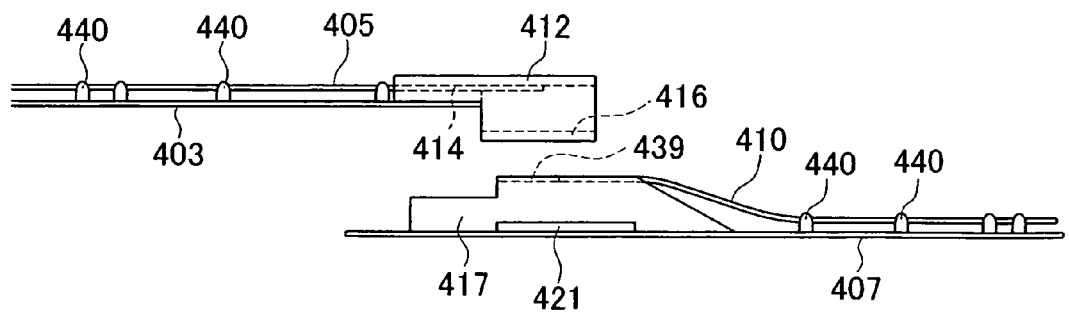
FIGS. 65A to 65C are illustrations showing the manufacturing procedures of Example 4-1.
Figure 65B:
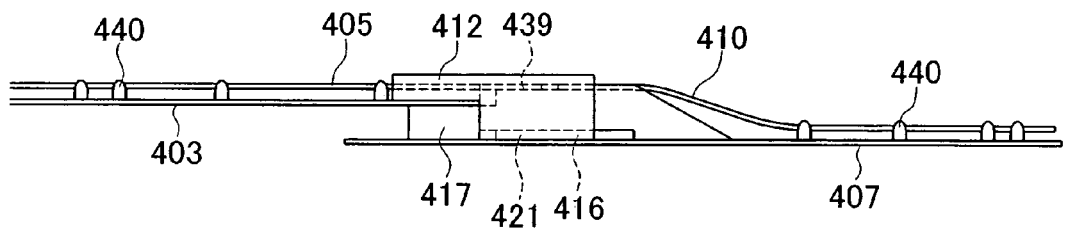
Figure 65C:
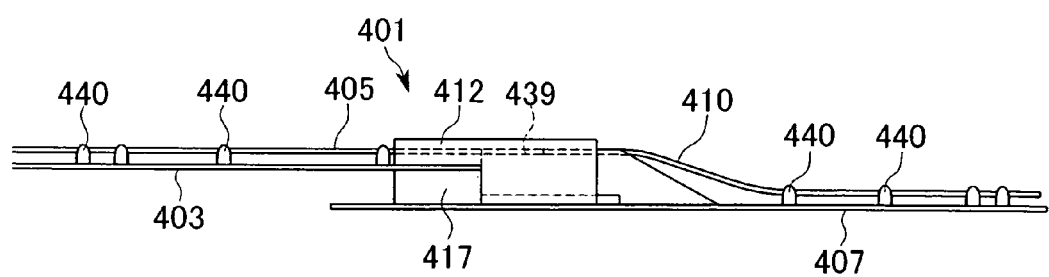

To manufacture the optical connection structure shown in FIG. 65C, eight optical fiber conductors in which 15 mm of the coating of the 250-μm-diameter optical fiber conductors were removed from the end, and optical fiber conductors (125 μm in diameter) were cut at 10 mm from the coating end were provided.

Figure 62A:
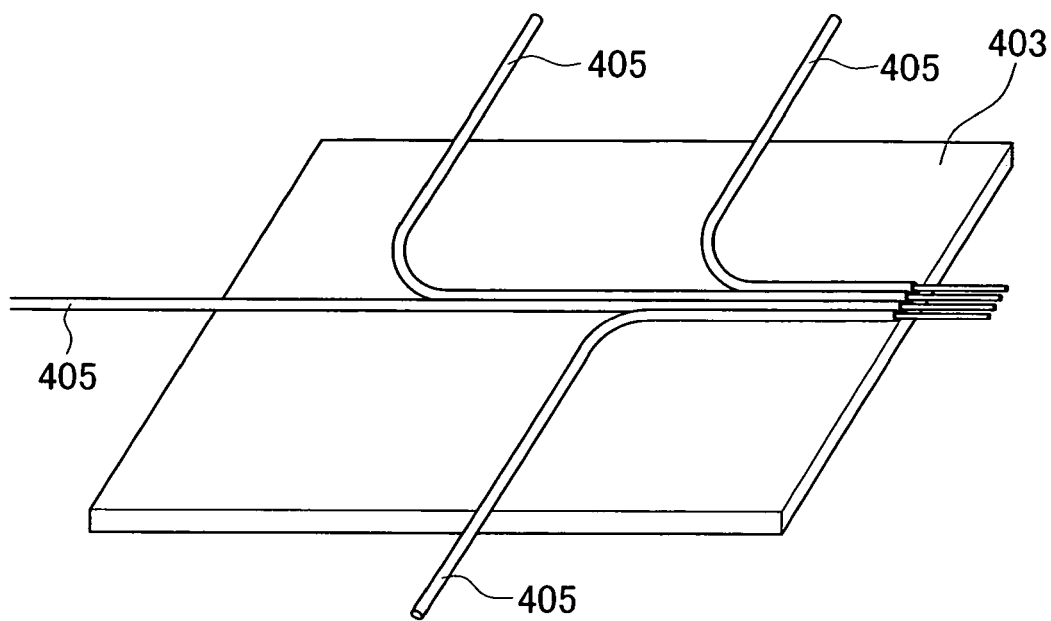
FIGS. 62A and 62B are perspective views showing a first and second substrates used for Example 4-1 of the optical connection structure of the fourth aspect of the present invention.
Figure 62B:
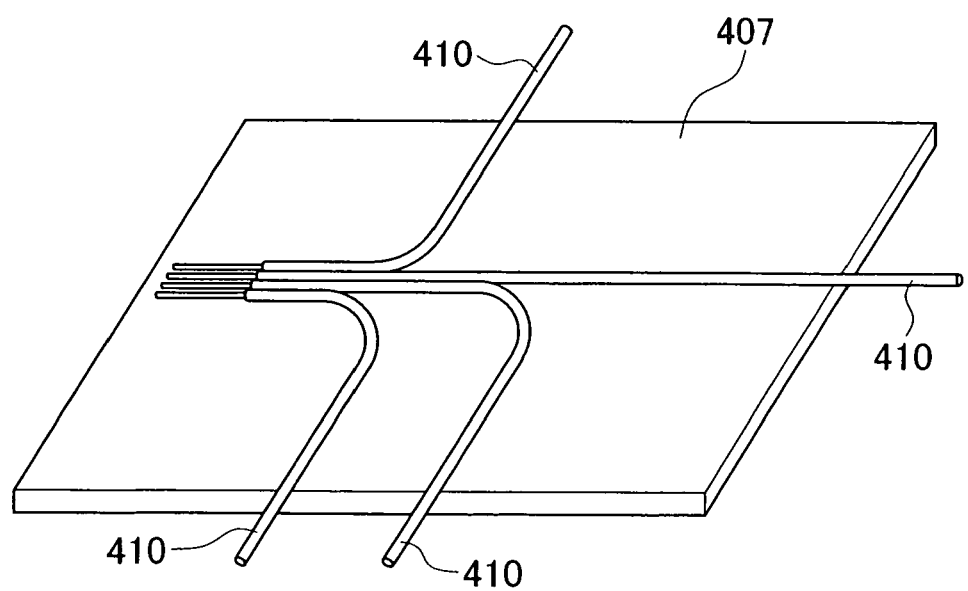

In the optical fibers (the first optical fibers 405 and the second optical fibers 410), four fibers per one substrate in two glass-epoxy substrates (the first substrate 403 and the second substrate 407) and four points per one fiber (the first optical fibers 405 and the second optical fibers 410) were wired and secured with a UV light curing adhesive as shown in FIGS. 62A and 62B. On that occasion four optical fibers (the first optical fibers 405 and the second optical fibers 410) were aligned so that the coatings came in contact with each other in the vicinity of a place where the plug or the adapter was installed, and, the coating ends of the optical fiber conductors were installed to accord with the glass-epoxy substrates (the first substrate 403 and the second substrate 407).

Figure 63:
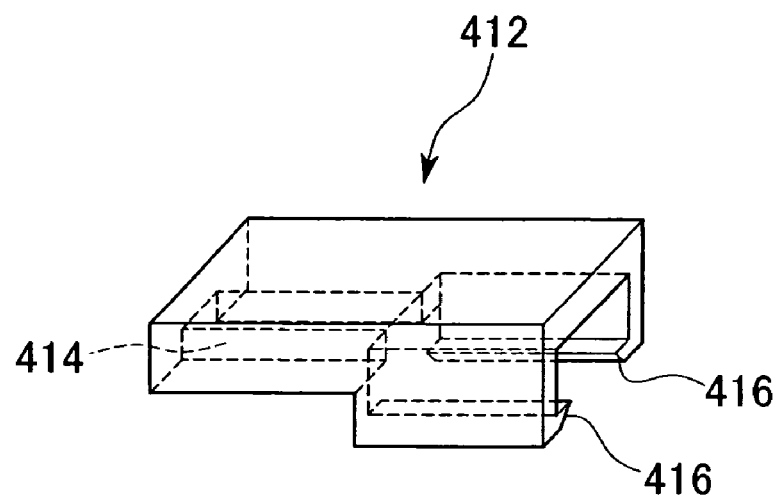
FIG. 63 is a perspective view showing the plug used for Example 4-1 of the fourth aspect of the present invention.
Figure 64:
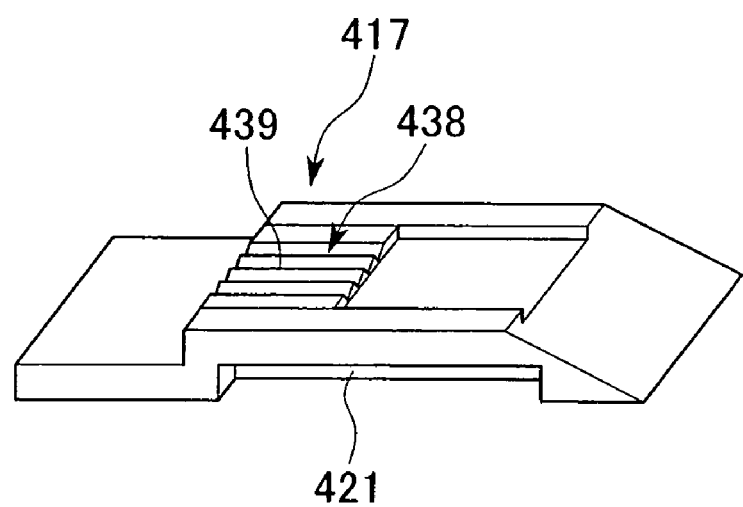
FIG. 64 is a perspective view showing the adapter used for Example 4-1.

Next, the plug 412 shown in FIG. 63 and the adapter 417 shown in FIG. 64 are made of ABS resin, and a four-wire plastic V-shaped groove substrate 438 was incorporated in the adapter 417 as the alignment groove 421.

Next, the first optical fiber 405 was attached to the optical-fiber storing groove 414 of the plug 412, and in this state the plug 412 was mounted on the first substrate 403 and was secured by an adhesive.

As shown in FIG. 65A the adapter 417 is attached inside the V-shaped groove 439 of the V-shaped groove substrate 438 attached on the adapter 417, and secured to the second substrate 407 by an adhesive, and the second optical fiber 410 is secured to the adapter 417 by an adhesive.

As shown in FIG. 65B the first substrate 403 to which the plug 412 was attached was brought close to the second substrate 407 to which the adapter 417 was attached from above, by locking the locking hook 416 of the plug 412 to the locking groove 421 of the adapter 417, the first substrate 403 and the second substrate 407 were secured to the predetermined position of the top and bottom direction, and at the same time the first optical fiber 405 and the second optical fiber 410 were aligned in the V-shaped groove 439.

And as shown in FIG. 65C by relatively moving the first substrate 403 and the second substrate 407 in the axial direction of the first optical fiber 405 and the second optical fiber 410, the first optical fiber 405 and the second optical fiber 410 were optically connected, and the optical connection structure 401 of the present invention was made.

In the provided optical connection structure 401, as described above, in the optical fiber connection between other printed boards, optical connection and fixation between bulky substrates (the first substrate 403 and the second substrate 407) can be performed from above, thereby movement distance of the optical fibers (the first optical fibers 405 and the second optical fibers 410) can be reduced. Therefore, a space for the work for connection on the substrates (the first substrate 403 and the second substrate 407) can be made small, and the space is saved. In addition, parts are not damaged by contact with the substrates (the first substrate 403 and the second substrate 407).

In addition, a space is saved and the manufacture of an optical circuit of a multistage is enabled since the substrates (the first substrate 403 and the second substrate 407) are closely secured together. The optical circuits structured with other substrates are optically connected to each other, and at the same time the substrates can be secured to each other, thus the workability of the assembly can be improved.

In addition, the light transmitting medium (the first optical fiber 405) such as the optical fiber is secured to the plug 412, and the plug 412 is secured to the substrate (the first substrate 403), thus the optical fiber (the first optical fiber 405) cannot be drawn alone to the outside the substrate (the first substrate 403). Therefore, the optical fiber (the first optical fiber 405) does not damage other components by coming in contact with the components, so that the work can be performed safely.

Thereafter, the connection loss was measured at the connection point and was 0.5 dB or less, so that it was sufficiently available for use for the optical connection structure.

EXAMPLE 4-2

Figure 66A:
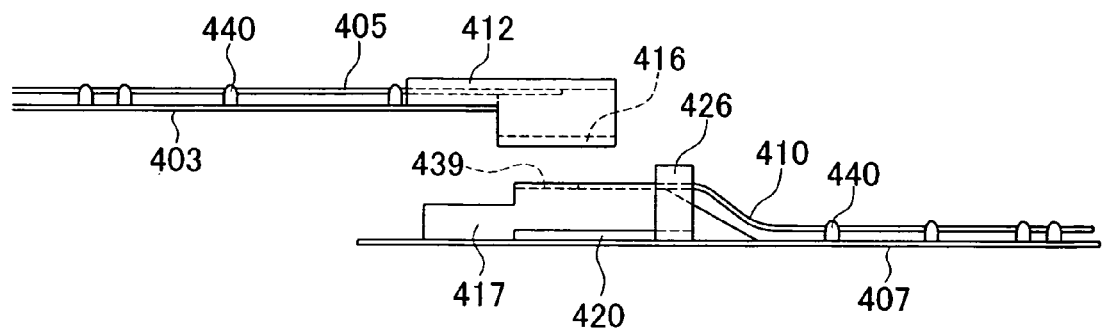
FIGS. 66A to 66C are illustrations showing manufacturing procedures of Example 4-2 of the optical connection structure of the fourth aspect of the present invention.
Figure 66B:
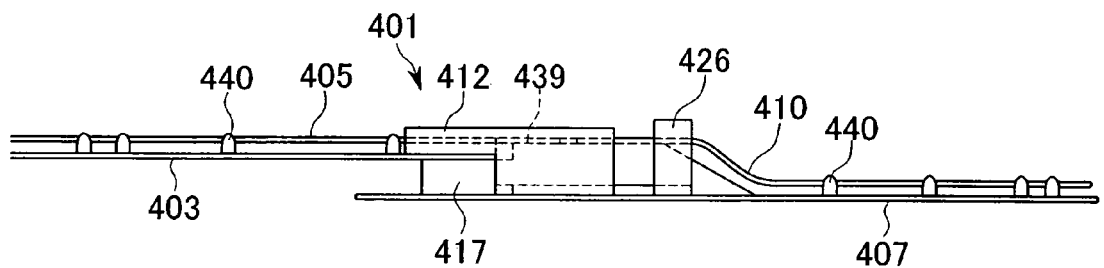
Figure 66C:
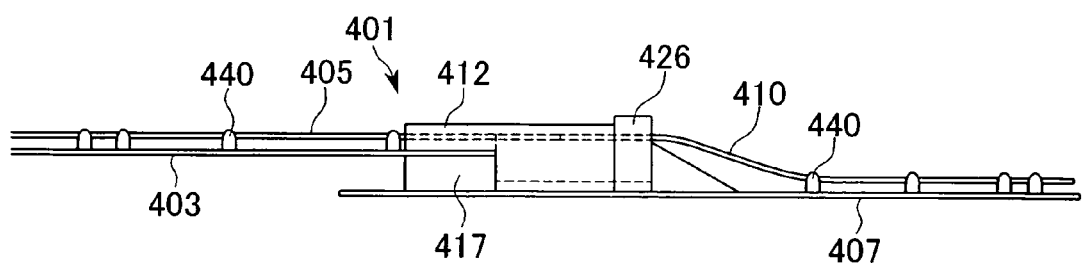

To manufacture the optical connection structure 401 as shown in FIG. 66C, just as in the Example 4-1, the glass-epoxy substrates (the first substrate 403 and the second substrate 407) in which the optical fibers (the first optical fiber 405 and the second optical fiber 410) were wired were made, and the plug 412 the same as the Example 4-1 was attached and secured to the first substrate 403 as shown in FIG. 66A.

Next, the adapter 417 shown in FIG. 64 and the optical fiber movement member 426 shown in FIG. 55 were made of ABS resin. Also, the same plastic V-shaped groove substrate 438 was used as the first experiment.

As shown in FIG. 66A the second optical fiber 410 wired to the second substrate 407 was attached in the V-shaped groove 439 of the V-shaped groove substrate 438 attached on the adapter 417, the adapter 417 was secured to the second substrate 407 with the adhesive 440, and the second optical fiber 410 was secured to the optical fiber movement member 426, and the optical fiber movement member 426 was slidably attached to the adapter 417 while bending the second optical fiber 410.

As shown in FIG. 66B the first substrate 403 to which the plug 412 was attached was brought close to the second substrate 407 to which the adapter 417 was attached from above, the locking hook 416 of the plug 412 was locked to the locking groove 420 of the adapter 417, the first substrate 403 and the second substrate 407 were secured in the top and bottom direction, and at the same time the first optical fiber 405 and the second optical fiber 410 were aligned in the V-shaped groove 439.

As shown in FIG. 66C by moving the optical fiber movement member 426 attached to the adapter 417 to the direction of the first optical fiber 405, the first optical fiber 405 and the second optical fiber 410 were optically connected, and the optical connection structure 401 of the present invention was made.

In the provided optical connection structure 401, an excellent effect was acquired similar to the effect mentioned of the optical connection structure 401 of the Example 4-1.

In addition, the end of the second optical fiber 410 was moved by extending the second optical fiber 410 which was bent, by optically connecting the first optical fiber 405 and the second optical fiber 410, there was no need to move the first substrate 403 and the second substrate 407 when the plug 412 was attached to the adapter 417, the first substrate 403 and the second substrate 407 could be attached in the device with good precision.

Furthermore, it was not necessary to move the weighty printed board (the first substrate 403 and the second substrate 407), and the shock that applied to the optical fibers (the first optical fiber 405 and the second optical fiber 410) at the time of connection was reduced, there was no concern to damage, thus the work for connection could be performed easily and safely. Thus, yields were improved, and the efficiency of the work for the connection was improved. Furthermore, by providing the sliding member (the optical fiber movement member 426) in the adapter 417, the optical fiber (the second optical fiber 410) was easily bent, thus the optical connection structure 401 was made quickly.

Thereafter, the connection loss was measured at the connection point and was 0.5 dB or less, it was sufficiently available for use for the optical connection structure 401.

EXAMPLE 4-3

Figure 69A:
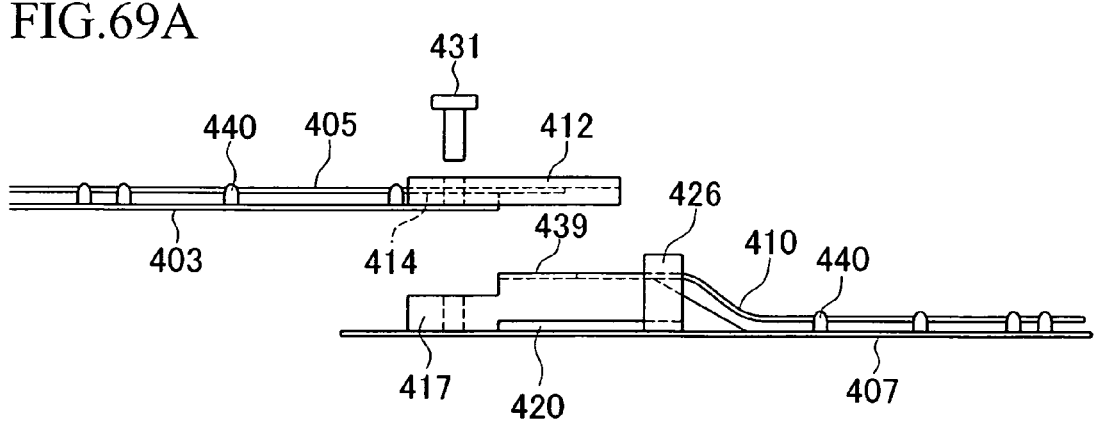
FIGS. 69A to 69D are illustrations showing manufacturing procedures of Example 4-3 of the optical connection structure of the fourth aspect of the present invention.
Figure 69B:
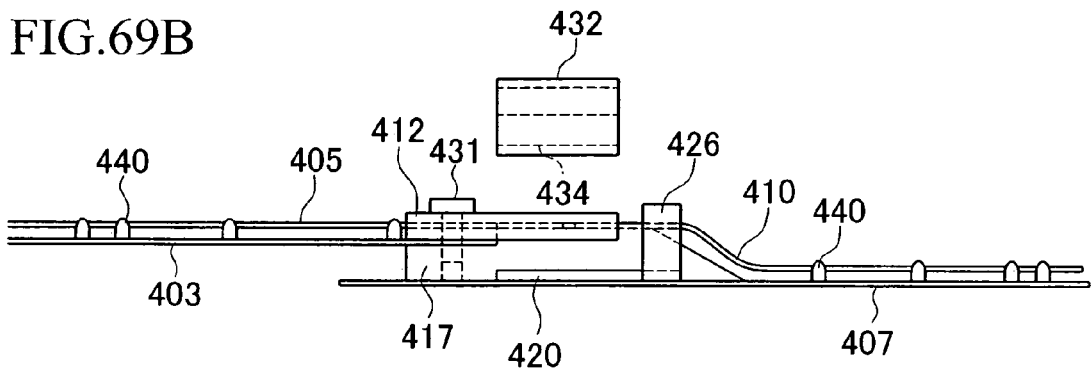
Figure 69C:
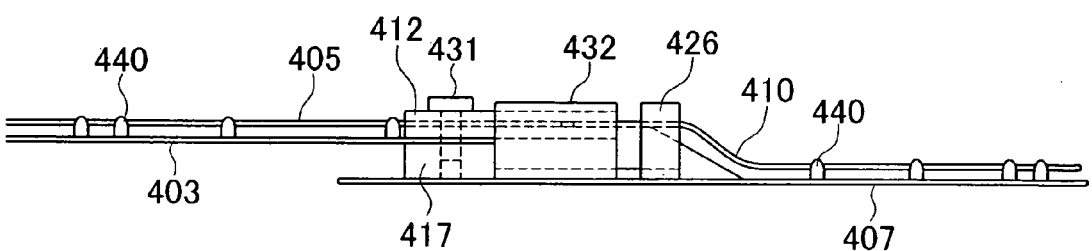
Figure 69D:
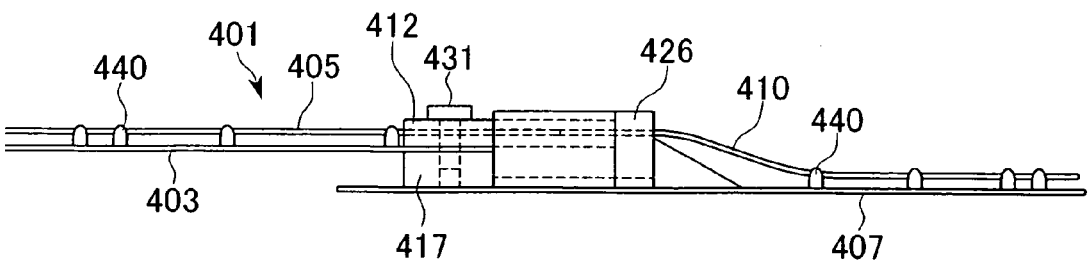

To manufacture the optical connection structure 401 shown in FIG. 69D, just as in the Example 4-1, the glass-epoxy substrates (the first substrate 403 and the second substrate 407) in which the optical fibers (the first optical fiber 405 and the second optical fiber 410) were wired were made.

Figure 67:
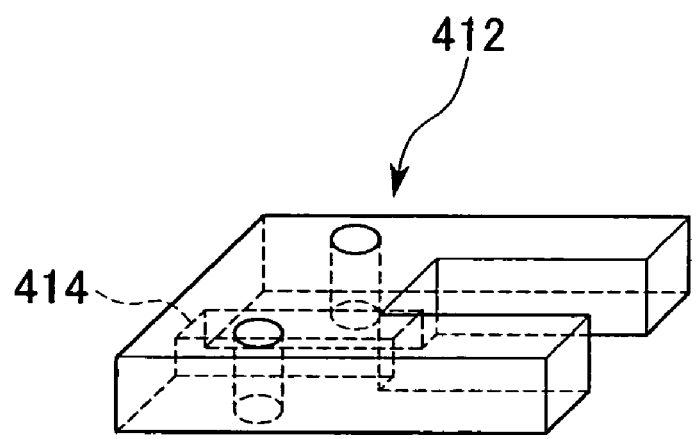
FIG. 67 is a perspective view showing the plug used for Example 4-2.
Figure 68:
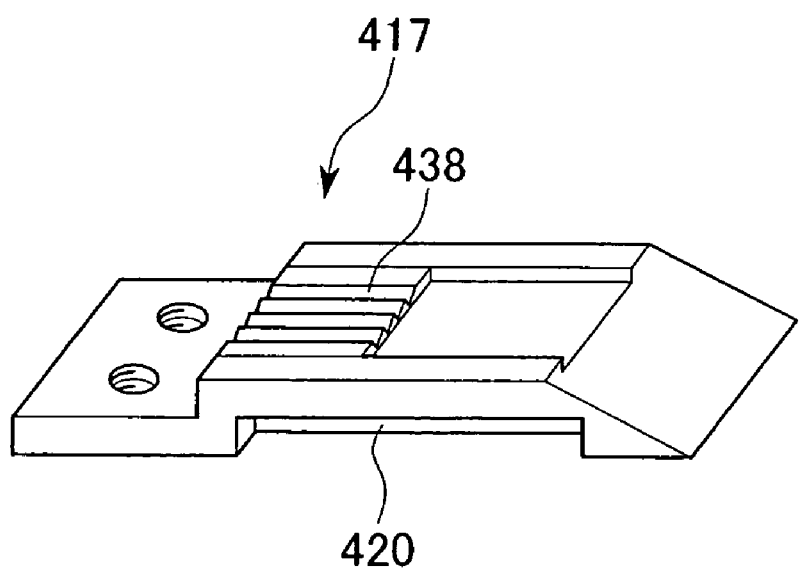
FIG. 68 is a perspective view showing the adapter used for Example 4-2.

Next, the plug 412 shown in FIG. 67, the adapter 417 shown in FIG. 68, and the pressing fixation member 32 shown in FIG. 59 were made of ABS resin. Furthermore, the plastic V-shaped groove substrate 438 the same as the first experiment was used.

First, as shown in FIG. 69A the first optical fiber 405 was attached to the optical-fiber storing groove 414 of the plug 412, and the plug 412 was secured to the first substrate 403 by an adhesive. While the wired second optical fiber 410 was attached in the V-shaped groove 439 of the V-shaped groove substrate 438 attached on the adapter 417, the second optical fiber 410 was secured to the optical fiber movement member 426, the optical fiber movement member 426 was slidably attached to the adapter 417.

Next, as shown in FIG. 69B the first substrate 403 to which the plug 412 was attached was brought close to the second substrate 407 to which the adapter 417 was attached from above, and the plug 412 was secured to the adapter 417 by tightening the screw 431. Next the locking hook 434 was locked in the locking groove 420 of the adapter 417 from above the plug 412 so that the pressing fixation member 432 was secured, and the first optical fiber 405 and the second optical fiber 410 were aligned in the V-shaped groove 439 as shown in FIG. 69C.

As shown in FIG. 69D by moving the optical fiber movement member 426 attached to the adapter 417 to the direction of the first optical fiber 405, the first optical fiber 405 and the second optical fiber were optically connected, and the optical connection structure 401 of the present invention was made.

In the provided optical connection structure 401, an excellent effect was acquired similar to the effect mentioned for the optical connection structure 401 of the second experiment. In addition, as described above, a step of securing the printed boards (the first substrate 403 and the second substrate 407) to each other and a step of aligning the optical fibers (the first optical fiber 405 and the second optical fiber 410) were distinguished and each became independent, so that each fixation could be made stronger, and a stable secured state could be maintained.

Thereafter, the connection loss was measured at the connection point and was 0.5 dB or less, so that it was sufficiently available for use for the optical connection structure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical connecting method for optically connecting by abutting ends of a first optical fiber and a second optical fiber against each other, the first and the second optical fibers being secured to a first plug and a second plug, comprising the steps of:
    threading the first optical fiber through the first plug and threading the second optical fiber through the second plug to secure each optical fiber to each plug with a securing part;
    bending a part of at least one of the first optical fiber and the second optical fiber that is present ahead of the securing part;
    aligning the first optical fiber and the second optical fiber and fixing a relative position between the first and second plugs; and
    abutting the first optical fiber and the second optical fiber by releasing a flexure of at least one of the first optical fiber and the second optical fiber, due to the restoring force of said at least one of the first and second optical fibers, and wherein
    in said bending step, force is applied to at least one of said first and second optical fibers by a sliding member to bend the at least one of the first optical fiber and the second optical fiber, and
    in said abutting step, the flexure of the at least one of the first optical fiber and the second optical fiber is released by stopping the application of the force.

2. The optical connecting method according to claim 1, wherein an aligning member is used in said aligning step.

3. The optical connecting method according to claim 1, wherein in said aligning step said first plug and said second plug are secured to an adapter to fix a relative position between the first and second plugs.

4. The optical connecting method according to claim 3, wherein the top of said adapter is opened, and said first plug and said second plug are mounted on the adapter from above the adapter to be secured.

* * * * *